(12) United States Patent
Matsuishi

(10) Patent No.: US 7,424,490 B2
(45) Date of Patent: Sep. 9, 2008

(54) SYSTEM FOR DOCUMENT MANAGEMENT AND INFORMATION PROCESSING

(75) Inventor: Takaya Matsuishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 391 days.

(21) Appl. No.: 10/601,645

(22) Filed: Jun. 24, 2003

(65) Prior Publication Data

US 2004/0088281 A1    May 6, 2004

Related U.S. Application Data

(62) Division of application No. 09/632,212, filed on Aug. 3, 2000, now Pat. No. 6,782,387.

(30) Foreign Application Priority Data

| Aug. 6, 1999 | (JP) | ................... 11-224015 |
| Dec. 13, 1999 | (JP) | ................... 11-353718 |
| Jul. 28, 2000 | (JP) | ................... 2000-229571 |

(51) Int. Cl.
*G06F 7/00* (2006.01)
*G06F 17/30* (2006.01)
*G06F 12/00* (2006.01)

(52) U.S. Cl. .......................................... 707/200; 707/1

(58) Field of Classification Search ................ 707/1–3, 707/5, 104.1, 102, 200, 203, 205, 10, 204; 715/512, 531

See application file for complete search history.

(56) References Cited

U.S. PATENT DOCUMENTS 5,101,493 A * 3/1992 Travis et al. .................... 707/1
5,537,591 A * 7/1996 Oka ............................. 707/102
5,568,640 A    10/1996 Nishiyama et al.

(Continued)

FOREIGN PATENT DOCUMENTS

| EP | 0 497 283 | 8/1992 |
| EP | 0625756 | 11/1994 |
| JP | 4-274571 | 9/1992 |
| JP | 8-69473 | 3/1996 |
| JP | 8-329061 | 12/1996 |
| JP | 11-7445 | 1/1999 |
| WO | WO 99/18524 | 4/1999 |

OTHER PUBLICATIONS

Hyde: a hypermedia document editor based on OLE technology, IEEE, J. Sousa Pinto et al., Sep. 1994, (pp. 375-381).

Extending the Windows Explorer with Name Space Extensions,Microsoft systems Journal, David Campbell, Jul. 1996, (pp. 29-30, 32-33, 35-38).

*Primary Examiner*—Don Wong
*Assistant Examiner*—Merilyn P Nguyen
(74) *Attorney, Agent, or Firm*—Oblon, Spivak, McClelland, Maier & Neustadt, P.C.

(57) ABSTRACT

A document data handling apparatus for coupling a plurality of document data, wherein each of the plurality of document data includes a plurality of types of files, the apparaurs including: a document data coupling control part configured to control a document data coupling process in which the plurality of document data managed by the document managing part are coupled together to form second document data; and a document name generating part configured to determine a name of one of the plurality of document data used to create the first document data, to assign the determined name of one of the plurality of document data used to create the first document data to the first document data, and to rename the plurality of document data used to create the first document data so as to include the name assigned to the first document data.

15 Claims, 50 Drawing Sheets

U.S. PATENT DOCUMENTS

| | | |
|---|---|---|
| 5,887,088 A | 3/1999 | Kurokawa et al. |
| 5,960,444 A * | 9/1999 | Jackson ...................... 707/203 |
| 6,249,844 B1 * | 6/2001 | Schloss et al. ............. 711/122 |
| 6,266,683 B1 * | 7/2001 | Yehuda et al. .............. 715/512 |
| 6,341,287 B1 | 1/2002 | Sziklai et al. |
| 6,401,097 B1 | 6/2002 | McCotter et al. |
| 6,593,938 B1 * | 7/2003 | Sakata et al. ................ 345/629 |

* cited by examiner

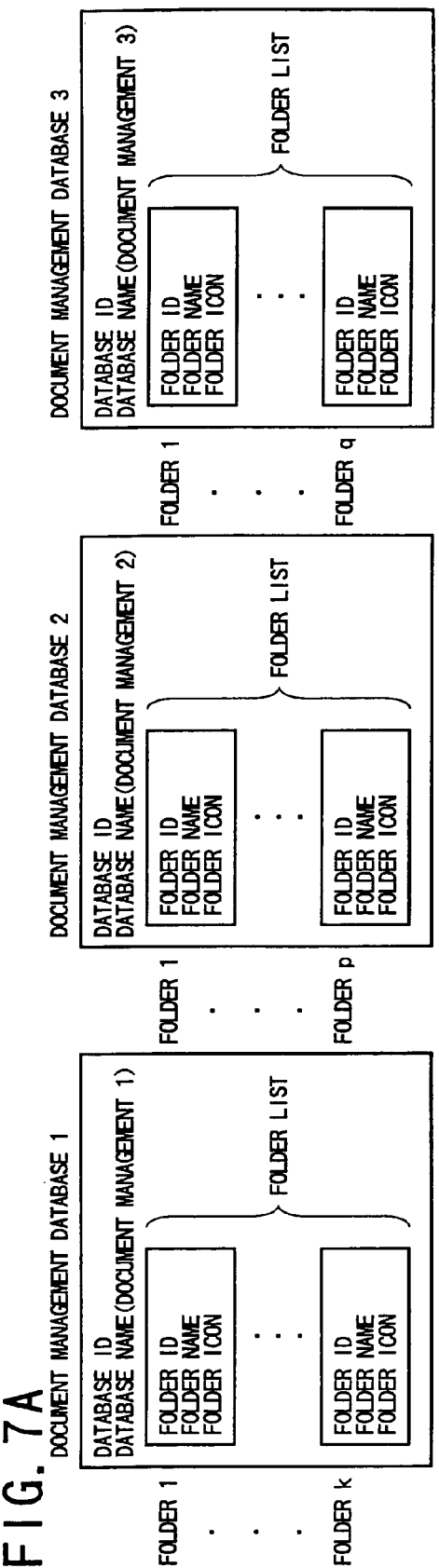
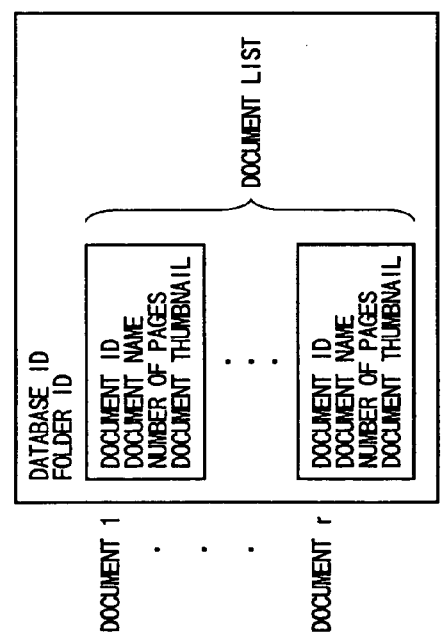
FIG. 7A
FIG. 7B

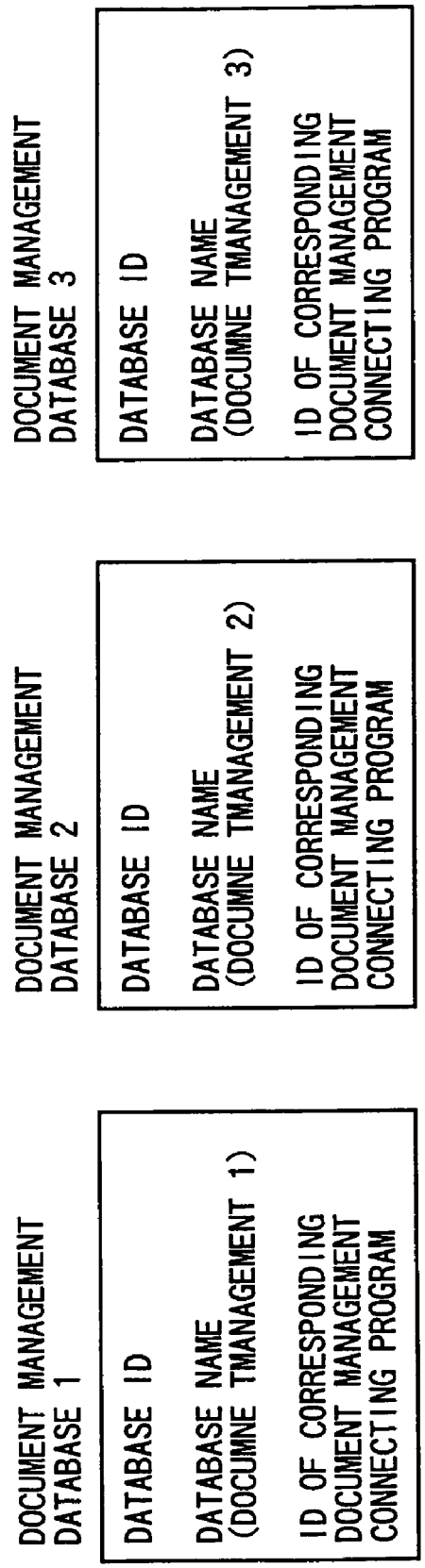

FIG. 12

| INSTRUCTIONS | CONTENTS OF OPERATIONS | NECESSARY ARGUMENTS |
|---|---|---|
| CopyDocuments | COPY OF DOCUMENT | SOURCE DOCUMENT ID, TARGET FOLDER ID |
| MoveDocuments | MOVING OF DOCUMENT | SOURCE DOCUMENT ID, TARGET FOLDER ID |
| RenameDocument | CHANGE OF NAME OF DOCUMENT | SOURCE DOCUMENT ID |
| ... | ... | |
| CreateFolder | CREATION OF FOLDER | ID OF PARENT FOLDER OF FOLDER TO BE CREATED |
| DeleteFolder | DELETING OF FOLDER | TARGET FOLDER ID |

FIG. 18A

| | INSTRUCTION | EXECUTABLE OR NOT |
|---|---|---|
| DOCUMENT MANAGEMENT CONNECTING PROGRAM P1 | CopyDocuments | EXECUTABLE |
| | MoveDocuments | EXECUTABLE |
| | RenameDocument | NON-EXECUTABLE |
| | DeleteDocument | EXECUTABLE |
| | ... | |
| | CreateFolder | EXECUTABLE |
| | DeleteFolder | EXECUTABLE |

FIG. 18B

| | INSTRUCTION | EXECUTABLE OR NOT |
|---|---|---|
| DOCUMENT MANAGEMENT CONNECTING PROGRAM P2 | CopyDocuments | EXECUTABLE |
| | MoveDocuments | EXECUTABLE |
| | RenameDocument | EXECUTABLE |
| | DeleteDocument | NON-EXECUTABLE |
| | ... | |
| | CreateFolder | EXECUTABLE |
| | DeleteFolder | EXECUTABLE |

FIG. 18C

| | INSTRUCTION | EXECUTABLE OR NOT |
|---|---|---|
| DOCUMENT MANAGEMENT CONNECTING PROGRAM P3 | CopyDocuments | EXECUTABLE |
| | MoveDocuments | EXECUTABLE |
| | RenameDocument | EXECUTABLE |
| | DeleteDocument | EXECUTABLE |
| | ... | |
| | CreateFolder | EXECUTABLE |
| | DeleteFolder | EXECUTABLE |

SYSTEM FOR DOCUMENT MANAGEMENT AND INFORMATION PROCESSING

BACKGROUND OF THE INVENTION

1. Field of the Invention

The present invention generally relates to a document management system, an information processing apparatus, a document management method, and a computer-readable recording medium, and, in particular, to a document management system and an information processing apparatus which integrally manage a plurality of document management databases which belong to a plurality of computers, respectively, connected by a network such as a LAN (Local Area Network), and a computer-readable recording medium in which programs for achieving such functions are record.

The present invention further relates to a document management system, a documents management method and a computer-readable recording medium, in particular, to a document management system by which operations of decomposing a document consisting of a plurality of sections into the respective sections, which is treated as individual documents, and, then, coupling the thus-produced plurality of documents together into the original document can be performed.

2. Description of the Related Art

Recently, document data stored in a document management database is managed and manipulated as a result of the document management database belonging to a server computer connected to a network such as a LAN is accessed through a client computer also connected to the network.

FIG. 1 shows contents of display on a display monitor (CRT or the like) obtained as a result of an access being made to a document management database belonging to a server computer connected to a network from a client computer also connected to the network.

This page shown in FIG. 1 includes three regions (M1, V1 and V2), the region M1 displays a menu through which a user inputs instructions to the computer, the region V1 displays a data management tree (a tree-like structure of cabinets/folders) of the accessed document management database (document management 1), the region V2 displays documents (document 1 through document 8) stored in the cabinet or folder F1 selected from the region V1 by the user. The user uses a mouse or the like against the page to select a document/folder, perform dragging and dropping, and input instructions for various operations to the document management database by selecting (through a mouse click) menu buttons of the menu.

Specifically, as a result of a document manipulating client software installed in the client computer is started up, instructions are sent to a server software existing in the server computer from the client software in accordance with instructions by the user, and, accordingly, the server software processes data of the document management database.

However, in the above-described system, when a user accesses a plurality of different document management databases existing in a plurality of server computers, respectively, it is necessary to start up a plurality of document manipulating client software corresponding to the respective ones of the plurality of different document management databases. That is, a corresponding document manipulating client software 1 should be started up in order to access a document management database 1 existing in a server computer 1, and a corresponding document manipulating client software 2 should be started up in order to access a document management database 2 existing in a server computer 2.

Because respective document management databases are different in style of data storage (a tree-like storage style, a time-series storage style, and so forth), in interface (system/measure through which information is sent between the document manipulating client software and server software), in type of data handled (image data, numerical data, and so forth), it is not possible to access a document management database unless a document manipulating client software specifically designed for the document management database is used.

Such a phenomenon is the same as a phenomenon that, for example, where there are a database produced using the database software Access™ of Microsoft and a database produced using the database software Approach™ of Lotus, the Access cannot be used for accessing the database produced using the Approach, and, similarly, the Approach cannot be used for accessing the database produced using the Access.

Further, transferring data between different document management databases may not be achieved due to difference in software specifications.

FIG. 2 shows a state in which documents are managed by one example of document management software in the related art.

This document management software manages the documents by a tree hierarchical structure as shown in the figure. Information regarding the structure shown in the figure is stored in a predetermined recording medium orderly.

In this structure, first, roots for document management are provided, are branched into folders, subfolders, and, documents exists in each subfolder. One document consists of minimum units for document management, called sections, coupled to each other. Each section is a draft produced using a word processor, an image input using a scanner, and, thus, ones having different forms are allowed. These sections have the attribute of order or sequence in each document.

In general cases, each section comprises a unit of file (for example, a WORD™ (Microsoft) file, an EXCEL™ (Microsoft) file, or the like), and, is a minimum unit on an OS (operating system), and exists individually on the OS. These files cannot be coupled to each other so as to have a relationship therebetween on the OS unless they are collected in a unit of folder, or the like. However, there are cases where these are needed to be related to each other so as to be gathered, in view points of actual working by an operator and/or performing file management. For this purpose, a document management software is used for coupling a plurality of sections (files) into a form of 'document'.

Here, it is possible to name the above-mentioned folders, subfolders, documents and sections with names desired by an operator. However, it is standard that, in order to reduce a load borne by an operator, when sections are registered as a document, the name of each section is produced from the original file name of the section, and, a name of the document is produced from the name of the first section of the sections constituting the document.

One example of such document management software is 'Ridoc Desk Ver. 2.0', a product of the applicant.

However, in accordance with such a standard management system, a section name is produced from an original file name, and will not be changed. Thereby, when performing document coupling (gathering sections) and document decomposition (separation into particular sections), an operator has difficulty in recognizing which sections (documents) were coupled as the same document, and, thus, have a relationship previously.

In order to relating sections together, it can be considered to newly produce some section attribute so as to solve this problem. However, this method is not easy for an operator to recognize the relation, and, also, produces troublesome in management.

SUMMARY OF THE INVENTION

The present invention has been devised in consideration of the above-mentioned problems, and, an object of the present invention is to provide a system for connecting an application (user interface) to a plurality of different types of document management databases.

Another object of the present invention is to provide a system for making possible document manipulation without awareness of a type of a connected document management database when a document is manipulated using the application.

In order to achieve these objects, an integrating document management system according to the present invention comprises:

a plurality of databases;
a plurality of data processing parts provided for respective ones of the plurality of databases and processing data of the databases;
a user interface part providing an interface for a user; and
a connecting part for connection between the user interface part and plurality of data processing parts.

Thereby, it is possible to connect the user interface part (application, integrating document management software) to the plurality of (document management) databases through the connecting part, and to integrally manage and manipulate documents stored in the plurality of databases through the user interface part. Further, it is possible to move documents between different document management databases, and so forth.

The user interface part may comprise a display part displaying data concerning the plurality of databases; and an instructing part for the user to give instructions for processing data of the plurality of databases. Thereby, it is possible to manages and manipulate documents stored in the plurality of databases through the user interface part easily. Further, it is possible to move documents between different document management databases, and so forth easily.

The connecting parts corresponding to respective ones of the plurality of databases may have a standardized interface against the user interface part. Thereby, when documents stored in the plurality of document management databases are manipulated, it is possible to manipulate the documents without awareness of the types of the connected document management databases. Further, it is possible to design the user interface part without awareness of the types of the connected document management databases.

The user interface part may perform connection and disconnection of the connecting parts corresponding to respective ones of the plurality of databases. Thereby, it is possible to dynamically connect the user interface part to the document management databases and disconnects the user interface part from the document management databases through the connecting parts. Accordingly, it is possible that only document management databases used are connected to the user interface part, and only data concerning the connected document management databases is displayed.

The user interface part may obtain information indicating whether or not instructions for manipulating data of the databases are supported or allowed by the databases from the corresponding connecting parts, respectively. Thereby, it is possible to know whether or not instructions for manipulating data of the databases are supported or allowed by the databases, respectively, through the user interface part. Thus, it is possible to obtain information concerning data processing functions (capability) of respective ones of connected document management databases through the user interface part.

The user interface part may use graphic items representing data of the databases. Further, the user interface part may obtain graphic data used for displaying the graphic items representing data of the databases from the corresponding connecting parts, respectively. Thereby, when the plurality of document management databases are handled, it is possible to use graphic items (icons representing folders, thumbnails representing documents, and so forth) unique to the document management databases, and to achieve displays easily understandable by a user.

An information processing apparatus according to the present invention comprises:

a user interface part providing an interface for a user; and
a connecting part enabling connection between the user interface part and a plurality of data processing parts provided for respective ones of a plurality of databases and processing data of the databases.

Thereby, it is possible to connect the user interface part (application, integrating document management software) to the plurality of (document management) databases through the connecting part, and to integrally manage and manipulate documents stored in the plurality of databases through the user interface part. Further, it is possible to move documents between different document management databases, and so forth.

A computer-readable recording medium according to the present invention has programs recorded therein, the programs causing a computer to function as:

user interface means for providing an interface for a user; and
connecting means for enabling connection between the user interface means and a plurality of data processing means provided for respective ones of a plurality of databases and processing data of the databases.

Thereby, as a result of those programs being executed by the computer, it is possible to connect the user interface part (application, integrating document management software) to the plurality of (document management) databases through the connecting part, and to integrally manage and manipulate documents stored in the plurality of databases through the user interface part. Further, it is possible to move documents between different document management databases, and so forth.

The user interface means may comprise display means displaying data concerning the plurality of databases; and instructing means for the user to give instructions for processing data of the plurality of databases. Thereby, it is possible to manage and manipulate documents stored in the plurality of databases through the user interface means easily. Further, it is possible to move documents between different document management databases, and so forth easily.

The connecting means corresponding to respective ones of the plurality of databases may have a standardized interface against the user interface means. Thereby, when documents stored in the plurality of document management databases are manipulated, it is possible to manipulate the document without awareness of the types of the connected document management databases. Further, it is possible to design the user interface means without awareness of the types of the connected document management databases.

The user interface means may perform connection and disconnection of the connecting means corresponding to respective ones of the plurality of databases. Thereby, it is possible to dynamically connect the user interface part to the document management databases and disconnects the user interface part from the document management databases through the connecting parts. Accordingly, it is possible that only document management databases used are connected to the user interface part, and only data concerning the connected document management databases is displayed.

The user interface means may obtain information indicating whether or not instructions for manipulating data of the databases are supported or allowed by the databases from the corresponding connecting means, respectively. Thus, it is possible to obtain information concerning data processing functions (capability) of respective ones of connected document management databases, respectively, through the user interface part.

The user interface means may use graphic items representing data of the databases. Further, the user interface means may obtain graphic data used for displaying the graphic items representing data of the databases from the corresponding connecting means. Thereby, when the plurality of document management databases are handled, it is possible to use graphic items (icons representing folders, thumbnails representing documents, and so forth) unique to the document management databases, and to achieve displays easily understandable for a user.

Thus, by using the computer-readable recording medium according to the present invention, it is possible to cause a general-purpose computer (personal computer) to read and execute the programs therefrom and thereby, cause the computer to execute the various functions of the integrating document management system described above. As a result, the above-mentioned advantages can be obtained.

Another object of the present invention is to provide a document management system which makes possible easy recognition of relationship between a plurality of sections (documents) in a case where a document consisting of the plurality of sections is decomposed into respective individual sections (documents).

In order to achieve the object, an document management system according to the present invention comprises:
a managing part managing a plurality of documents each comprising one or a plurality of sections; and
a part creating a name of each section of plurality of sections of a document, said name comprising a name of the document.

A document management method according to the present invention comprises the steps of:
managing a plurality of documents each comprising one or a plurality of sections; and
creating a name of each section of plurality of sections of a document, said name comprising a name of the document.

A computer-readable recording medium according to the present invention has programs recorded therein, the programs causing a computer to function as:
means for managing a plurality of documents each comprising one or a plurality of sections; and
means for creating a name of each section of plurality of sections of a document, said name comprising a name of the document.

In this configuration, names of sections included in a document are changed into ones each including a name of the document. Thereby, when the document (source document) is decomposed into ones each including a respective one of the sections, it is easy to understand the source document of the resulting documents from the names of their sections, and, thereby, convenientity of document management can be improved.

This system may further comprise:
a specifying part for an operator to specify an index type,
wherein the name creating part creates a name of each section, said name comprising the name of the document and an index having an attribute of order and of a type specified through the specifying part.

The method may further comprises the step of:
specifying an index type,
wherein the name changing step changing a name of each section, said name comprising the name of the document and an index having an attribute of order and of a type specified by the specifying step.

The recording medium as claimed may further have a program recorded therein, the program causing the computer to further function as:
means for specifying an index type,
wherein the name creating means creates a name of each section, said name comprising the name of the document and an index having an attribute of order and of a type specified by the specifying means.

In this configuration, operations performed by an operator trigger creation of section names each comprising the name of the source document and an index having an attribute of order and of a type specified by the operator is used.

In this configuration, in comparison to a case where an index of system default is used, it is possible to improve work efficiency because an index of a type intended by an operator.

The system may further comprise:
a selecting part for an operator to select an index type from a list of index types,
wherein the name creating part creates a name of each section, said name comprising the name of the document and an index having an attribute of order and of a type selected through the selecting part.

The method may further comprises the step of:
selecting an index type from a list of index types,
wherein the name creating step creates a name of each section, said name comprising the name of the document and an index having an attribute of order and of a type selected by the selecting step.

The recording medium may further have a program recorded therein, the program causing the computer to further function as:
means for selecting an index type from a list of index types,
wherein the name creating means creates a name of each section, said name comprising the name of the document and an index having an attribute of order and of a type selected by the selecting means.

In this configuration, an operator previously registers types of index, then, selects one therefrom, and section names are created in accordance with the selected type of index. Thereby, in comparison to a case where an operator should input a type of index each time the naming function is executed, it is possible to improve work efficiency.

The system may further comprises:
a setting part setting instructions for changing names of sections when documents are coupled
wherein the name changing part changes a name of each section of plurality of sections of a document into a name comprising a name of the document obtained from coupling of documents when the instructions for changing names of sections when documents are coupled are set by the setting part.

The method may further comprises the step of:
setting instructions for changing names of sections when documents are coupled, wherein the name changing step changes a name of each section of plurality of sections of a document into a name comprising a name of the document obtained from coupling of documents when the instructions for changing names of sections when documents are coupled are set through the setting step.

The recording medium may further have a program recorded therein, the program causing the computer to further function as:

means for setting instructions for changing names of sections when documents are coupled, wherein the name changing means changes a name of each section of plurality of sections of a document into a name comprising a name of the document obtained from coupling of documents when the instructions for changing names of sections when documents are coupled are set through the setting means.

In this case, in comparison to a case where a special operation for creating/changing section names should be performed by an operator after documents are coupled, the section names are automatically created/changed into ones each comprising the document name and an index. Thereby, it is not necessary for the operator to perform the special operation each time the naming function is executed, and to improve work efficiency.

A document management system according to another aspect of the present invention comprises:

a managing part managing a plurality of documents each comprising one or a plurality of sections; and a naming part naming each document obtained from decomposing a source document using a name of a section of the document obtained from decomposing the source document, where the name of the section comprises a name of the source document and an index having an attribute of order.

A document management method according to another aspect of the present invention comprises the steps of:

managing a plurality of documents each comprising one or a plurality of sections; and naming each document obtained from decomposing a source document using a name of a section of the document obtained from decomposing the source document, where the name of the section comprises a name of the source document and an index having an attribute of order.

A compute-readable recording medium according to another aspect of the present invention have programs recorded therein, the programs causing a computer to function as:

means for managing a plurality of documents each comprising one or a plurality of sections; and means for naming each document obtained from decomposing a source document using a name of a section of the document obtained from decomposing the source document, where the name of the section comprises a name of the source document and an index having an attribute of order.

In this configuration, documents resulting from decomposing a source document are named with names of sections of the respective resulting documents. There, it is assumed that the names of the sections of the source document are those each comprising the name of this document and an index, as mentioned above. Thereby, after the source document is decomposed into division documents each comprising a section, it is possible to know the source document of each division document from the name of the division document. Thereby, it is possible to improve work efficiency.

A document management system according to another aspect of the present invention comprises:

a managing part managing a plurality of documents each comprising one or a plurality of sections; and a searching part searching for documents using a type of index, where each document has a name comprising an index having an attribute of order.

A document management method according to another aspect of the present invention comprises the steps of:

managing a plurality of documents each comprising one or a plurality of sections; and searching for documents using a type of index, where each document has a name comprising an index having an attribute of order.

A compute-readable recording medium according to another aspect of the present invention have programs recorded therein, the programs causing a computer to function as:

means for managing a plurality of documents each comprising one or a plurality of sections; and means for searching for documents using a type of index, where each document has a name comprising an index having an attribute of order.

In this configuration, documents are searched for using the type of index indicating an attribute of order. Thereby, it is possible to search for documents having different types of index separately. Thereby, it is possible to improve convenientity of document management.

The system may further comprise:

a specifying part for an operator to specify a name indicating an attribute of document and a type of index, wherein the searching part perform search in accordance with an item specified through the specifying part.

The method may further comprises the step of:

specifying a name indicating an attribute of document and a type of index, wherein the searching step performs search in accordance with an item specified through the specifying step.

The recording medium may further have a program recorded therein, the program causing a computer to function as:

means for specifying a name indicating an attribute of document and a type of index, wherein the searching means performs search in accordance with an item specified through the specifying means.

In this configuration, an operator specify a name indicating an attribute of document and a type of index. Thereby, it is possible for the operator to search for documents having an arbitrary name indicating an attribute of document and an arbitrary type of index even when the documents obtained from decomposition are dispersed into complexity with other non-relevant documents.

The system may further comprise:

a dividing part dividing a document name into an index and the remainder, wherein the searching part performs search in accordance with an item obtained from the dividing part.

The method may further comprises the step of:

dividing a document name into an index and the remainder, wherein the searching step performs search in accordance with an item obtained from the dividing part.

The recording medium may further have a program recorded therein, the program causing a computer to further function as:

means for dividing a document name into an index and the remainder, wherein the searching means performs search in accordance with an item obtained from the dividing means.

In this configuration, as a result of an input document name is automatically divided into an index and the remainder, and the type of the index and the remainder (as a name indicating the contents of the document) are used for the document search, an operator should not input such data for document search. Thus, it is possible to improve work efficiency.

The system may further comprise:

a sorting part sorting names of the documents obtained from the searching part in order of index; and a coupling part coupling the documents in order of the result obtained from the sorting part.

The method may further comprises the steps of:

sorting names of the documents obtained from the searching part in order of index; and coupling the documents in order of the result obtained from the sorting step.

The recording medium may further have programs recorded therein, the programs causing the computer to further function as:

means for sorting names of the documents obtained from the searching means in order of index; and means for coupling the documents in order of the result obtained from the sorting means.

Thereby, the documents obtained from the search are sorted in order of index, and are coupled in the order of the sort results. As a result, the resulting document has the sections arranged in the correct order therein. Thereby, it is possible to improve work efficiency.

The system may further comprise:

a naming part naming the document obtained from the coupling part using the remainder of deletion of the index from a name of a section included in the document.

The method may further comprise the step of:

naming the document obtained from the coupling step using the remainder of deletion of the index from a name of a section included in the document.

The recording medium may further have a program recorded therein, the program causing the computer to further function as:

means for naming the document obtained from the coupling means using the remainder of deletion of the index from a name of a section included in the document.

Thereby, when a resulting document includes sections 'PATENT-1', 'PATENT-2' and 'PATENT-3', and, thereby, has the document name 'PATENT-1' as a result of the name of the first section being used, this name is automatically changed into 'PATENT' (the remainder of deletion of the index '-1'). Thus, the proper naming is made, and convenientity of document management is improved.

An integrating document management system according to another aspect of the present invention comprises:

a managing part managing a plurality of documents managed by a plurality of databases, respectively, each document comprising one or a plurality of sections; and a part changing a name of each section of plurality of sections of a document into a name comprising a name of the document.

An integrating document management system according to another aspect of the present invention comprises:

a managing part managing a plurality of documents managed by a plurality of databases, respectively, each document comprising one or a plurality of sections; and a naming part naming each document obtained from decomposing a source document using a name of a section of the document obtained from decomposing the source document, where the name of the section comprises a name of the source document and an index having an attribute of order.

An integrating document management system according to another aspect of the present invention comprises:

a managing part managing a plurality of documents managed by a plurality of databases, respectively, each document comprising one or a plurality of sections; and a searching part searching for documents using a type of index, where each document has a name comprising an index having an attribute of order.

An integrating document management method according to another aspect of the present invention comprises the steps of:

managing a plurality of documents managed by a plurality of databases, respectively, each document comprising one or a plurality of sections; and changing a name of each section of plurality of sections of a document into a name comprising a name of the document.

An integrating document management method according to another aspect of the present invention comprises the steps of:

managing a plurality of documents managed by a plurality of databases, respectively, each document comprising one or a plurality of sections; and naming each document obtained from decomposing a source document using a name of a section of the document obtained from decomposing the source document, where the name of the section comprises a name of the source document and an index having an attribute of order.

An integrating document management method according to another aspect of the present invention comprises the steps of:

managing a plurality of documents managed by a plurality of databases, respectively, each document comprising one or a plurality of sections; and searching for documents using a type of index, where each document has a name comprising an index having an attribute of order.

A computer-readable recording medium according to another aspect of the present invention has programs recorded therein, the programs causing a computer to function as:

means for managing a plurality of documents managed by a plurality of databases, respectively, each document comprising one or a plurality of sections; and means for changing a name of each section of plurality of sections of a document into a name comprising a name of the document.

A compute-readable recording medium according to another aspect of the present invention has programs recorded therein, the programs causing a computer to function as:

means for managing a plurality of documents managed by a plurality of databases, respectively, each document comprising one or a plurality of sections; and means for naming each document obtained from decomposing a source document using a name of a section of the document obtained from decomposing the source document, where the name of the section comprises a name of the source document and an index having an attribute of order.

A compute-readable recording medium according to another aspect of the present invention has programs recorded therein, the programs causing a computer to function as:

means for managing a plurality of documents managed by a plurality of databases, respectively, each document comprising one or a plurality of sections; and means for searching for documents using a type of index, where each document has a name comprising an index having an attribute of order.

Thereby, the above-described respective functions can be achieved even in a case where documents managed by a plurality of databases are integrally managed, and, as a result, even in a distributed database environment, efficiency in document management can be improved, and it is possible to efficiently manage documents through a plurality of distributed databases.

Other objects and further features of the present invention will become more apparent from the following detailed description when read in conjunction with the accompanying drawings.

BRIEF DESCRIPTION OF THE DRAWINGS

FIGS. 7A and 7B show data managed by a display data managing part of the integrating document management software;

FIG. 8 shows data managed by a connected document management database managing part of the integrating document management software;

FIG. 12 shows a list of instructions implemented in each document management control program;

FIGS. 18A, 18B and 18C show data indicating whether or not instructions are executable, which is previously set in each document management connecting program;

DETAILED DESCRIPTION OF THE PREFERRED EMBODIMENTS

An integrating document management system in a first embodiment of the present invention will now be described.

Figure 1:
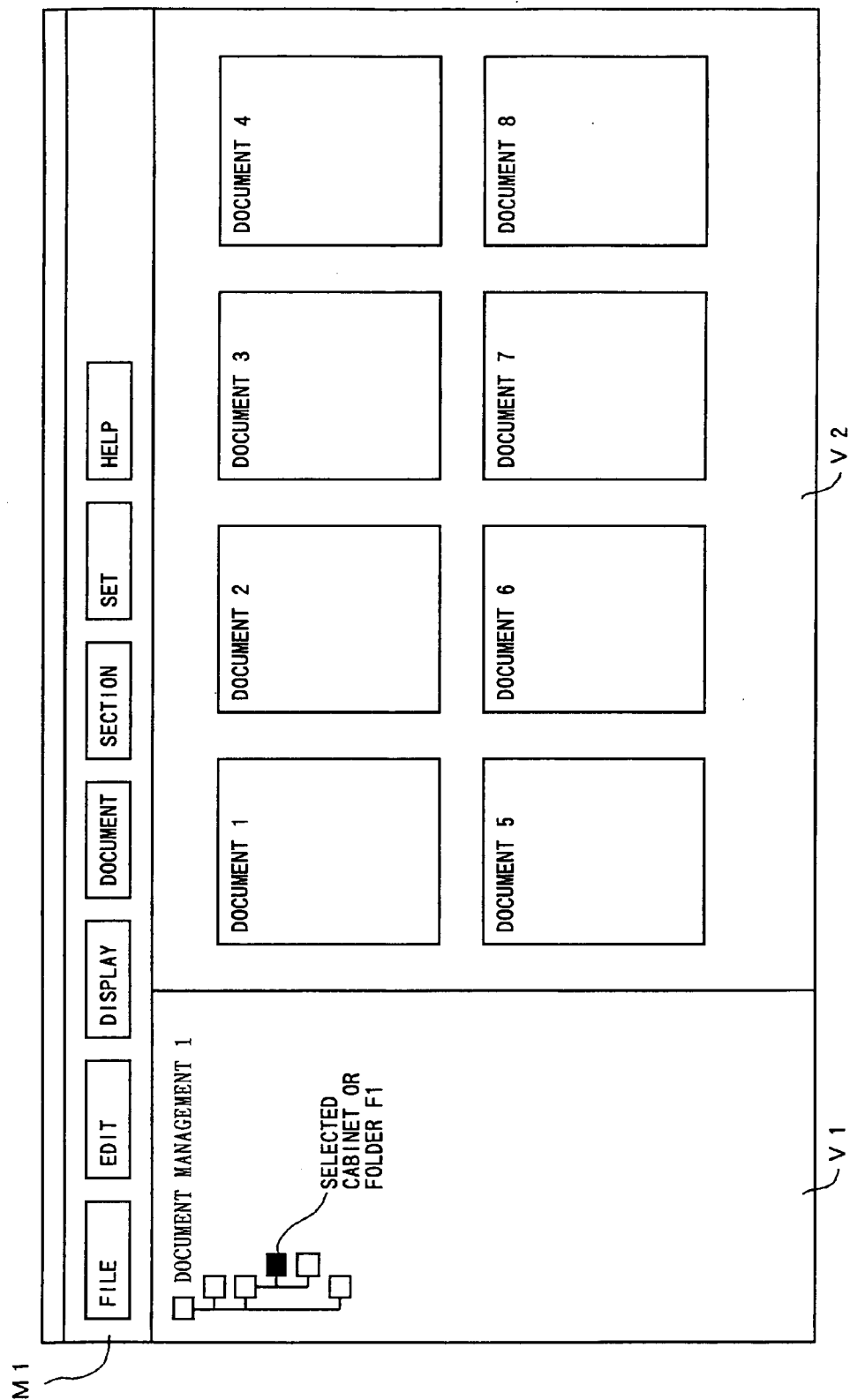
FIG. 1 shows an example of display contents of a screen of a client computer in the related art.
Figure 2:
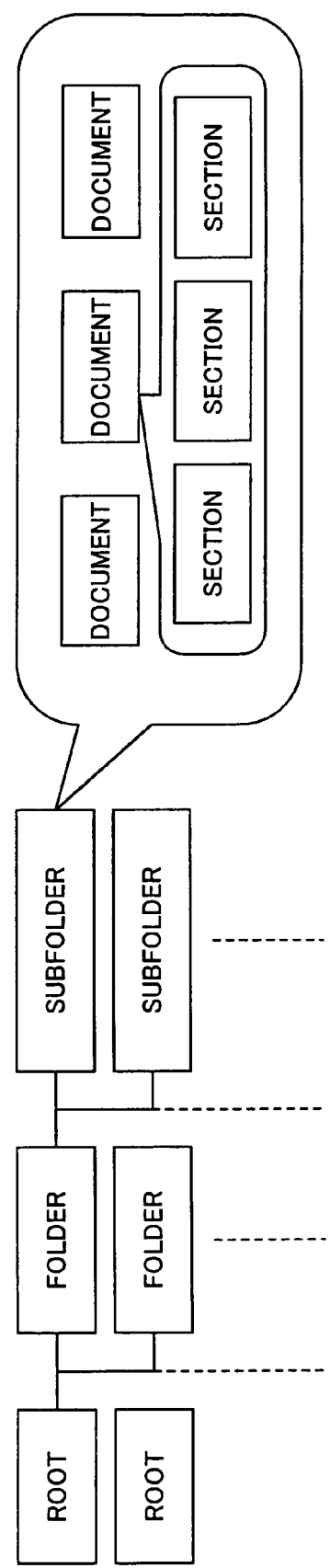
FIG. 2 shows an example of a state of document management in the related art.
Figure 3:
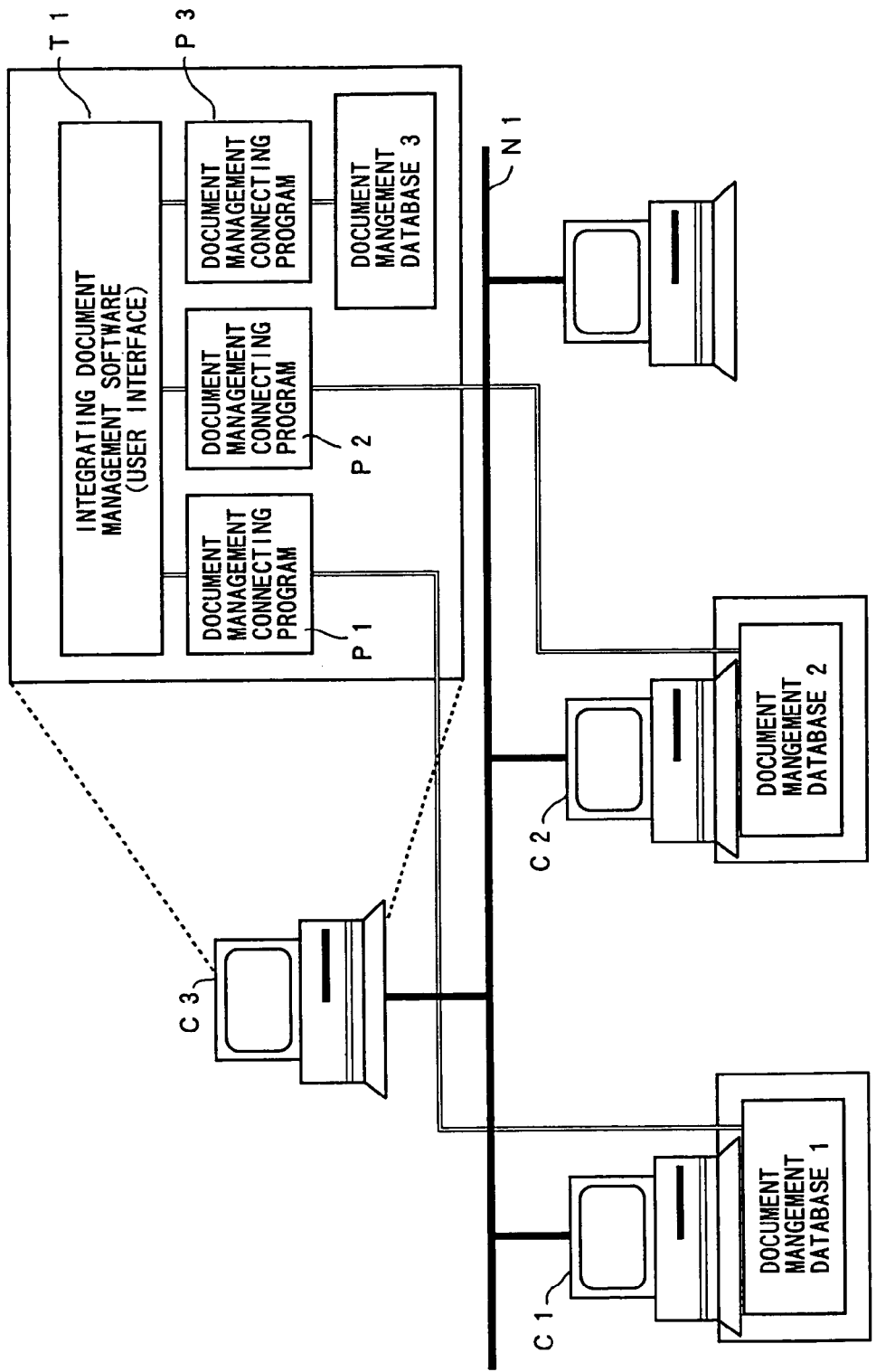
FIG. 3 shows an example of a system configuration of a first embodiment of the present invention.

FIG. 3 shows an example of a system configuration of the integrating document management system in the first embodiment of the present invention.

In this system, a plurality of computers C1 (server computer), C2 (server computer) and C3 (client computer) are connected to a network N1 (for example, a LAN). A document management database 1 exists in the computer C1, a document management database 2 exists in the computer C2 and a document management database 3 exists in the computer C3. Each of the document management databases 1, 2 and 3 has server software which is used for processing data of its own database. The computers C1, C2 and C3 are connected with each other through the network N1.

The computer C3 has an integrating document management software (user interface) T1 and document management connecting programs P1, P2 and P3 installed therein. It is possible to access the document management database 1 of the computer C1 through the document management connecting program P1 using the integrating document management software T1. Similarly, it is possible to access the document management database 2 of the computer C2 through the document management connecting program P2 using the integrating document management software T1. Similarly, it is possible to access the document management database 3 of the computer C3 through the document management connecting program P3 using the integrating document management software T1.

The integrating document management software T1 and respective document management connecting programs P1, P2 and P3 are stored in a storage device such as a hard disk drive (see FIG. 24) and so forth of the client computer C3. As a result of respective instructions thereof being executed by the CPU (see FIG. 24) of the client computer C3, the integrating document management software T1 and respective document management connecting programs P1, P2 and P3 perform processing using a memory (see FIG. 24) such as a ROM, a RAM and so forth of the client computer C3, under control and management by the OS (operating system) installed in the client computer C3. The server software and database of each of the document management databases 1, 2 and 3 are stored in a storage device such as a hard disk drive and so forth of a respective one of the computers (server computers C1, C2 and client computer C3). As a result of respective instructions thereof being executed by the CPU of a respective one of the computers C1, C2 and C3, each server software performs processing using the memory such as a ROM, a RAM and so forth of the respective one of the computers C1, C2 and C3, under control and management by the OS installed in the respective one of the computers C1, C2 and C3.

It is necessary to be limited to the above-mentioned example of configuration. The present invention may also be applied to another example of system configuration in which further many client computers, server computers are connected to the network, the document management database, integrating document management software, document management connecting programs exist in each client computer, and the document management database exists in each server computer, another example of system configuration in which only the integrating document management software and document management connecting programs exist but no document management databases exist in each client computer, and so forth.

Figure 4:
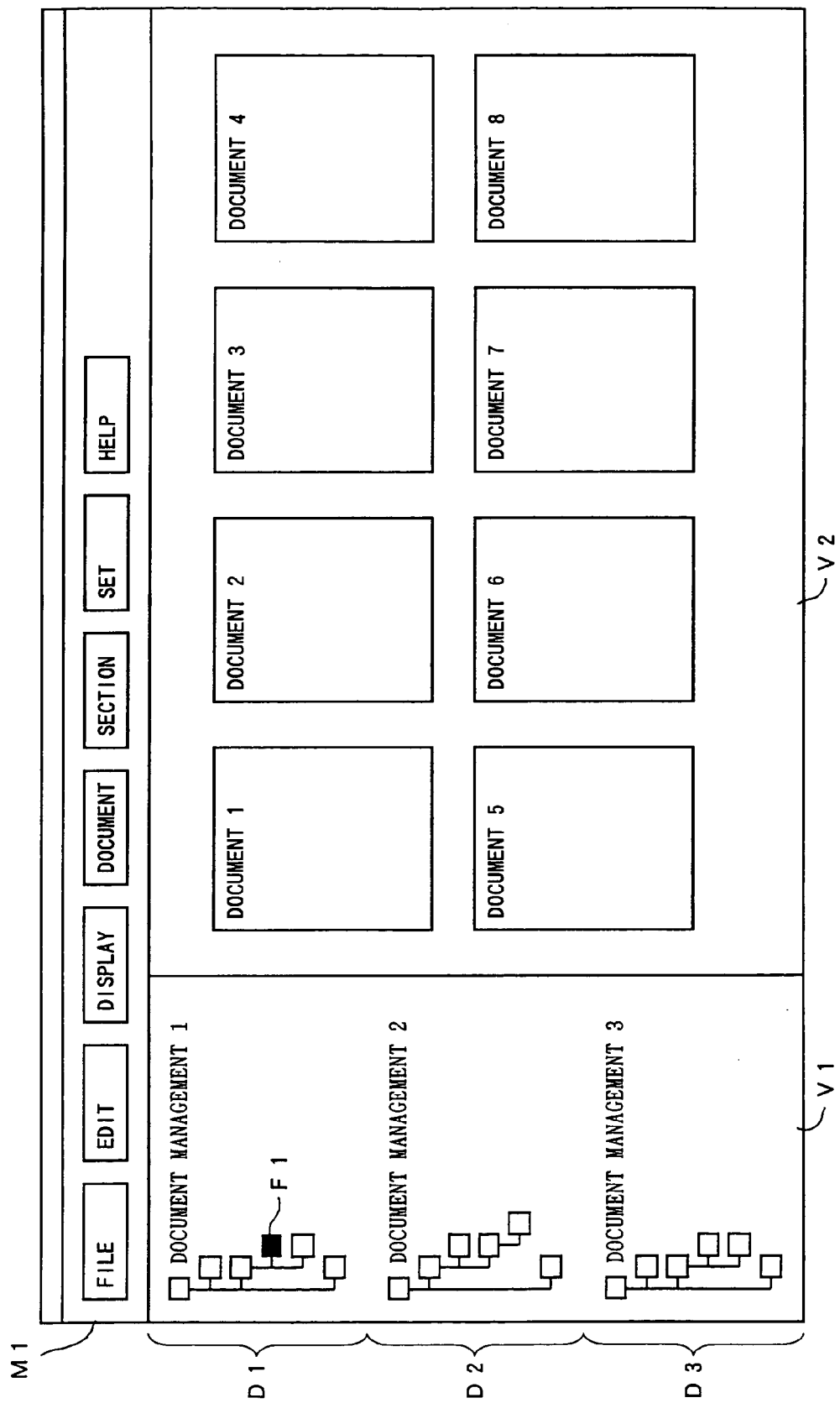
FIG. 4 shows an example of display contents of a screen of a client computer in the first embodiment of the present invention.

FIG. 4 shows an example of contents of display on the display monitor (CRT or the like) of the client computer C3.

This page shown in FIG. 4 includes three regions (M1, V1 and V2), the regions M1 displays a menu through which a user inputs instructions to the computer, the region V1 displays a data management tree (a tree-like structure of cabinets/folders) D1 of the accessed document management database 1, a data management tree D2 of the accessed document management database 2 and a data management tree D3 of the accessed document management database 3. The region V2 displays documents (document 1 through document 8) stored in the cabinet or folder F1 selected from the region V1 by the user. The user uses a mouse or the like against the page to select a document/folder, perform dragging and dropping, and input instructions for various operations to the document management databases by selecting (through a mouse click) menu buttons of the menu. By using the integrating document management software T1, it is possible to manipulate data of the document management databases 1, 2 and 3 through the document management connecting programs P1, P2 and P3 in accordance with instructions given by the user.

Each of the document management programs P1, P2 and P3 has a common interface against the integrating document management software T1. That is, common instructions such as a "CopyDocuments" instruction used for copying a document, a "MoveDocuments" instruction used for moving a document and so forth are implemented in each of the document management programs P1, P2 and P3. Further, documents and folders (cabinets) handled by the integrating document management software T1 have ID numbers attached thereto by the document management connecting programs P1, P2 and P3, and, when instructions are given from the integrating document management software T1 to the document management connecting programs P1, P2 and P3, the ID numbers are specified to identify documents/folders (see FIG. 12).

Each document management connecting program (for example, P2) converts (translates) instructions such as "CopyDocuments" given by the integrating document management software T1 into a set of instructions so as to adapt the instructions from the integrating document management software T1 to the interface specifications of the document management database (in this example, 2) to which the document management connecting program is connected, and, then, manipulates the document management database (in this example, 2) with the thus-obtained set of instructions.

Figure 5:
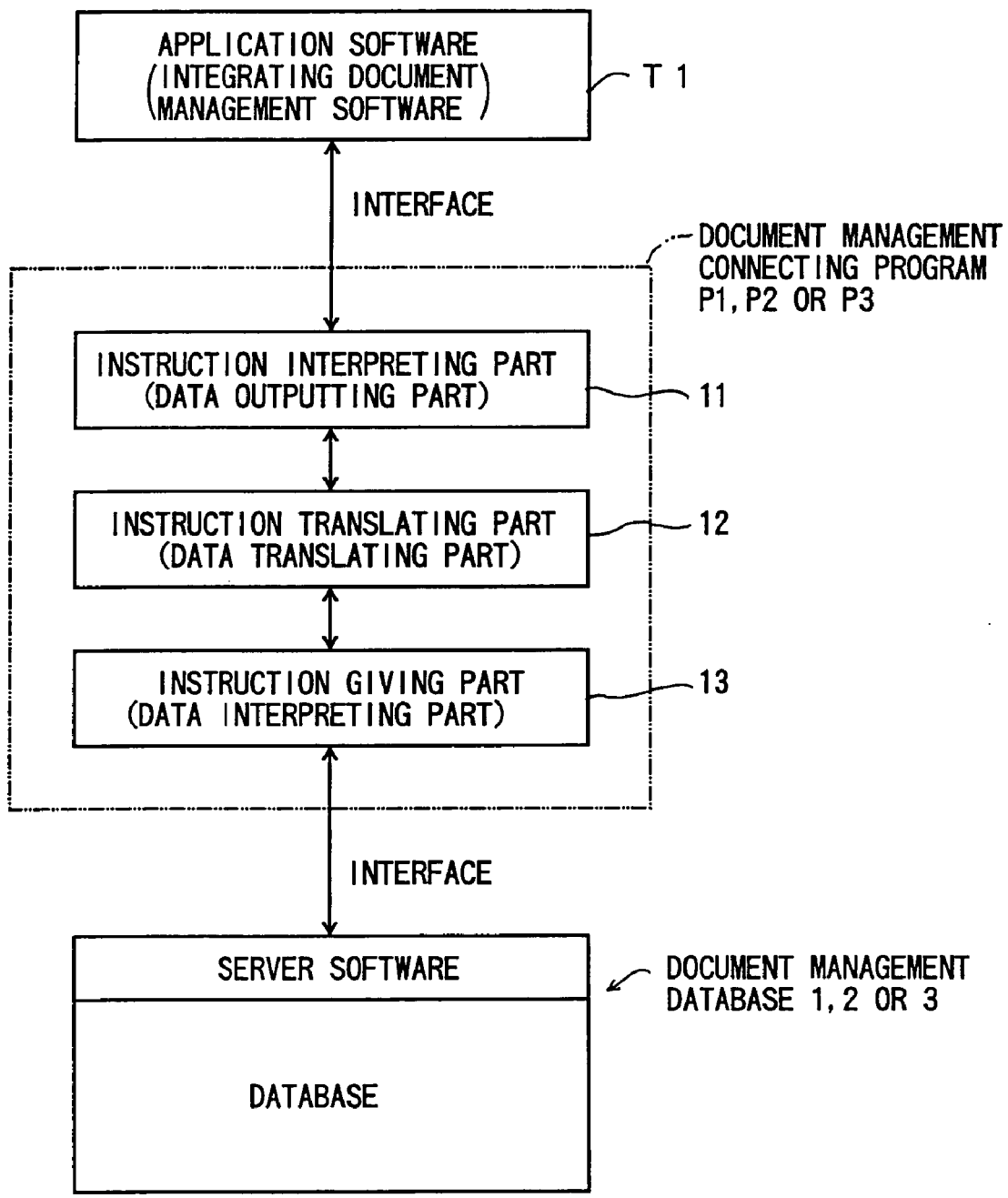
FIG. 5 is a block diagram showing a configuration of each document management connecting program in the first embodiment of the present invention.

FIG. 5 shows a general functional block diagram of each of the document management connecting programs P1, P2 and P3.

Each document management connecting program includes an instruction interpreting part 11, an instruction translating part 12 and an instruction giving part 13.

The instruction interpreting part 11 has a function of interpreting instructions given by the integrating document management software T1, and giving the interpreted results to the instruction translating part 12. The instruction translating part 12 has a function of using the interpreted results given by the instruction interpreting part, and translating the given instructions into a set of instructions for the document management database (1, 2 or 3) to which the document management connecting program is connected so as to adapt them for the specifications of the interface of that document management database. The instruction giving part 13 has a function of using the set of instructions so as to give instructions to the server software of the document management database. Thus, what each document management connecting program is directly connected to is the server software of the respective one of the document management databases.

The instruction giving part 13 further has a function of a data interpreting part for interpreting received data, and gives the interpreted results to the instruction translating part 12, when each document management connecting program receives the data from the corresponding document management database to which the document management connecting program is connected. The instruction translating part 12 has a function of a data translating part, and, thereby, in this case, transforms (translates) the received data into data for the integrating document management software T1 so as to adapt the data for the specifications of the interface of the integrating document management software T1, and providing the transformed results to the instruction interpreting part 11. The instruction interpreting part 11 has, in this case, a function of a data outputting part, and, thereby, in this case, provides the data of the transformed results to the integrating document management software T1. For example, when the data received from the document management database is data having a data storage style in accordance with that database, the data storage style being such that folders are arranged in time series, the document management connecting program transforms, thus rearranges the data of this data storage style into data of a tree-structure storage style based on year/month/day of the data, and provides the resulting data to the integrating document management software T1.

Figure 6:
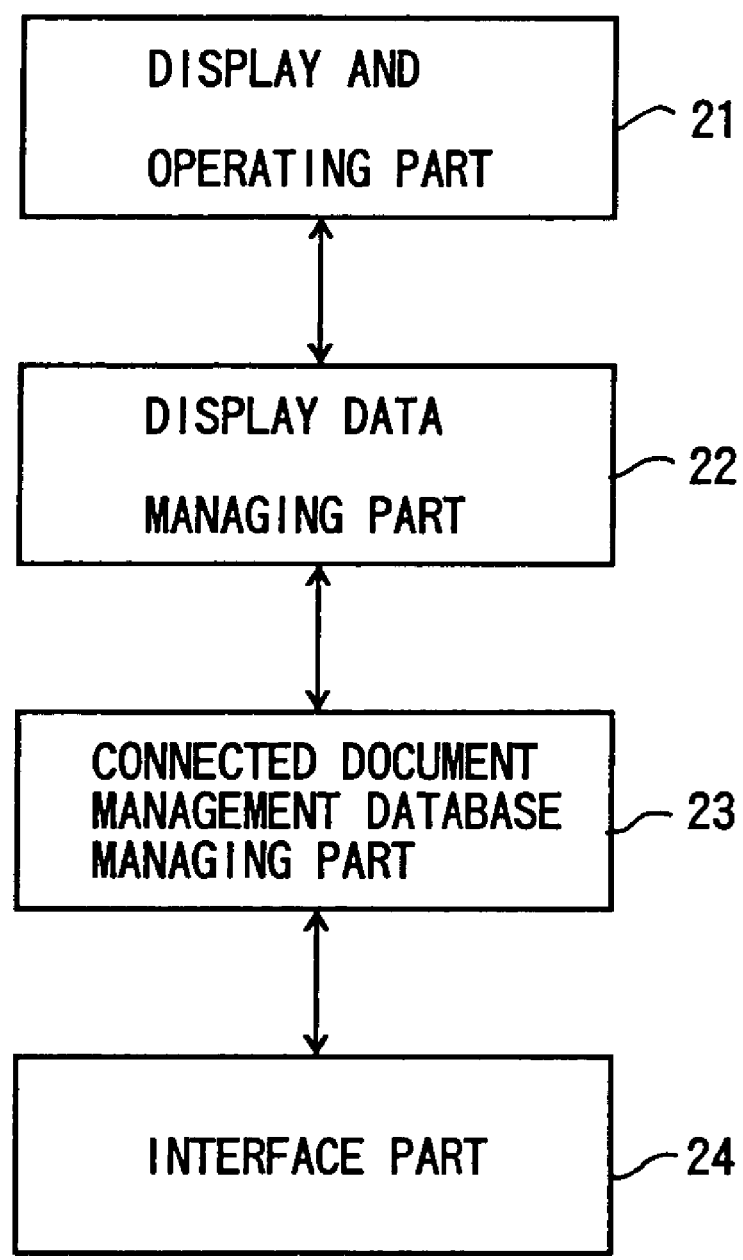
FIG. 6 is a block diagram showing a configuration of an integrating document management software in the first embodiment of the present invention.

FIG. 6 shows a general functional block diagram of the integrating document management software T1.

The integrating document management software T1 includes a display and operation part 21, a display data managing part 22, a connected document management database managing part 23, and an interface part 24.

The display and operation part 21 displays data managed by the display data managing part 22 on the display monitor of the client computer C3, and receives instructions from a user through input devices such as a mouse, a keyboard and so forth. The display data managing part 22 manages data to be displayed on the display monitor of the client computer C3. The connected document management database managing part 23 manages the document management connecting programs which are connected to the integrating document management software T1, that is, are loaded in the memory and used by the integrating document management software T1. The interface part 24 manages communication between the integrating document management software T1 and the connected document management connecting programs.

FIGS. 7A and 7B show data managed by the display data managing part 22.

FIG. 7A shows data to be displayed in the region V1 of the page displayed on the display monitor of the client computer C3. Thus, data concerning folders (IDs of the folders, names of the folders, and icons of the folders) of the document management databases 1, 2 and 3 connected to the integrating document management software T1 through the document management connecting programs P1, P2 and P3 is managed for each folder, and is managed for each document management database. FIG. 7B shows data to be displayed on the region V2 of the page displayed on the display monitor of the client computer C3. Thus, data concerning documents (IDs of the documents, names of the documents, the number of pages of each document and thumbnails of the documents) stored in the folders selected by a user from the folders displayed in the region V1 of the page is managed for each document.

FIG. 8 shows data managed by the connected document management database managing part 23.

There, data concerning the document management data bases 1, 2 and 3 (names of the databases and IDs of the databases) connected to the integrating document management software T1 through the document management connecting programs P1, P2 and P3 is managed for each of the document management databases 1, 2 and 3.

Figure 9:
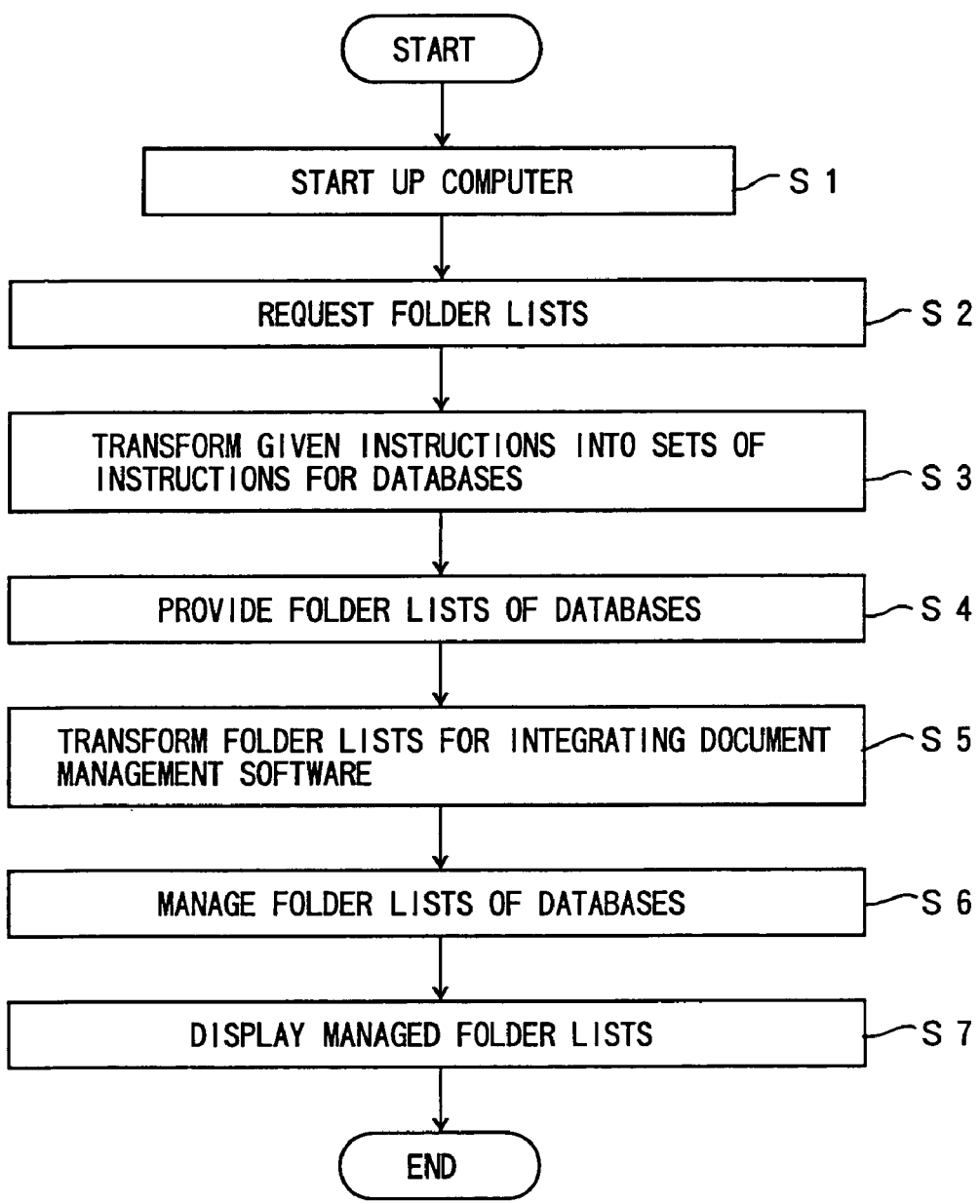
FIG. 9 shows a flow chart illustrating operations of displaying data in a region V1 of the screen of the client computer.

FIG. 9 shows a flow chart of operations for displaying data in the region V1 of the page displayed on the display monitor of the client computer C3.

First, when the client computer C3 is started up in a step S1 (the term 'step' being omitted hereinafter), the display data managing part 22 of the integrating document management software T1 requests the respective document management connecting programs P1, P2 and P3 data indicating the lists of folders in S2. Then, in S3, the document management connecting programs P1, P2 and P3 transform the thus-given folder list data requesting instructions into corresponding sets of instructions so as to adapt the given instructions for the specifications of the respective interfaces of the document management databases 1, 2 and 3, and give the sets of instructions to the respective document management databases 1, 2 and 3. For example, the document management connecting program P2 transforms the thus-given folder list data requesting instructions into corresponding set of instructions so as to adapt the given instructions for the specifications of the respective interface of the connected corresponding document management database 2, and give the set of instructions to the document management databases 2.

Then, in S4, in accordance with the given set of instructions, the server software of each of the document management databases 1, 2 and 3 provides data of the list of folders stored in the respective one of the document management databases 1, 2 and 3 to the respective one of the corresponding connected document management connecting programs P1, P2 and P3. Then, in S5, the respective document management connecting programs P1, P2 and P3 transform the data of the lists of folders into corresponding data so as to adapt it for the specifications of the interface of the integrating document management software T1, and provides the thus-obtained data to the integrating document management software T1. In S6, the display data managing part 22 of the integrating document management software T1 manages the data of lists of folders provided from the respective document management connecting programs P1, P2 and P3 (see FIG. 7A). In S7, the display and operation part 21 displays the lists of folders (management trees) D1, D2 and D3 of the respective document management databases 1, 2 and 3 managed by the display data managing part 22 in the region V1 of the page displayed on the display monitor of the client computer C3 (see FIG. 4).

Figure 10:
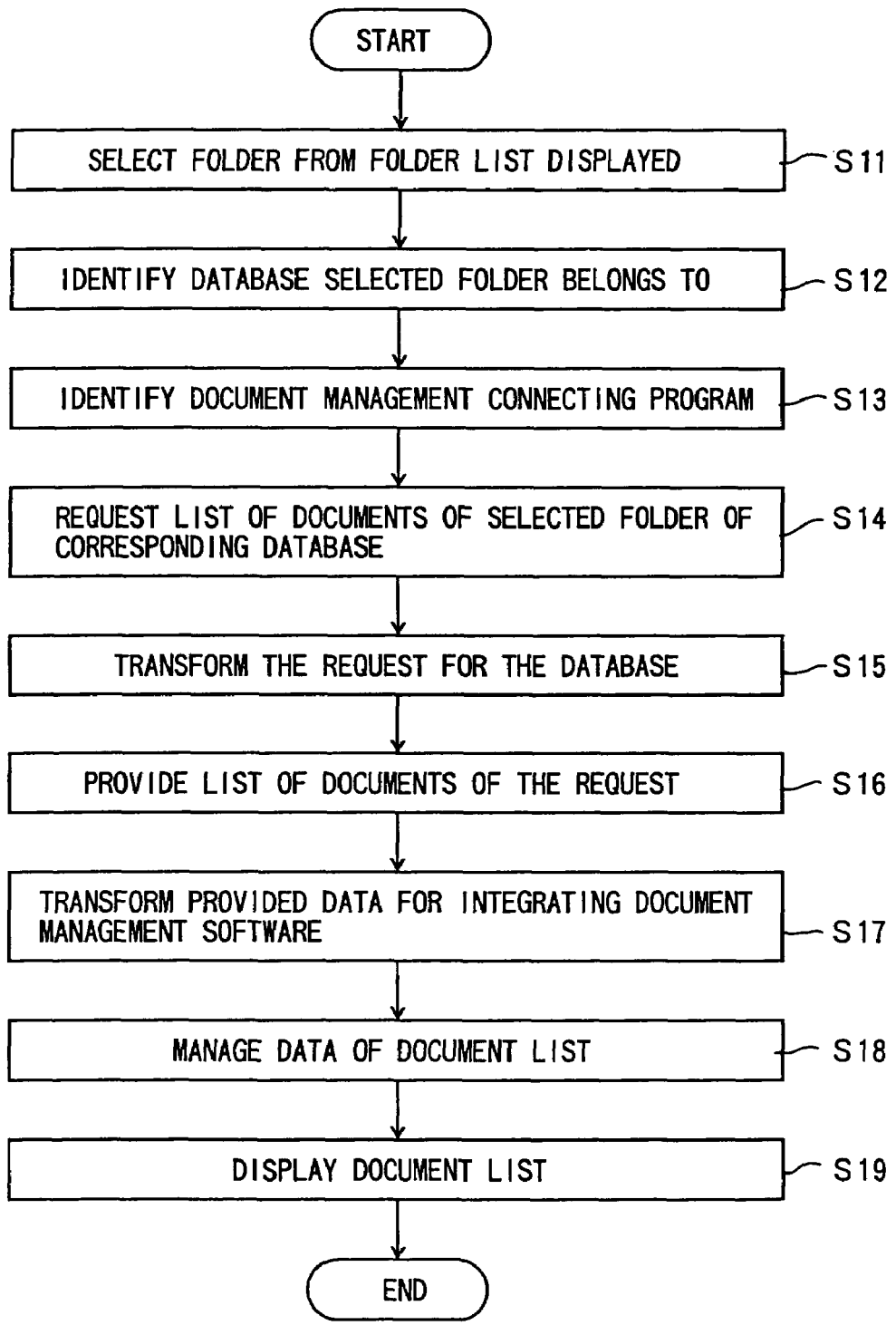
FIG. 10 shows a flow chart illustrating operations of displaying data in a region V2 of the screen of the client computer.

FIG. 10 shows a flow chart of operations for displaying data in the region V2 of the page displayed on the display monitor of the client computer C3.

First, in S11, a user selects an arbitrary folder from the lists of folders of the respective document management databases 1, 2 and 3 displayed in the region V1 of the page displayed on the display monitor of the client computer C3 through a mouse click or the like (for example, selects a folder in the document management database 2). Then, in S12, the display data managing part 22 of the integrating document management software T1 identifies the document management database to which the folder selected by the user belongs from the data of lists of folders managed by this part 22 (in this example, identifies the document management database 2).

Then, in S13, the connected document management database managing part 23 identifies the document management connecting program which connects the document management database identified in S12 to the integrating document management software T1 (in this example, identifies the document management connecting program P2) from the data, managed by this part 23, of the respective document management databases 1, 2 and 3 and document management connecting programs P1, P2 and P3 which connect them to the integrating document management software T1. Then, in S14, the display data managing part 22 requests the document management connecting program (in this example, the document management program P2) the data indicating the list of documents stored in the folder selected in S11 of the document management database (in this example, the document management database 2) identified in S13.

Then, in S15, the document management connecting program (in this example, the document management connecting program P2) that is requested the data of list of documents of this folder transforms the instructions of this request into the corresponding set of instructions so as to adapt the given instructions of the request for the specifications of the interface of the corresponding document management database (in this example, the document management database 2) connected by this document management connecting program, and gives the set of instructions to the document management database. In S16, in accordance with the thus-given set of instructions, the server software of the document management database (in this example, the document management database 2) which has received the set of instructions obtains from its own database and provides the data indicating the list of documents stored in the requested folder to the document management connecting program (in this example, the document management connecting program P2).

Then, in S17, the document management connecting program (in this example, the document management connecting program P2) which has received the data indicating the list of documents of the folder transforms the data into corresponding data so as to adapt the received data for the specifications of the interface of the integrating document management software T1, and provides the thus-obtained data to the integrating document management software T1. In S18, the display data managing part 22 manages the thus-provided data (see FIG. 7B). Then, in S19, the display and operation part 21 displays the data of the list of documents thus managed by the display data managing part 22 in the region V2 of the page displayed on the display monitor of the client computer C3.

Figure 11:
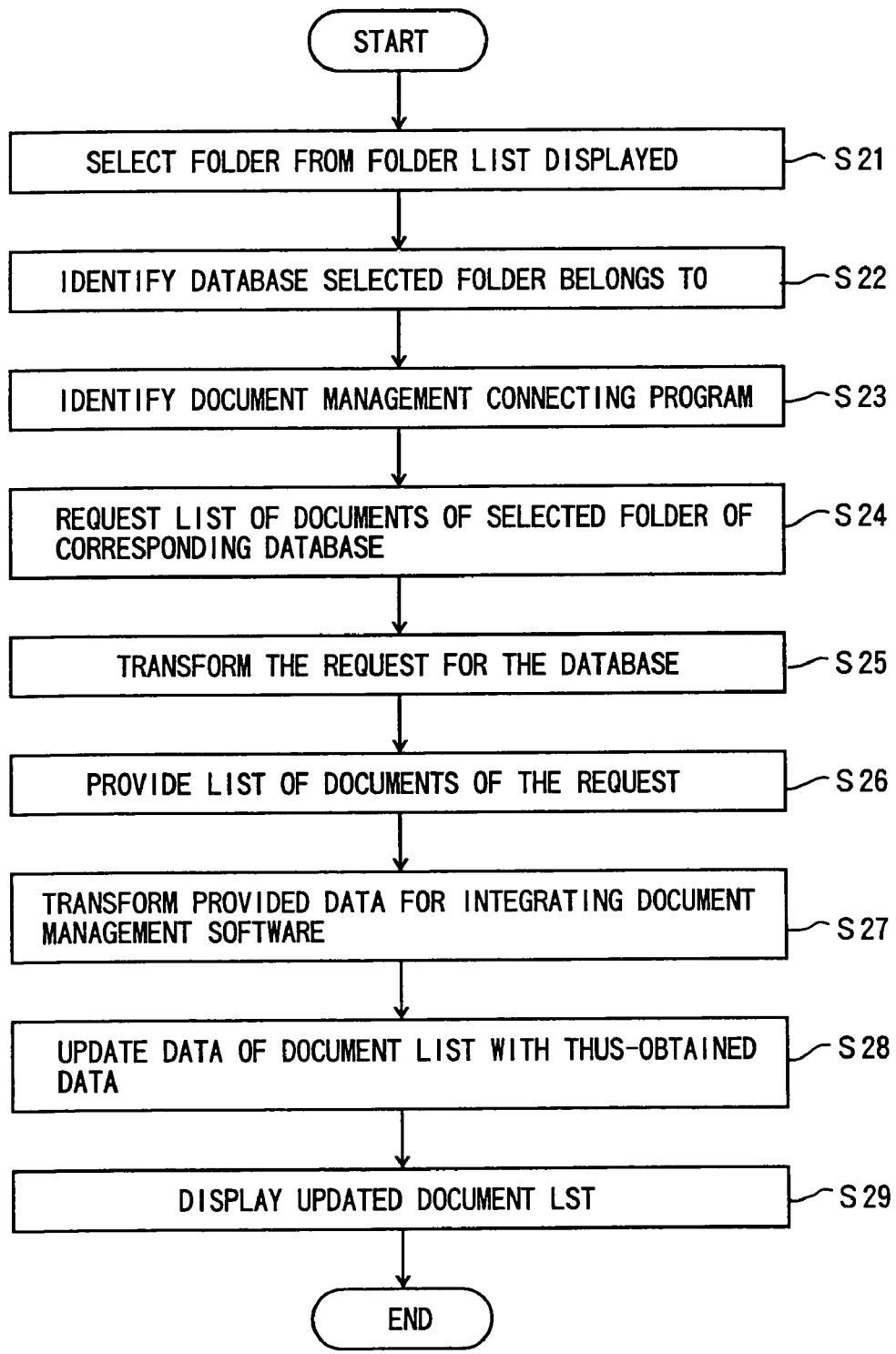
FIG. 11 shows a flow chart illustrating operations of updating data in a region V2 of the screen of the client computer.

FIG. 11 shows a flow chart of operations for updating the data of the list of documents displayed in the region V2 of the client computer C3 (for example, the displayed contents of the region V2 of the page displayed on the display monitor is changed from the list of documents of the folder of the document management database 2 into the list of documents of the folder of the document management database 3).

First, in S21, a user selects an arbitrary folder from the lists of folders of the respective document management databases 1, 2 and 3 displayed in the region V1 of the page displayed on the display monitor of the client computer C3 through a mouse click or the like (for example, selects a folder in the document management database 3). Then, in S22, the display data managing part 22 of the integrating document management software T1 identifies the document management database to which the folder selected by the user belongs from the data of lists of folders managed by this part 22 (in this example, identifies the document management database 3). Then, in S23, the connected document management database managing part 23 identifies the document management connecting program which connects the document management database identified in S22 to the integrating document management software T1 (in this example, identifies the document management connecting program P3) from the data, managed by this part 23, of the respective document management databases 1, 2 and 3 and document management connecting programs P1, P2 and P3 which connect them to the integrating document management software T1. Then, in S24, the display data managing part 22 requests the document management connecting program (in this example, the document management program P3) the data indicating the list of documents stored in the folder selected in S21 of the document management database (in this example, the document management database 3) identified in S23.

Then, in S25, the document management connecting program (in this example, the document management connecting program P3) that is requested the data of list of documents of this folder transforms the instructions of this request into the corresponding set of instructions so as to adapt the given instructions of the request for the specifications of the interface of the corresponding document management database (in this example, the document management database 3) connected by this document management connoting program, and gives the set of instructions to the document management database. In S26, in accordance with the thus-given set of instructions, the server software of the document management database (in this example, the document management database 3) which has received the set of instructions obtains from its own database and provides the data indicating the list of documents stored in the requested folder to the document management connecting program (in this example, the document management connecting program P3).

Then, in S27, the document management connecting program (in this example, the document management connecting program P3) which has received the data indicating the list of documents of the folder transforms the data into corresponding data so as to adapt the received data for the specifications of the interface of the integrating document management software T1, and provides the thus-obtained data of the integrating document management software T1. In S28, the display data managing part 22 manages the thus-provided data instead of the data which the part 22 has managed until then (in this example, the contents managed by this part 22 is changed from the data of the list of documents of the folder of the document management database 2 into the data of the list of documents of the folder of the document management database 3). Then, in S29, the display and operation part 21 displays the data of the list of documents thus newly managed by the display data managing part 22 in the region V2 of the page displayed on the display monitor of the client computer C3 instead of the data which has been displayed there until then so as to updates the display contents of the region V2.

FIG. 12 shows a list of instructions implemented in each of the document management connecting pogroms P1, P2 and P3.

As described above, each of the document management connecting programs P1, P2 and P3 has the common interface against the integrating decumbent management software T1. That is, for example, the common instructions such as the instructions "CopyDocuments" used for copying a document, the instructions "MoveDocuments" used for moving a document and so forth are implemented there. Further, documents and folders (cabinets) handled by the integrating document management software T1 have ID numbers attached thereto by the document management connecting programs P1, P2 and P3, and, when instructions are given from the integrating document management software T1 to the document management connecting programs P1, P2 and P3, the ID numbers are specified to identify the documents/folders.

Each document management connecting program (for example, P2) transforms the given instructions "CopyDocuments" and so forth into sets of instructions so as to adapt the given instructions for the specifications of the interface of the document management database (in this example, 2) which this document management connecting program connect to the integrating document management software T1. The document management connecting program (P2 in this example) manipulates data of the document management database (2 in this example) in accordance with this set of instructions through the server software. Thus, each of the document management connecting programs P1, P2 and P3 has the common interface against the integrating document management software T1, and, thereby, the interface for connecting between each of the document management connecting programs P1, P2 and P3 and the integrating document management software T1 is standardized. As a result, when documents of the document management databases 1, 2 and 3 are manipulated through the integrating document management software T1, document manipulation can be performed without awareness of the types of the connected document management databases 1, 2 and 3.

Figure 13:
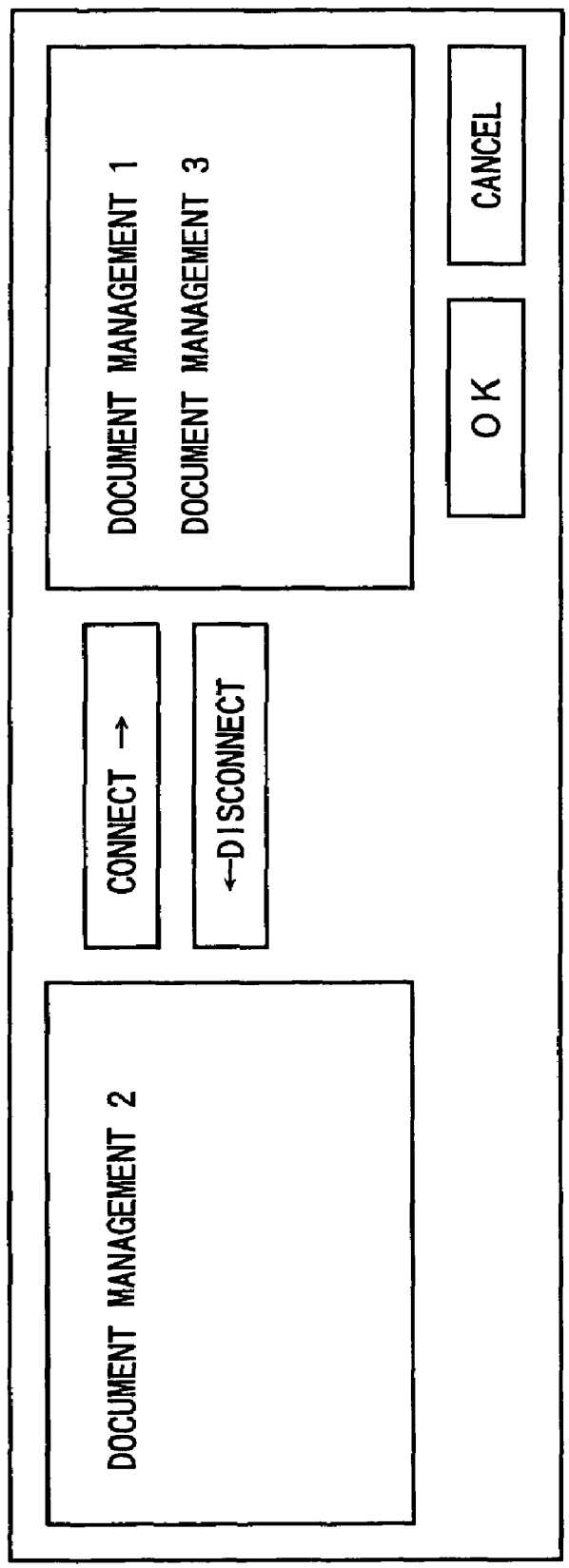
FIG. 13 shows a connection order dialog box.

FIG. 13 shows a dialog box for a user to connect/disconnect the respective document management connecting programs P1, P2 and P3 to/from the integrating document management software T1 (simply referred to as a 'connection order dialog box', hereinafter). This connection order dialog box is managed by the display data managing part 22 of the integrating document management software T1, and is displayed on the page displayed on the display monitor of the client computer C3 in response to a user's instruction given thereto.

Figure 14:
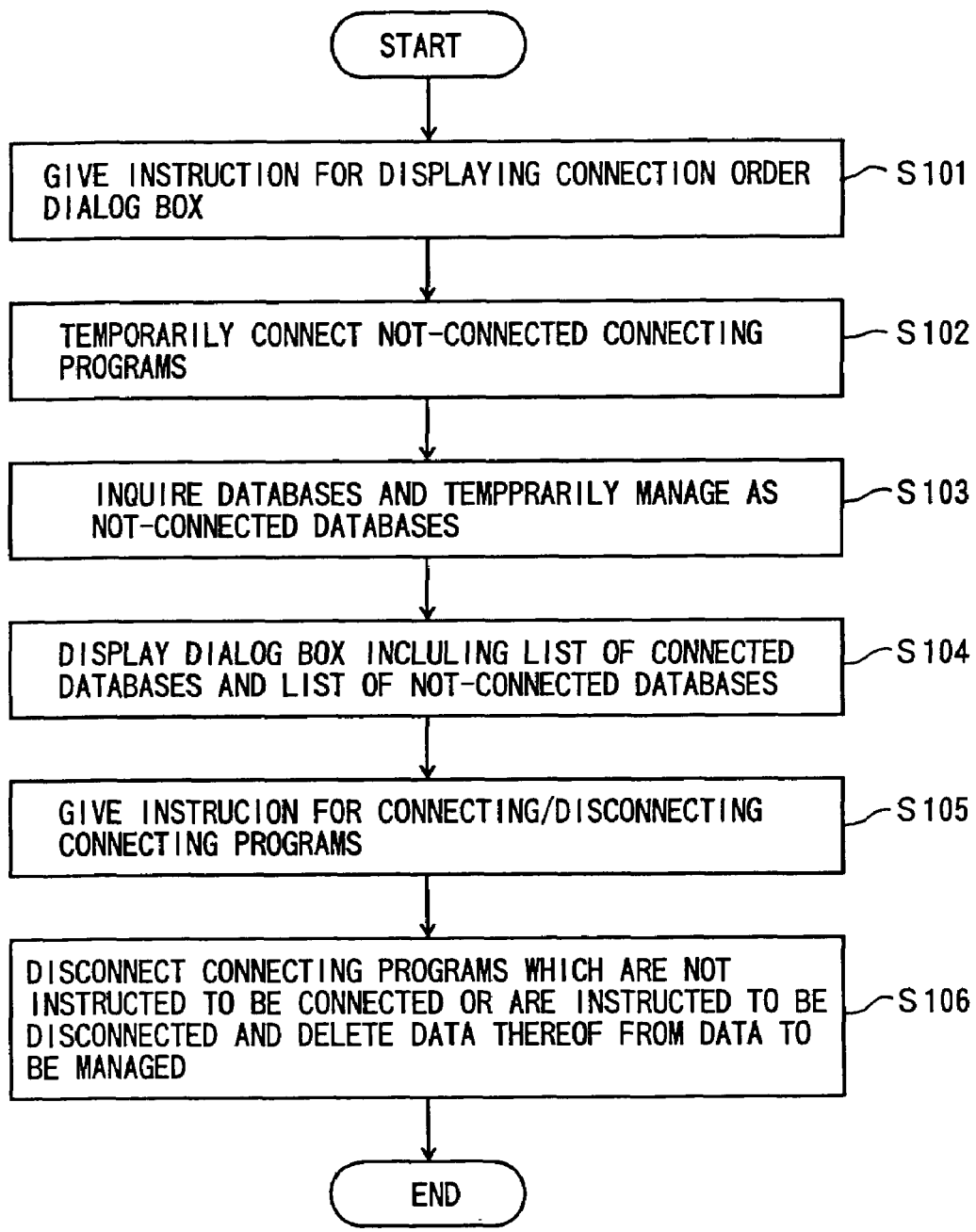
FIG. 14 shows a flow chart illustrating operations performed when an operator inputs instructions through the connection order dialog box.

FIG. 14 shows a flow chart of operations for manipulating the connection order dialog box.

First, in S101, a user operates the client computer C3 so as to cause the connection order dialog box to be displayed. As a result, in S102, the connected document management database managing part 23 searches a specific folder under management of the OS installed in the computer C3, finds the document management connecting programs (for example, P2) not connected to the integrating document management software T1 (not loaded in the memory), and connects the found document management connecting programs to the integrating document management stoneware T1 temporarily (load it in the memory). Then, in S103, the connected document management database managing part 23 inquires of the found document management connecting programs (in this example, P2) what are the corresponding document management databases (in this example, 2) this document management connecting programs connect to the integrating document management software T1. Then, the connected document management database managing part 23 temporality manages data concerning those document management databases and those document management connecting programs as those of not-connected databases.

Then, in S104, the display and operation part 21 uses the data managed by the connected document management database management part 23, and displays the connection order dialog box including a list of the document management databases (in this example, 1 and 3) connected to the integrating document management software T1, and a list of document management databases (in this example, 2) not connected to (actually, temporally connected to, however, regarded as those not connected to because the data thereof is managed by the connected document management database managing part 23 as the data of not-connected databases) the iterating document management software T1 (see FIG. 13).

Then, the user operates the computer C3 so as to connect/disconnect arbitrary document management databases on the thus-displayed connection order dialog box (S105). Then, when finally the user clicks the 'OK' button, the display and operation part 23 terminates the display of the connection order dialog box and the connected document management database managing part 23 disconnects the document management connecting programs corresponding to the document management databases which are not instructed by the user to be connected or are instructed to be disconnected in S105 from the integrating document management software T1 (unloads it from the memory) in S106. Thus, the connected document management database managing part 23 deletes the data concerning those document management connecting programs and corresponding document management databases from the data which this part 23 manages.

Figure 15:
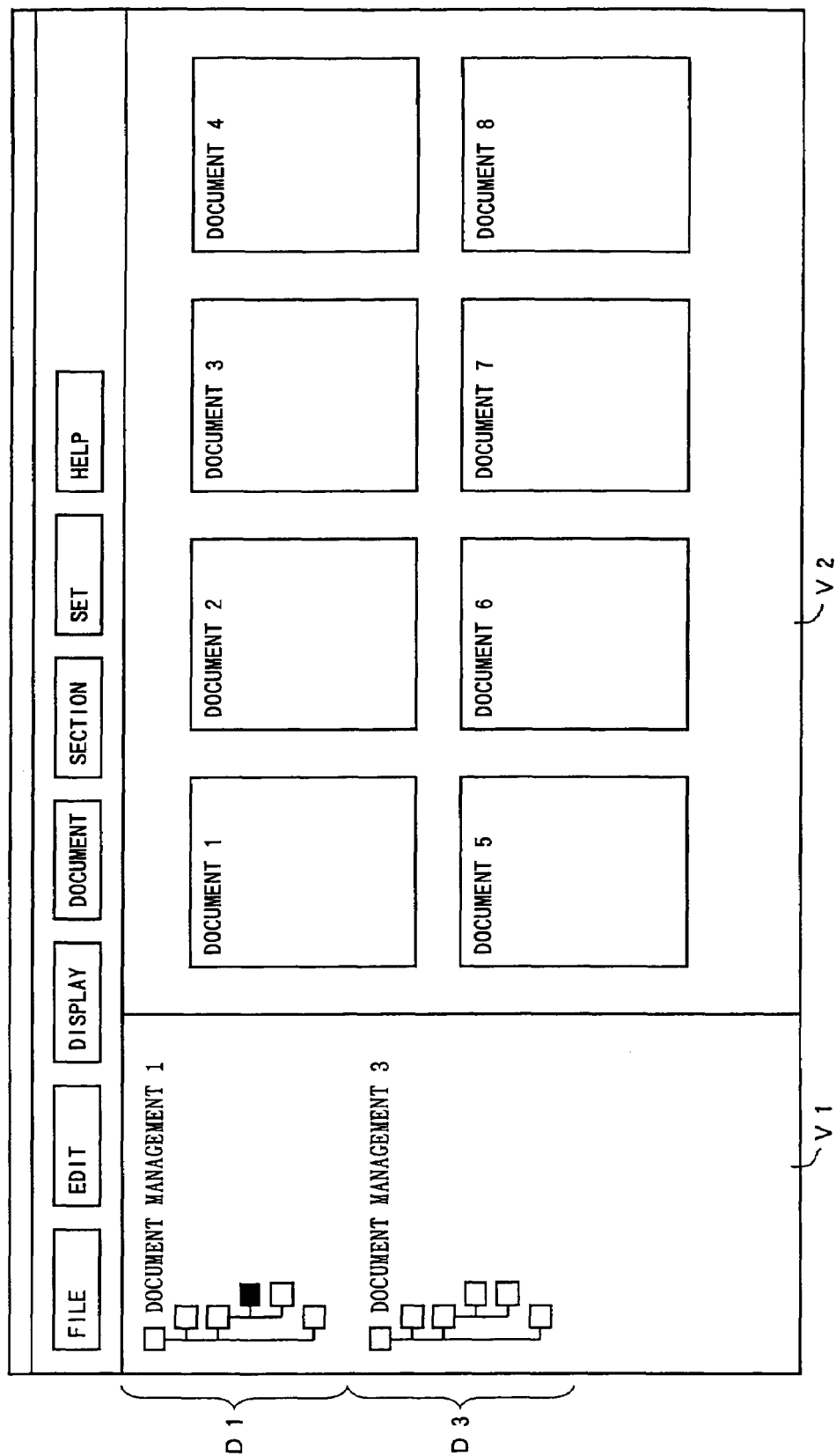
FIG. 15 shows display contents on the screen of the client computer in a case where the document management connoting program for the document management database 2 is disconnected.

The integrating document management software T1, and the respective document management connecting programs P1, P2 and P3 are of separate modules (for example, the integrating document management software T1 is of an executable (EXE) file (.exe) and the respective document management contenting programs are of dynamic link library (DLL) files (.dll)). Thereby, a user can individually perform connection/disconnection of the respective document management connecting programs P1, P2 and P3 to/from the integrating document management software T1 dynamically using the connection order dialog box shown in FIG. 13. That is, the integrating document management software T1 loads/unloads the respective document management connecting programs P1, P2 and P3 in/from the memory in accordance with instructions given by the user. FIG. 13 shows, for example, a state in which a user has operated the client computer C3 so as to connect the document management connecting programs P1 and P3 to the integrating document management software T1 and disconnect the document management connecting program P2 from the integrating document management software T1. As a result of the client computer C3 being thus operated, only the lists (management trees) of the document management databases 1 and 3, D1 and D3 are displayed in the region V1 of the page displayed on the display monitor of the computer C3, as shown in FIG. 15.

Figure 16:
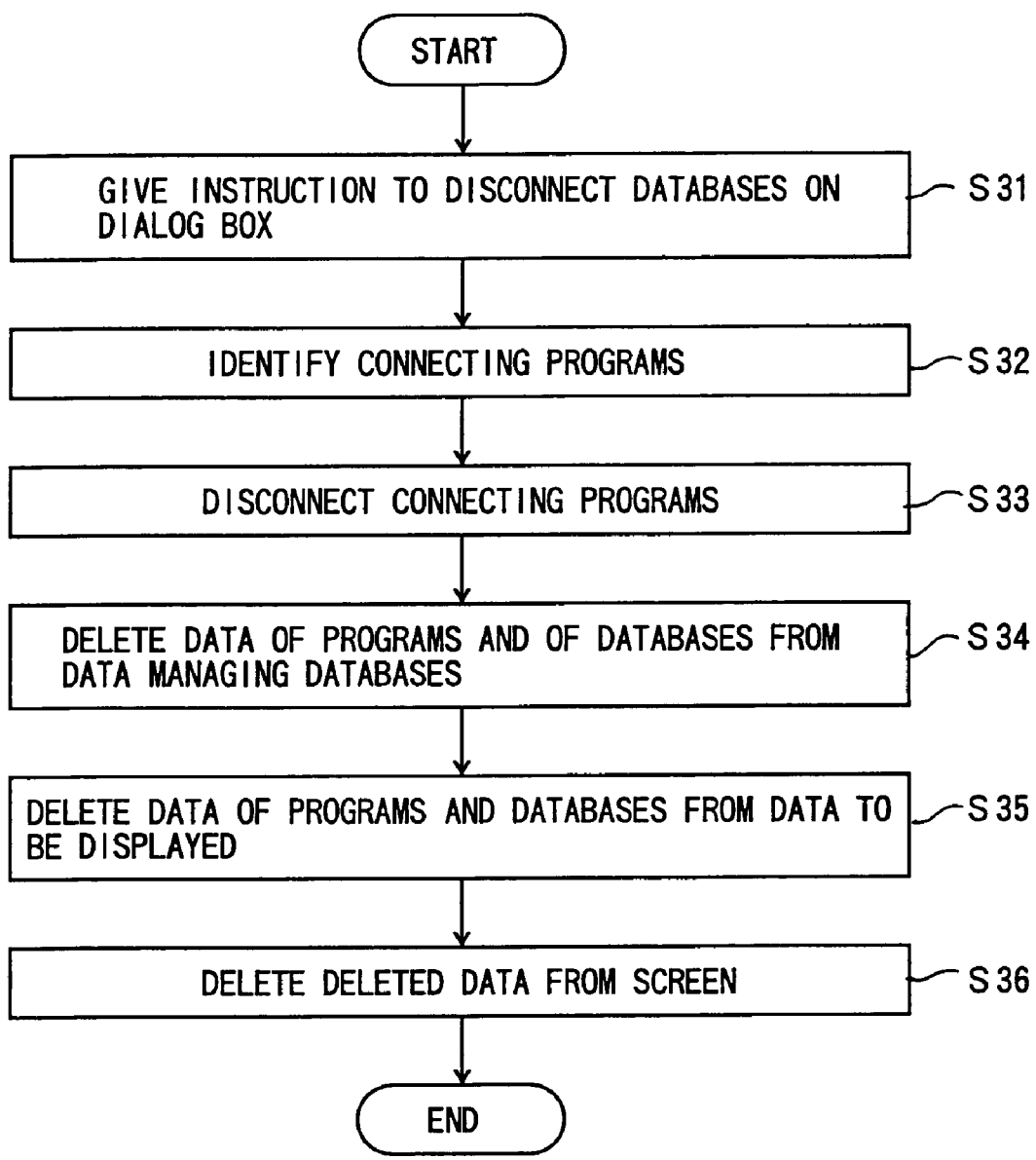
FIG. 16 shows a flow chart illustrating operations at a time of disconnection of document management programs.

FIG. 16 shows a flow chart of operations for disconnecting document management connecting programs (which may be any of P1, P2 and P3) from the integrating document management software T1.

First, in S31, a user operates the computer C3 to disconnect arbitrary document management databases (for example, 3) using the connection order dialog box such as that shown in FIG. 13, for example. In S32, the connected document management database managing part 23 of the integrating document management software T1 identifies the document management connecting programs (in this example, P3) connecting the document management databases instructed to be disconnected, and, in S33, disconnects those document management connecting program from the integrating document management software T1 (unloads those programs from the memory).

Then, in S34, the connected document management database managing part 23 deletes the data concerning the disconnected document management connecting programs (in this example, P3) and corresponding document management databases (in this example, 3) which those document management connecting programs have connected to the integrating document management software T1 from the data (see FIG. 8) which this part 23 manages. In S35, the display data managing part 22 deletes the data concerning those document management databases from the data which this part 22 manages. In S36, the display and operation part 21 deletes the data (in this example, the folder management tree D3 of the document management database 3) deleted from management of the display data management part 22 from the page displayed on the display monitor.

Figure 17:
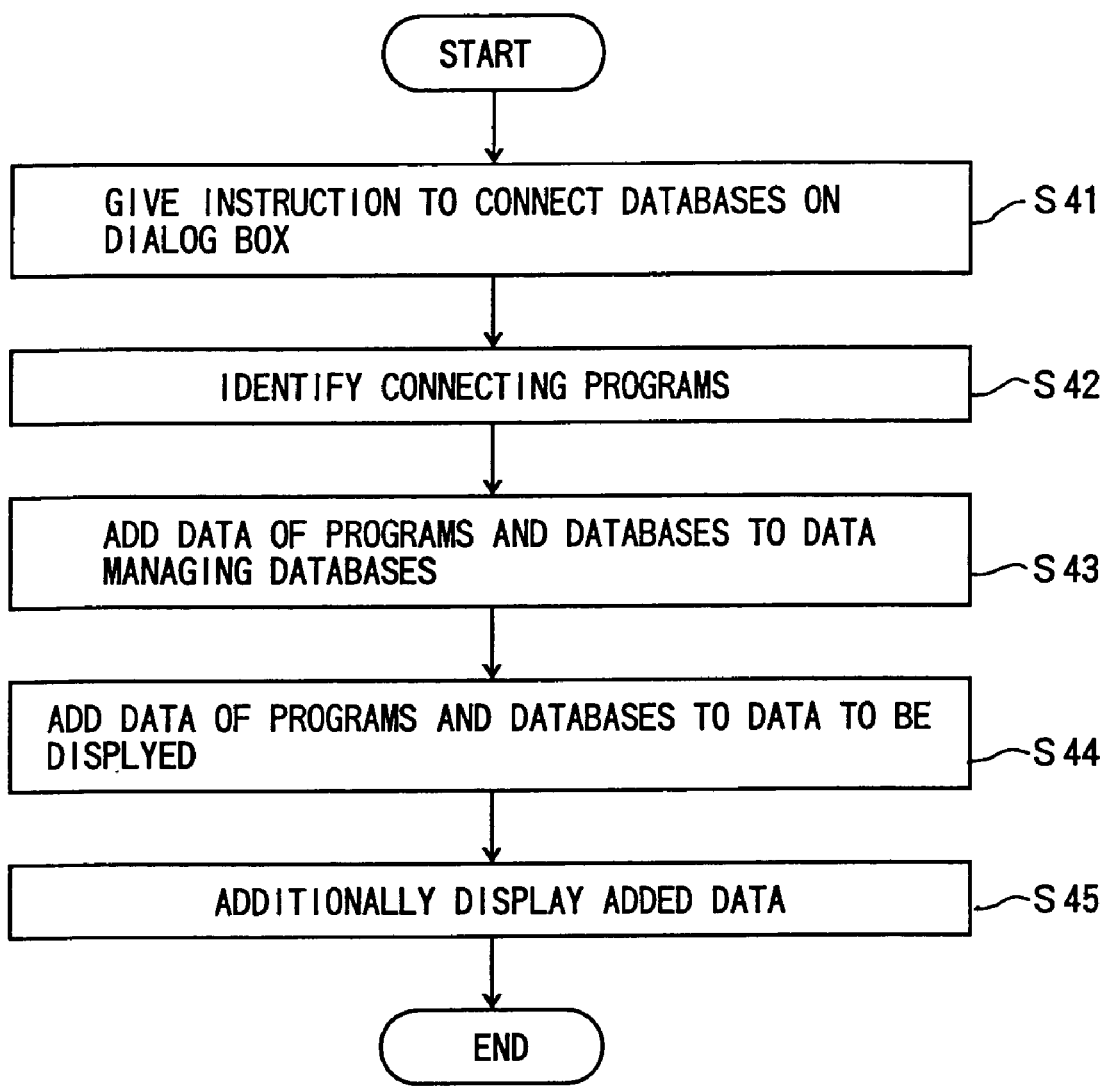
FIG. 17 shows a flow chart illustrating operations at a time of connection of document management programs.

FIG. 17 shows a flow chart of operations for connecting document management connecting programs (which may be any of P1, P2 and P3) to the integrating document management software T1.

First, in S41, a user operates the computer C3 to connect arbitrary document management connecting programs using the connection order dialog box such as that shown in FIG. 13, for example (operates the computer C3 to connects the document management database 2 in a state in which the document management databases 1 and 3 are connected and the document management database 2 is disconnected, for example). In S42, the connected document management database managing part 23 of the integrating document management software T1 identifies the document management connecting programs (in this example, P2) connecting (although being regarded as not connecting because it is managed as the data of not-connected databases, actually connecting temporarily, as described above) the document management databases (in this example, 2) instructed to be connected.

Then, in S43, the connected document management database managing part 23 adds the data concerning the document management connecting programs (in this example, P2) identified in S42 and corresponding document management databases (in this example, 2) which those document management connecting programs connect to the integrating document management software T1 to the data (see FIG. 8) which this part 23 manages, and finishes the data of those databases to be managed as the data of not-connected databases. As a result, the document management databases (in this example, 2) which have been regarded as being not connected become to be regarded as being connected. In S44, the display data managing part 22 adds the data concerning those document management databases to the data which this part 22 manages. In S45, the display and operation part 21 adds the data added to the data (in this example, the folder management tree D2 of the document management database 2) which this part 22 manages to the region V1 of the page displayed on the display monitor of the client computer C3.

In S44, in order that the display data managing part 22 adds the data of the document management databases (in this example, 2) newly connected (having been regarded as being not connected although actually being temporarily connected at the time of display of the connection order dialog box, and coming to be regarded as being connected in S43) to the data which this part 22 manages, operations similar to those of S2 through S5 for obtaining data from the document management databases are performed. However, although the data is obtained as a result of being requested to all the document management connecting programs (P1, P2 and P3) managed by the connected document management database managing part 23 in S2 through S5, the data is obtained as a result of being requested only to the document management connecting programs (in this example, P2) newly connected in this case.

Further, it is assumed that, in the operations of displaying the data in the region V1 of the page displayed on the display monitor of the client computer C3 of FIG. 9, the client computer C3 is operated previously to be instructed to connect all the document management databases (1, 2 and 3), and, when the client computer C3 is started up in S1, the connected document management database managing part 23 of the integrating document management software T1 causes the data concerning all the document management connecting programs (P1, P2 and P3) and corresponding databases (1, 2 and 3) to the data which this part 23 manages as data of connected databases, and manages the data in such a manner that all the document management databases are regarded as being connected to the integrating document management software T1, before S2.

As described above, according to the present invention, a user can connect only the document management databases to be used.

Thus, because each of the document management connecting programs (P1, P2 and P3) has the common interface against the integrating document management software T1, all the operation instructions needed for manipulating general document management databases are implemented in each of the document management connecting pogroms (P1, P2 and P3). However, connected document management databases have various sizes, types and managing methods. Therefore, it is not necessarily true that all the instructions implemented in each of the document management connecting programs (P1, P2 and P3) are effective (for example, change of names of documents cannot be performed for the document management database 1). Further, as specifications of management of the integrating document management software T1, there is a case where it is requested to make a certain manipulation not possible (for example, it is requested to make document deletion not possible for the document management database 2). In order to deal with such situations, according to the present invention, the integrating document management software T1 can inquire of the respective document management connecting programs P1, P2 and P3 whether operation instructions which the integrating document management software T1 gives to the respective document management connecting programs P1, P2 and P3 are effective instructions (that is, instructions (capabilities) supported by the respective document management connecting programs P1, P2 and P3) or allowed instructions. That is, it is possible to obtain the information as to whether the respective instructions implemented in each document management connecting program are supported or allowed by the respective one of the document management databases (1, 2 and 3). As shown in FIGS. 18A through 18C, setting is made at the time of designing as to whether or not the implemented instructions in each of the document management connecting programs P1, P2 and P3 are executable.

Figure 19:
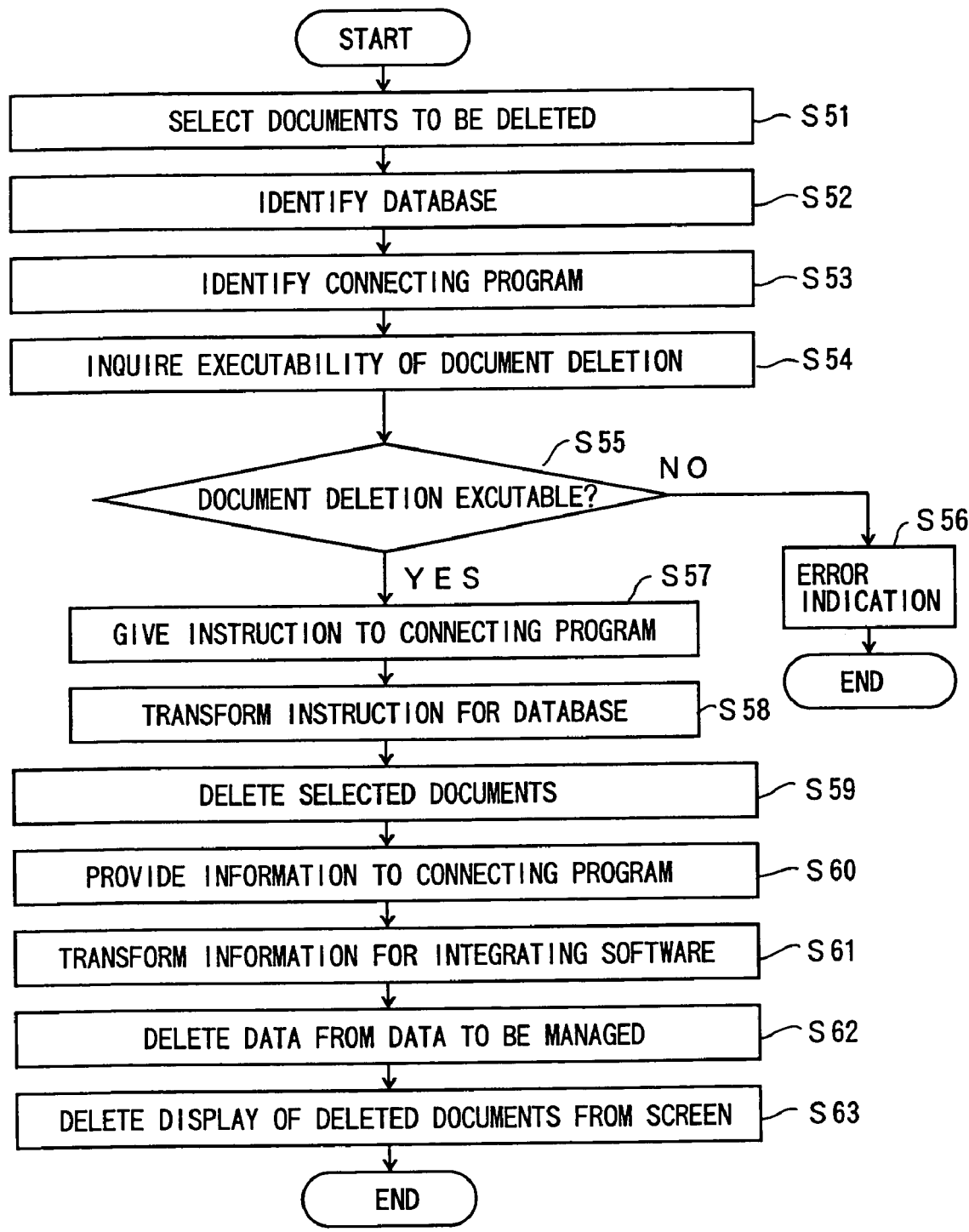
FIG. 19 shows a flow chart illustrating operations performed when documents are deleted.

FIG. 19 shows a flow chart of operations at a time of deleting documents.

In S51, a user operates the client computer C3 on the page displayed on the display monitor thereof so as to select arbitrary documents of an arbitrary folder of an arbitrary document management database (for example, a document stored in a folder of the document management database 3), and delete them. In S52, the display data managing part 22 of the integrating document management software T1 identifies the document management database (in this example, 3) to which the selected documents belong. In S53, the connected document management database managing part 23 identifies the document management connecting program (in this example, P3) which connects the identified document management database. In S54, the connected document management database managing part 23 inquires of the identified document management connecting program whether deletion of documents is executable.

When the answer to the inquiry is 'non-executable' (NO in S55), ERROR indication is displayed on the page displayed on the display monitor of the client computer C3 in S56, and the operations are finished. When the answer to the inquiry is 'executable' (YES in S55), the connected document management database managing part 23 gives instructions of deleting the documents selected in s51 to the identified document management connecting program (in this example, P3) in S57. (In this example, because the identified document management connecting program is the document management connecting program P3, as shown in FIG. 18C, the deletion of document (DeleteDocuments) is 'executable', S57 is executed.)

In S58, the document management connecting program (in this example, P3) transforms the given instructions to a corresponding set of instructions so as to adapt the given instructions for the specifications of the interface of the corresponding document management database (in this example, 3) which this document management connecting program connects to the integrating document management software T1, and gives the thus-obtained set of instructions to the document management database. In S59, the server software of the document management database (in this example, 3) which receives the given set of instructions deletes the documents of the folder selected in S51 in accordance with the contents of the set of instructions. In S60, this server software provides information indicating that the documents have been deleted to the corresponding document management connecting program (in this example, P3) connecting this database to the software T1.

In S61, the document management connecting program which has received this information transforms the information into corresponding information so as to adapt the received information for the specifications of the interface of the integrating document management software T1, and provides the thus-obtained information to the software T1. In S62, the display data managing part 22 deletes the data of the deleted documents from the data which the part 22 manages. In S63, the display and operation part 21 deletes the data of the documents deleted from the data which the display data managing part 22 manages from the region V2 of the page displayed on the display monitor of the client computer C3. Thus, the indications of the documents thus deleted from the document management database are deleted from the page displayed on the display monitor.

Thus, according to the present invention, when a user wishes to manipulate data of the respective document management databases, it is possible to inquire whether execution of instructions therefor is supported or allowed by each of the document management databases, and obtain answers (see FIGS. 18A through 18C) thereto. Thereby, it is possible to prevent useless operations in that instructions not supported by the document management database are given to the document management connecting program, and are transformed into the corresponding set of instructions so as to be adapted for the specifications of the interface of that document management database. Further, problematic operations are prevented from being performed in that not-allowed instructions are given to the document management database through the document management connecting program.

Figure 20:
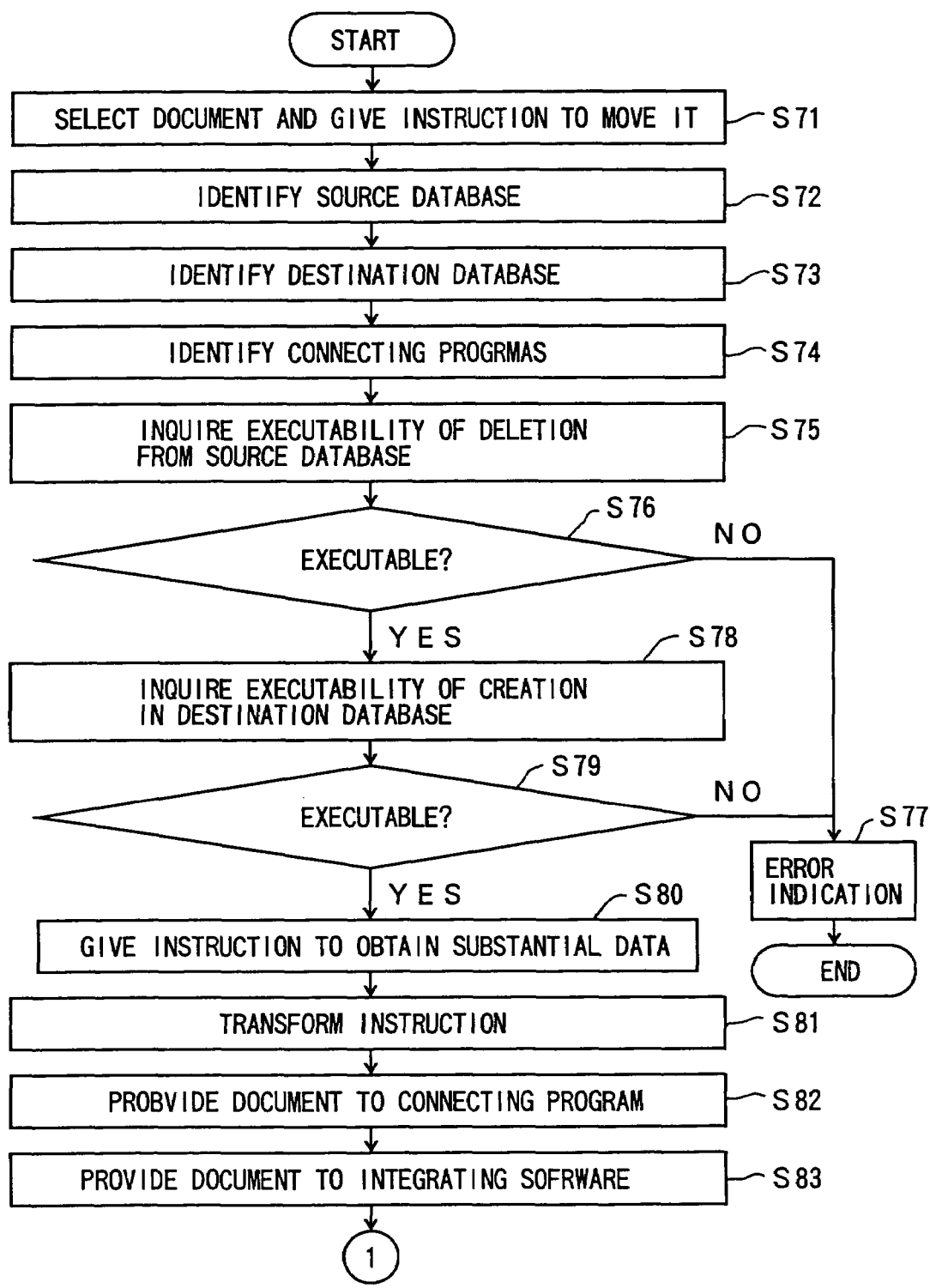
FIGS. 20 and 21 show a flow chart illustrating operations performed when documents are moved between different document management databases.
Figure 21:
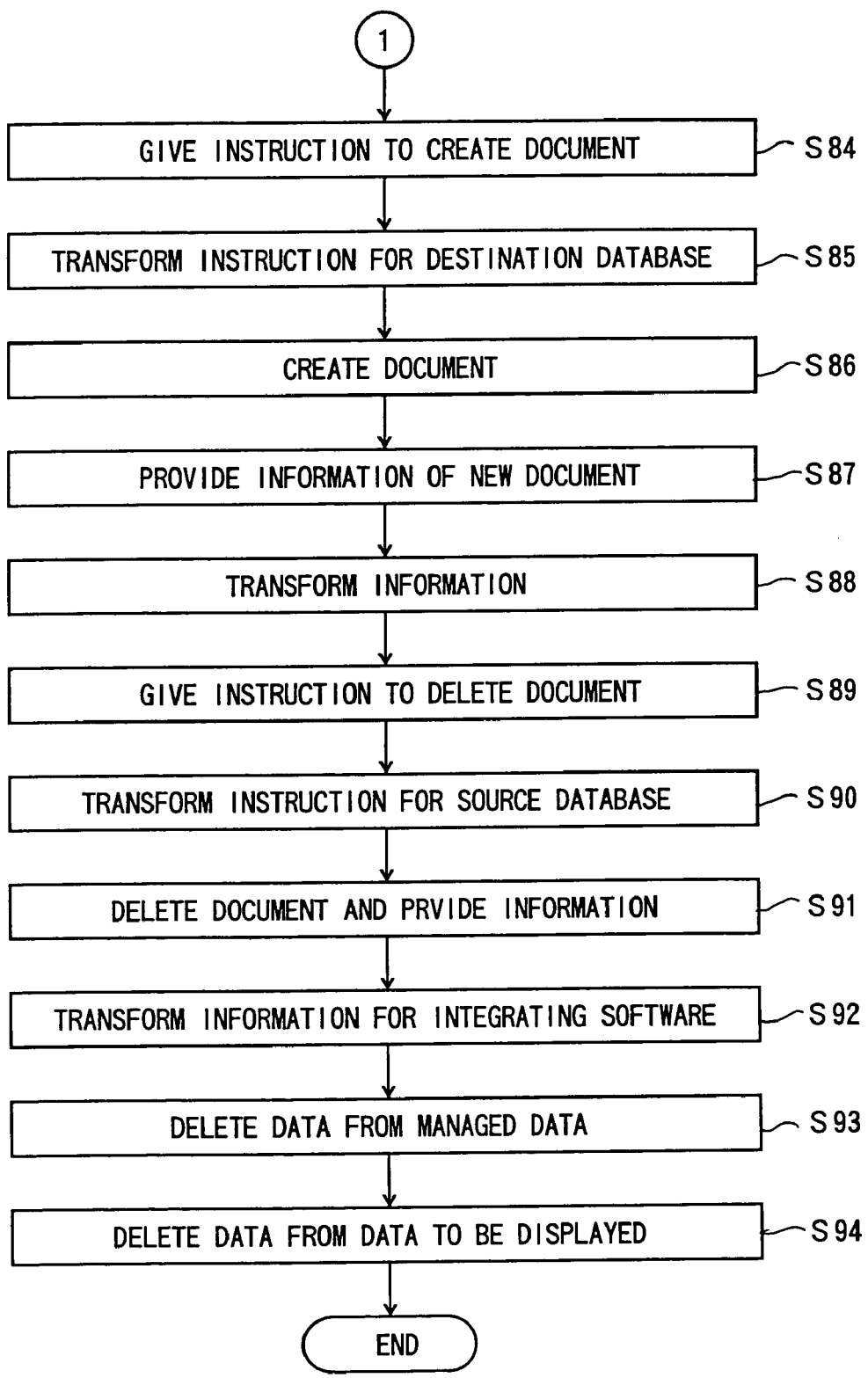

FIGS. 20 and 21 show a flow chart of operations of movement of documents from a document management database to a different document management database.

Movement of documents from a document management database to a different document management database requires that a condition be satisfied in that the documents to be moved have such an attribute that the documents can be registered in the document management database to which the document is to be moved. For example, when documents to be moved include image data, but a document management database to which the document is to be moved is specially for numerical data, the movement of the documents thereto is not possible.

In S71, a user operates the client computer C3 on the page displayed on the display monitor thereof so as to select arbitrary documents of an arbitrary folder of a first document management database (for example, a document stored in a folder of the document management database 1), and move them to an arbitrary folder of a second document management database (for example, a folder of the document management database 2). In S72, the display data managing part 22 of the integrating document management software T1 identifies the first document management database (in this example, 1) to which the selected documents belong. In S73, the display data managing part 22 of the integrating document management software T1 identifies the second document management database (in this example, 2) to which the folder to which the documents to be moved belong. In S74, the connected document management database managing part 23 identifies the document management connecting programs (in this example, P1 and P2) which connect the identified first and second document management databases, respectively.

In S75, the connected document management database managing part 23 inquires of the identified document management connecting program (in this example, P1) connecting the first document management database (in this example, 1) whether deletion of documents is executable. When the answer to the inquiry is 'non-executable' (NO in S76), ERROR indication is displayed on the page displayed on the display monitor of the client computer C3 in S77, and the operations are finished. In S78, the connected document management database managing part 23 inquires of the identified document management connecting program (in this example, P2) connecting the second document management database (in this example, 2) whether creation (registration) of documents is executable, as described above. When the answer to the inquiry is 'non-executable' (NO in S79), ERROR indication is displayed on the page displayed on the display monitor of the client computer C3 in S77, and the operations are finished.

When the answer from each of both the document management connecting programs (in this example, P1 and P2) connecting the first and second document management databases (in this example, 1 and 2), respectively (YES in S76 and YES in S79), the connected document management database managing part 23 gives instructions to the document management connecting program (in this example, P1) connecting the first document management database (in this example, 1) to obtain the substantial data of the documents (the contents of the documents, for example, WORD™ (Microsoft) files, EXCEL™ (Microsoft) files, and so forth) of the folder selected in S71, in S80.

In S81, the document management connecting program (in this example, P1) given the instructions transforms the given instructions into a set of instructions so as to adapt the given instructions for the specifications of the interface of the first document management database (in this example, 1), and gives the thus-obtained set of instructions to this database. In S82, the server software of the document management database (in this example, 1) having received the set of instructions obtains from its own database and provides the substantial data of the documents (selected in S71) of the folder specified by the set of instructions to the connecting document management connecting program (in this example, P1). In S83, this document management connecting program provides the provided substantial data of the documents to the integrating document management software T1. In S84, the integrating document management software T1 temporarily stores the provided substantial data of the documents in the memory, gives instructions to the document management connecting program (in this example, P2) connecting the second document management database (in this example, 2) identified in S74 to create new documents using the substantial data of the documents thus temporarily stored in the memory in the folder selected in S71, and, also, provides the substantial data of the documents temporarily stored in the memory thereto. In S85, the document management connecting program (in this example, P2) given the instructions and provided the substantial data of the documents translates those instructions to a set of instructions so as to adapt the given instructions for the specifications of the interface of the second document management database (in this example, 2), and gives the thus-obtained set of instructions and provides the substantial data of the documents to the second document management database.

In S86, the server software of the second document management database (in this example, 2) receiving the set of insurrections and substantial data of the documents uses the substantial data of the decumbent and creates new documents in the specified folder (specified in S71 as the folder to which the documents are moved) of its own database. In S87, this server software provides the information indicating that the new documents have been created to the corresponding document management connoting program (in this example, P2). In S88, the document management connecting program receiving this information transform it into corresponding information so as to adapt it for the specifications of the interface of the integrating document management software T1. The display data managing part 22 of the integrating document management software T1 adds the data concerning the new documents indicated by the provided information to the data which this part 22 manages. Then, the data added to the data which the display data managing part 22 manages, that is, the image indicating the new documents added to the second document management database is added to the region V2 of the page displayed on the display monitor of the client computer C3.

In S89, the connected document management database managing part 23 of the integrating document management software T1 gives instructions to the document management connecting program (in this example, P1) connecting the first documents management database (in this example, 1) to delete the substantial data of the documents of the folder selected to move in S71. In S90, the document management connecting program (in this example, P1) given the instructions transforms the given instructions to a set of instructions so as to adapt the given instructions for the specifications of the interface of the first document management database, and gives the thus-obtained set of instructions to the first document management database.

In S91, in accordance with the given set of instructions, the server software of the first document management database (in this example, 1) deletes the substantial data of the specified documents from the folder of the first document management database, and provides information indicating that the data is thus deleted to the corresponding document management connecting program (in this example, P1) connecting the first document management database. In S92, the document management connecting program provided that information transforms the information into corresponding information so as to adapt the provided information for the specifications of the interface of the integrating document management software T1, and provides the thus-obtained information to the software T1.

In S93, the display data managing part 22 of the integrating document management software T1 deletes the data concerning the deleted documents indicated by the provided information from the data which this part 22 manages. In S94, the data deleted from the data which the display data managing part 22 manages, that is, the image indicating the documents deleted from the first document management database is deleted from the region V2 of the page displayed on the display monitor of the client computer C3.

Thus, according to the present invention, it is possible to move documents from one document management database to a different document management database.

Although the operations of deleting documents and moving documents from one document management database to a different document management database have been described, operations executing other instructions of manipulating documents are performed basically by the same manner as that described above in styles corresponding to the respective manipulating instructions.

The integrating document management software T1 preferably uses graphic items unique to the respective particular document management databases 1, 2 and 3 in order for a user to easily/conveniently handling the document management databases when displaying images concerning the respective document management databases on the page displayed on the display monitor of the client computer C3.

Figure 22:
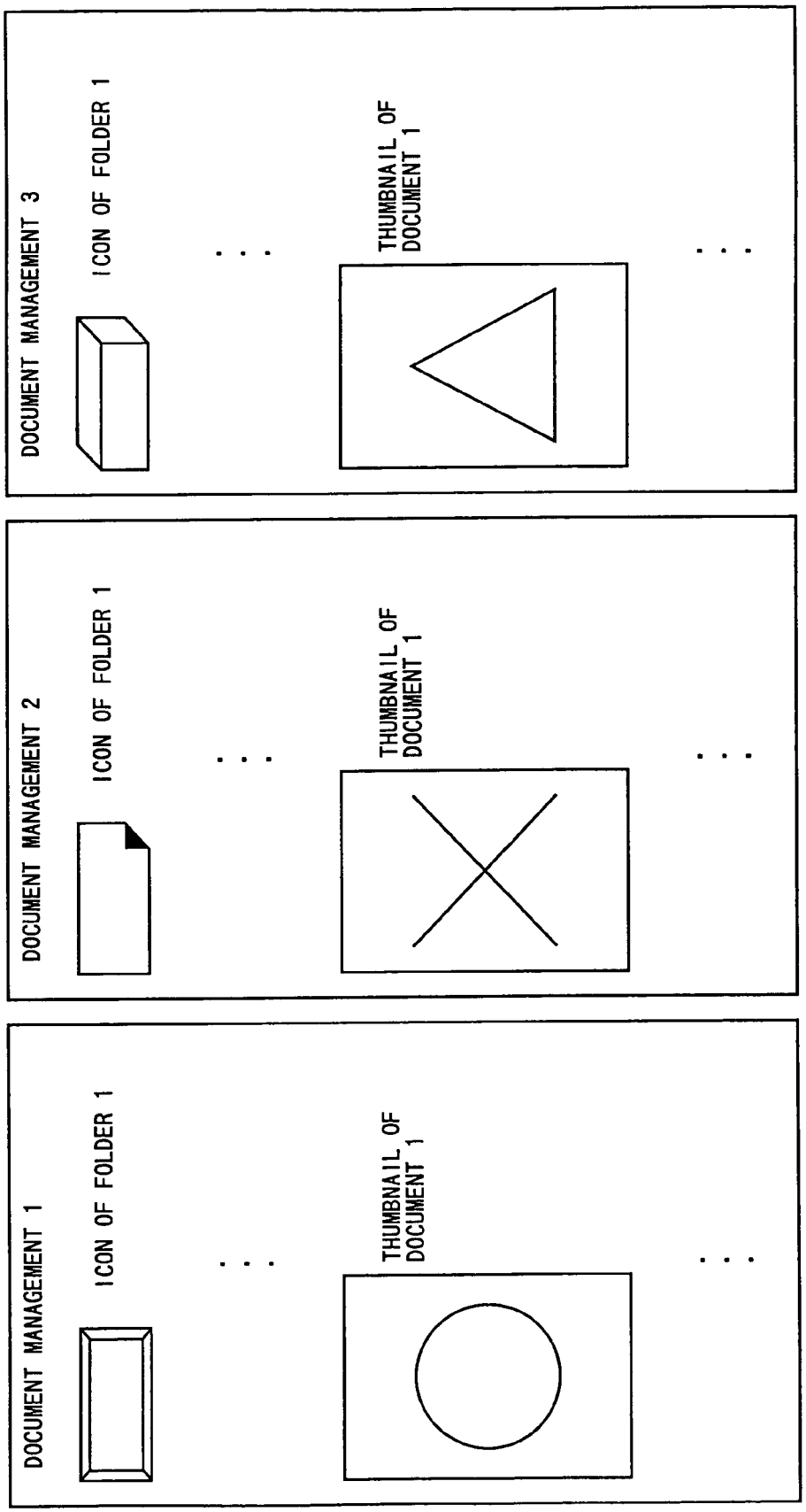
FIG. 22 shows icons and thumbnails which each document management connecting program or document management database has.
Figure 23:
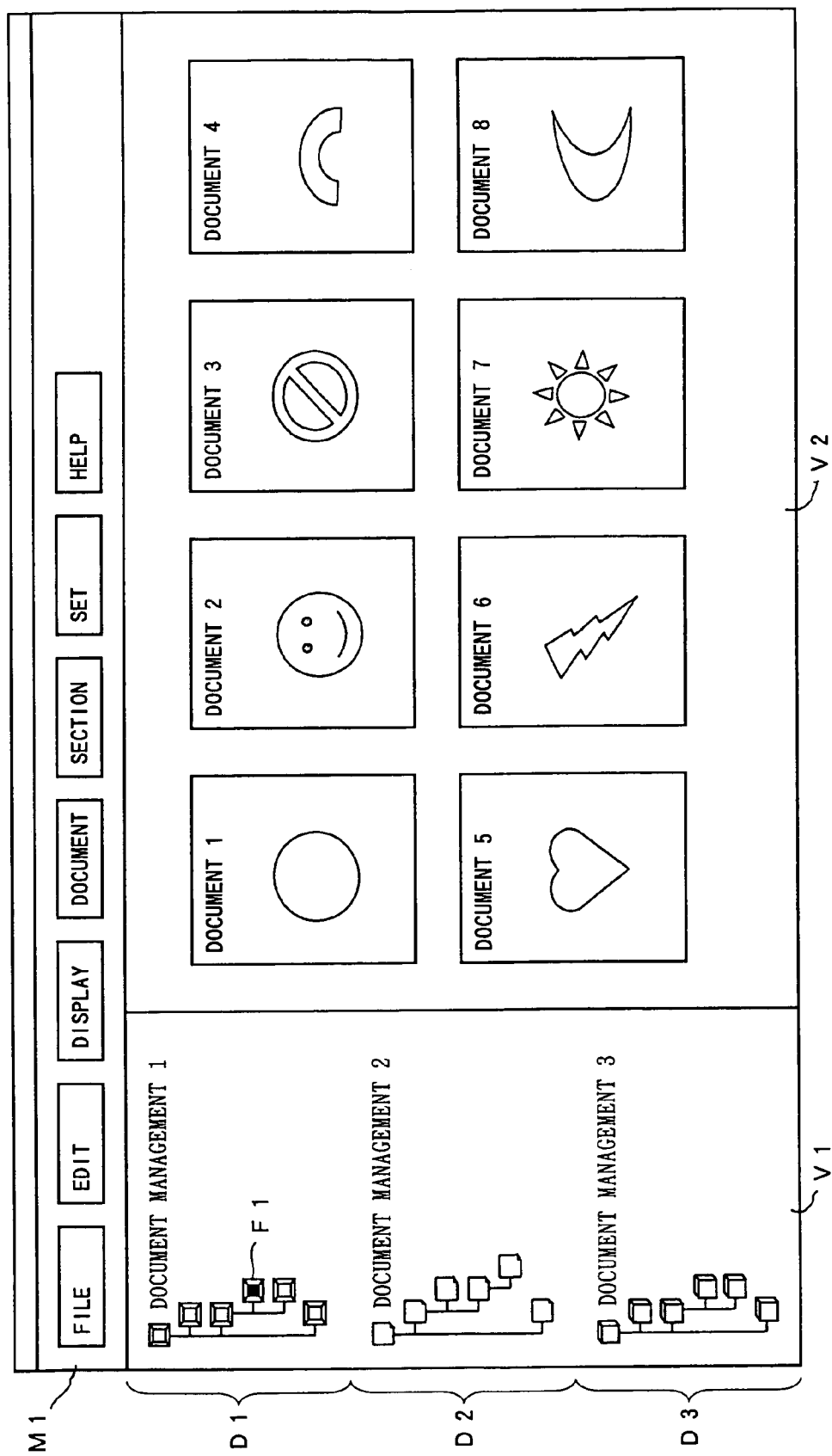
FIG. 23 shows an example of display contents of the screen of the client computer using icons unique to respective document management databases and thumbnails unique to respective documents.

FIG. 22 shows graphic items for displaying data concerning the respective document management databases on the page displayed on the display monitor of the client computer C3. Further, FIG. 23 shows an example in that, such graphic items are used, and data of the folders (folder management trees D1, D2 and D3) of the respective document management databases 1, 2 and 3 are actually displayed in the region V1 of the page displayed on the display monitor of the client computer C3, and, also, a list of documents (document 1 through document 8) in the folder F1 selected therefrom is actually displayed in the region V2 of the page displayed on the display monitor of the client computer C3. As shown in the figure, the graphic items (icons) representing the respective folders of the document management databases 1, 2 and 3 are different from each other, and, also, the graphic items (thumbnails) indicating the respective documents in the folder are different from each other. Further, as shown in FIG. 22, the thumbnails representing documents in folders of each document management database are different from those of the other document management databases.

Resources of the above-mentioned respective icons and thumbnails are (stored in the memory and) managed by the display data managing part 22 of the integrating document management software T1 for each folder, and, also, for each document as shown in FIG. 7. These resources themselves may be possessed by the respective document management connecting programs P1, P2 and P3 (incorporated in the respective programs) and obtained by the integrating document management software T1 as the demand arises for being displayed on the page displayed on the display monitor of the client computer C3. Alternatively, they may be possessed by the respective document management databases 1, 2 and 3 which the document management connecting programs P1, P2 and P3 connect, and obtained by the integrating document management software T1 through the respective document management connecting programs P1, P2, and P3, as the demand arises.

In many cases, thumbnails representing documents are created as a result of images included in the particular documents are reduced in size. In such a case, the server software of each of the document management databases 1, 2 and 3 may create thumbnail images and provide them to the integrating document management software T1 through a respective one of the document management connecting programs P1, P2 and P3. Alternatively, each of the document management connecting programs P1, P2 and P3 may obtain original images from a respective one of the document management databases 1, 2 and 3, reduce them in size so as to create thumbnails and provide the thus-obtained thumbnails to the integrating document management software T1.

Thus, according to the present invention, it is possible to use different graphic items (icons representing folders, thumbnails representing documents, and so forth) for particular connected document management databases, and display contents thereof. Thereby, a user can easily distinguish the contents thereof, and display easy for user to tell the contents of the databases can be achieved.

Figure 24:
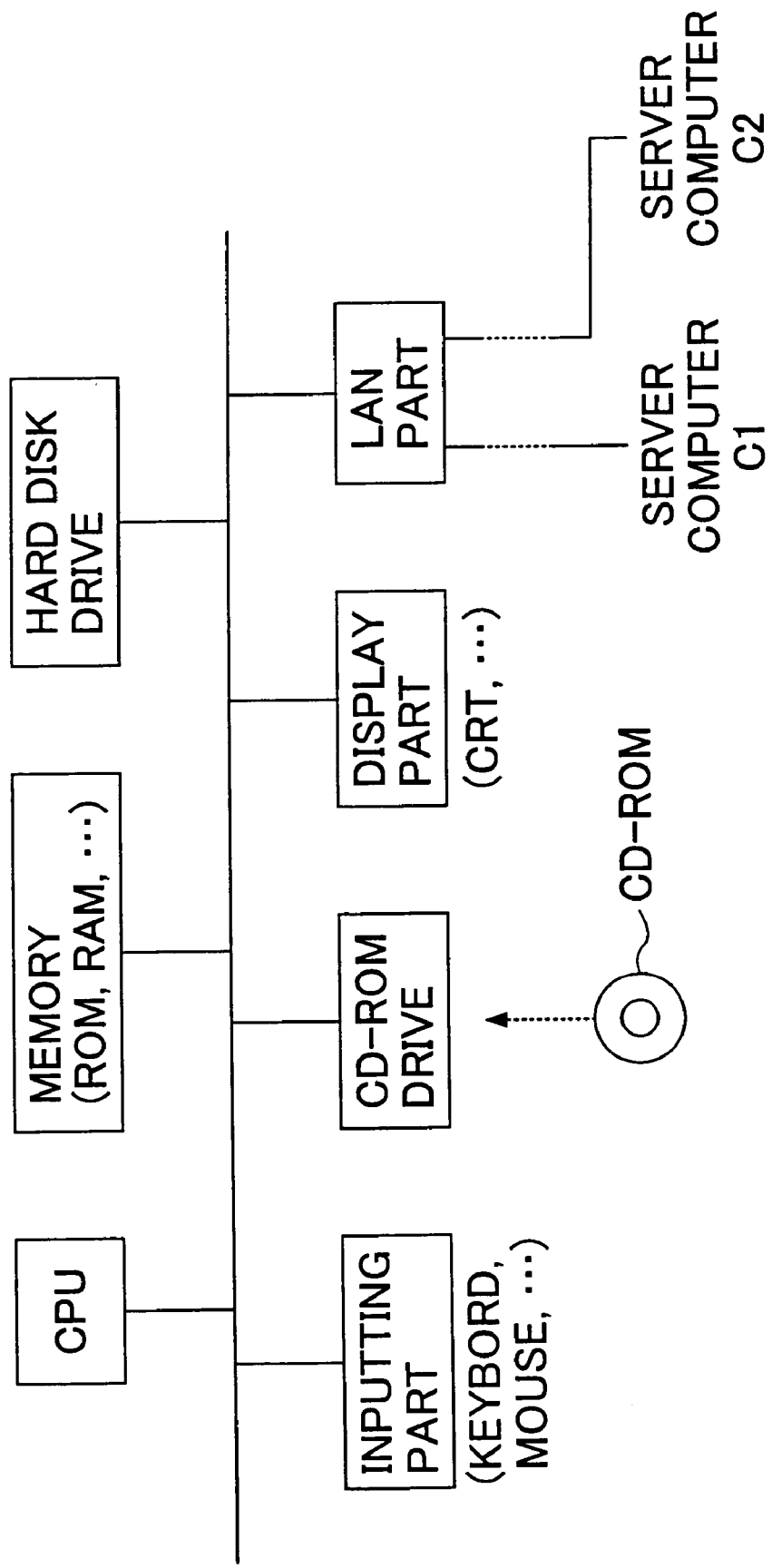
FIG. 24 shows an example of a configuration of each of the computers shown in FIG. 3.

The above-described integrating document management software T1, respective document management connecting programs P1, P2 and P3 are previously recorded in a recording medium such as a CD-ROM (or floppy disks, or the like) for example so that a computer having a configuration such as that shown in FIG. 24 can read the information recorded in the recording medium. Then, the recording medium is loaded in the computer (the client computer C3 in the embodiment described above) (at the CD-ROM drive, in this example, shown in FIG. 24), the integrating document management software T1, respective document management connecting programs P1, P2 and P3 are read out from the recording medium (in this example, the CD-ROM), are written in another recording medium (the hard disk through the hard disk drive, for example, shown in FIG. 24), are read out therefrom and loaded (written) in the memory, and the CPU executes them appropriately. Thereby the client computer C3 executes various functions such as those described above.

It is possible that all of document management connecting programs such as those P1, P2 and P3 are not originally recorded in the CD-ROM, but will be additionally installed in the client computer C3 as plug-in software.

Further, it is possible that the client computer C3 is connected with the server computers C1 and C2 through the Internet.

Further, it is possible that the integrating document management software T1, respective document management connecting programs P1, P2 and P3 are downloaded into the client computer C3 from a WEB server through the Internet.

A document management system in a second embodiment of the present invention will now be described making reference to figures.

Figure 25:
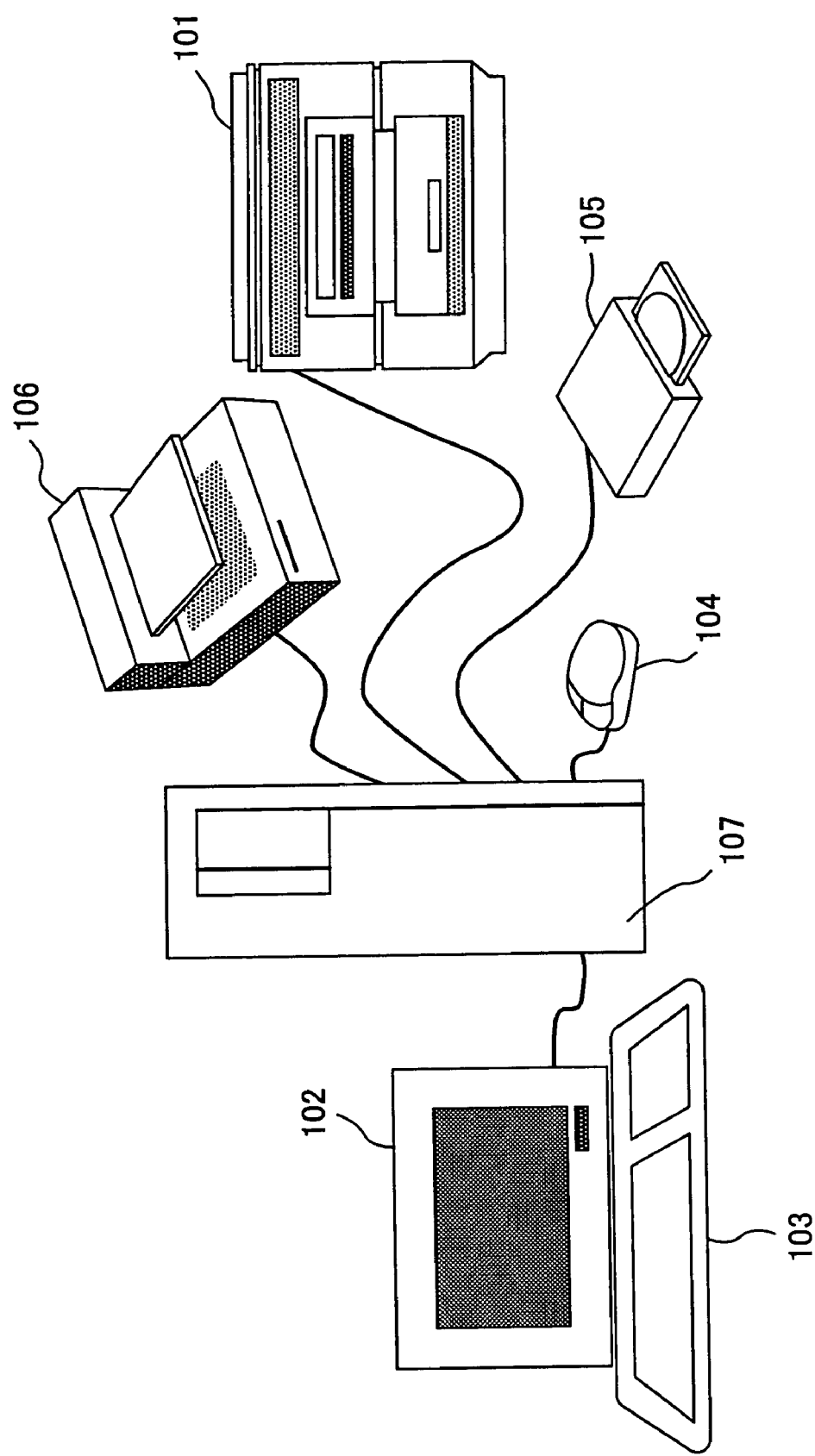
FIG. 25 shows a hardware configuration of a document management system in each of second through tenth embodiment of the present invention.

FIG. 25 shows a hardware configuration of one example of a document management system common to each embodiment of embodiments which will now be described.

The document management system shown in FIG. 25 includes an electronic filing apparatus including a scanner 101 for inputting original images, a monitor 102 for display monitoring thus-input original images on a screen thereof, a keyboard 103 and a mouse 104 for giving instructions for operations concerning display monitor on the screen and the system in general, an optical disk drive 105 for storing original images input as mentioned above or in other ways, a printer 107 for printing out original images display monitored on the screen of the monitor 102, an electronic filing apparatus body 7 including a magnetic disk drive for storing a database of names of input original images, a CD-ROM drive for loading executable files (program files) and a control part controlling the respective parts/components mentioned above.

Figure 26:
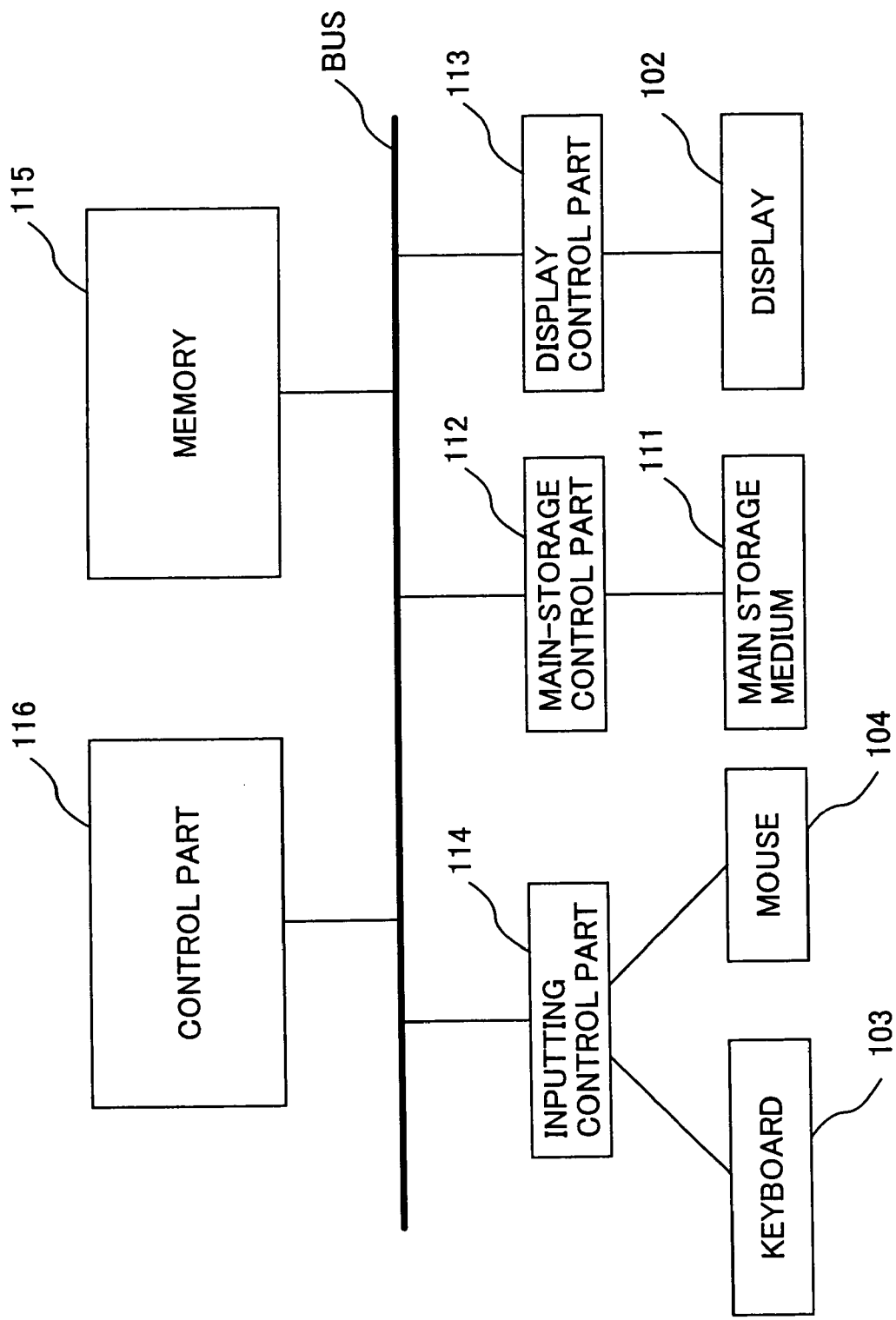
FIG. 26 shows a functional block diagram of the document management system in each of second through tenth embodiment of the present invention.

FIG. 26 shows a general functional block diagram of the above-described document management system shown in FIG. 25.

The document management system includes a main storage medium 111 storing the executable files (program files), document-information management files, section-information management files, substantial-data files and so forth, a main-storage control part 112 controlling writing data to the main storage medium 111 and reading data therefrom, the display monitor 102 displaying a document management page described later and so forth, a display control part 113 controlling display on the display monitor 102, the keyboard 103 and mouse 104 for giving instructions for operations concerning display on the screen and the system in general, an inputting control part 114 controlling with regard to inputting instructions for operations through the keyboard 103 and mouse 104 and a memory 115 including a RAM for loading necessary files therein read out from the main storage medium 111, and the control part 116 including a CPU executing programs of the executable files loaded in the memory 115 so as to control the contents of the document-information management files, section-information management files and so forth.

The above-mentioned main storage medium 111 includes the magnetic disks storing the document-information management files and section-information management files functioning as databases, the optical disk storing the substantial-data files and the CD-ROM in which the executable files (program files) are recorded. The executable files are loaded in the memory 115 and executed by the control part 116 so that functions of the respective embodiments of the present invention which will be described later are executed.

The operations of the document management system having the above-described configuration will now be described.

Figure 27:
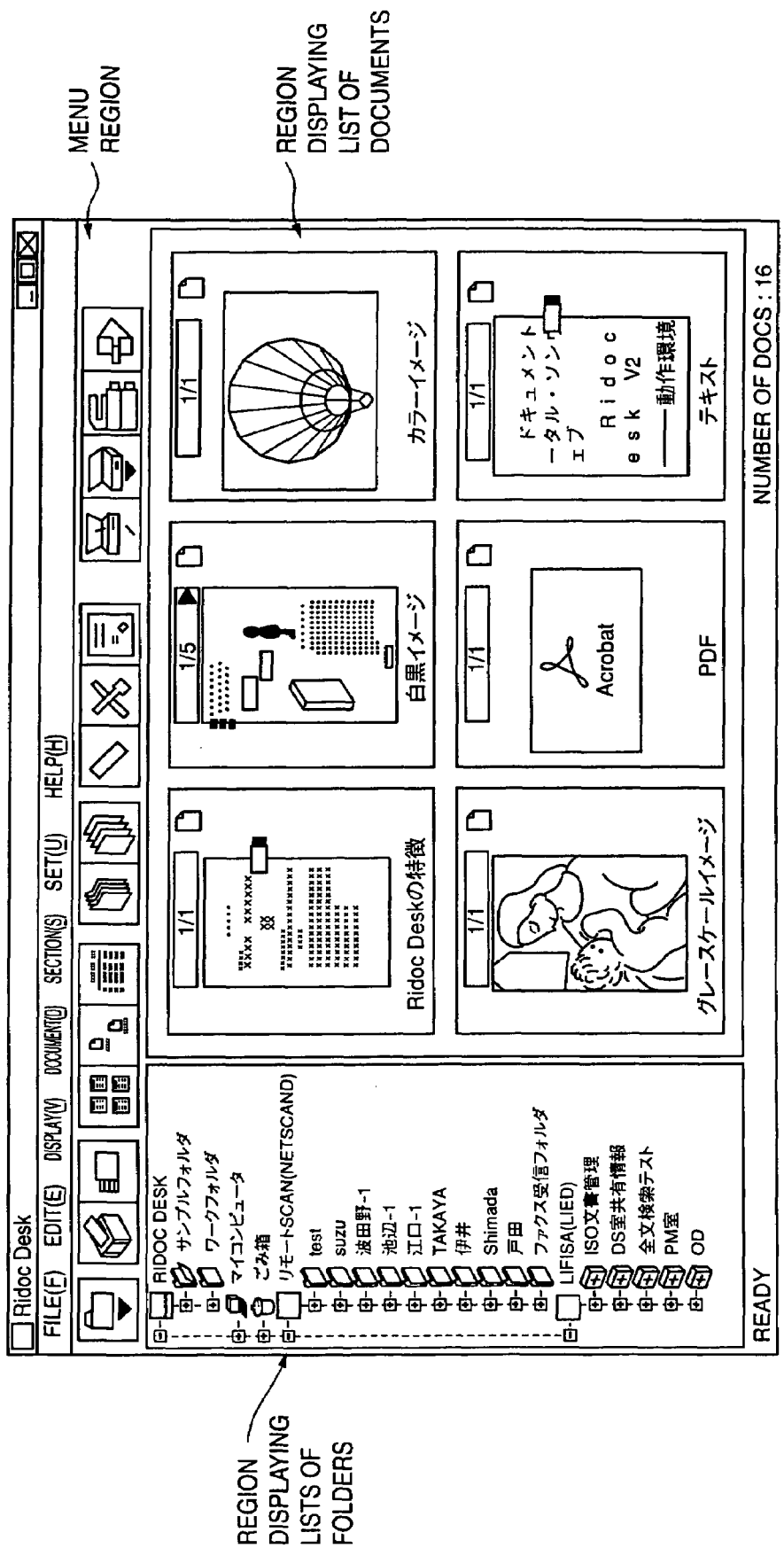
FIG. 27 shows a page normally displayed on a display monitor of the document management system in each of second through tenth embodiment of the present invention.

FIG. 27 shows an example of the document management page normally displayed on the display monitor 102 of the system.

This page includes a region displaying lists of folders as a tree structure, a region displaying a list of documents existing in the folders, and a menu region for a user to manipulate the folders and documents.

When programs of the above-mentioned executable files are executed, all the executable files are loaded in the memory 115. Further, when a list of document is displayed on the display monitor 102, information of the document lists and information of section lists are obtained from the document-information management files and section-information management files, are loaded in the memory 115, and are held there.

Figure 28:
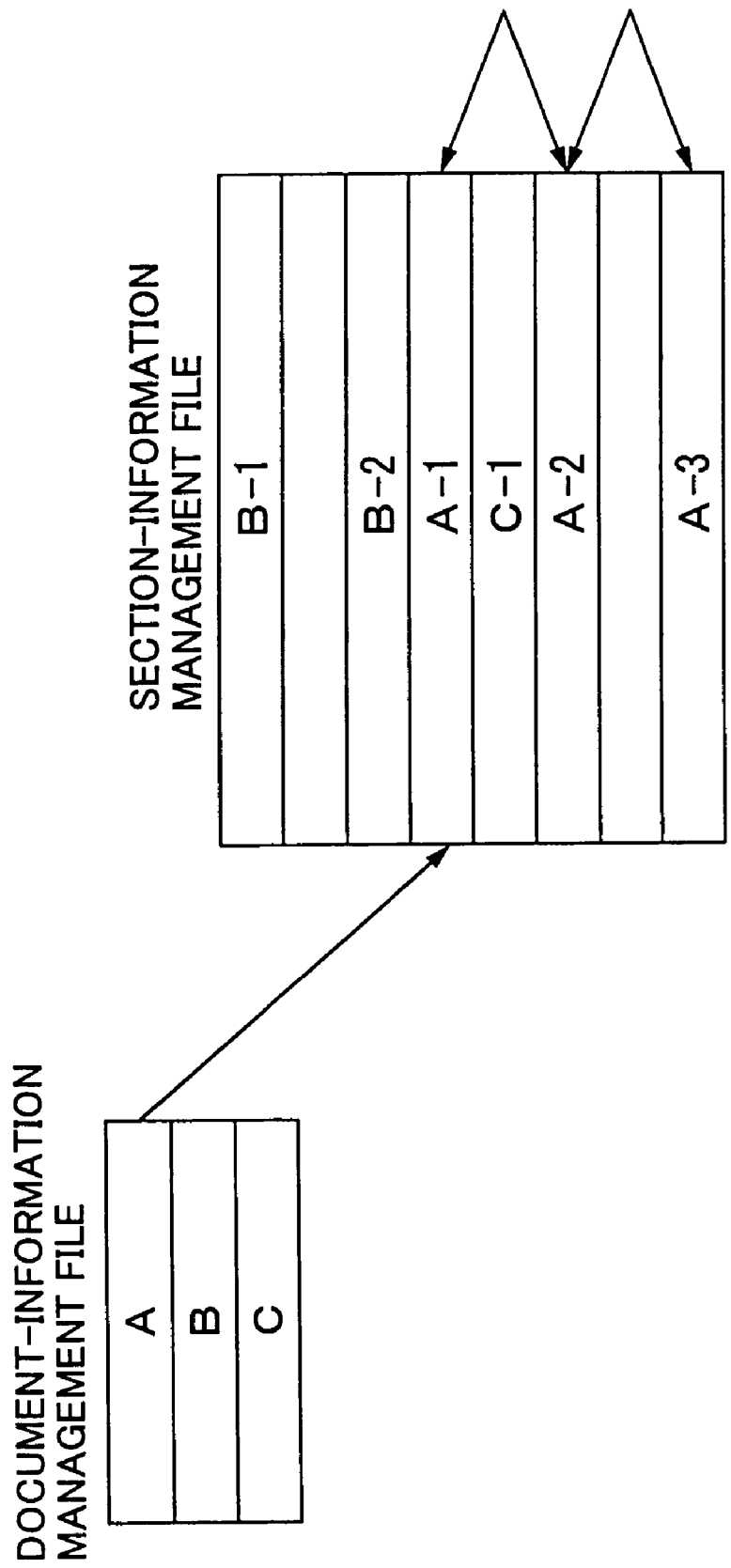
FIG. 28 illustrates a document-information management file and a section-information management file.

The document-information management files and section-information management files each having configurations shown in FIG. 28 are provided for each folder, and, thereby, information of all the documents of the folder and information of all the sections constituting the documents are stored in the files, respectively.

In the document-information management file, a list of the documents (including document names and information regarding the sections belonging to each document) is stored orderly. Further, in the section-information management file, configurations (including positions/addresses of the substantial file data and so forth) of the sections are stored orderly.

In the document-information management file, as well as document names of the documents managed there, contents indicating which positions of the section-information management file correspond to the top indexes of the respective documents are stored.

When a document consists of a plurality of sections, a link is provided between each section and a section subsequent thereto from the top section to the last section of the sections constituting the document. The top section stores index information indicating that this section is the top one, and the last section stores a terminate index indicating that this section is followed by no section.

A document coupling process will now be described. This process is a process of linking the top section of a coupling source document (to be coupled to another document) to the last section of a coupling target document (coupled by another document), and the information from which the information of the coupling source document is deleted is stored in both the document-information management file and section-information management file. A document decomposing process will now be described. This process is a process of creating a number of documents for the respective sections constituting an original document, storing document names thereof in the document-information management file, deleting the links between the sections, and storing information relating to the respective sections in both the document-information management file and section-information management file for the respective created documents (That is, the particular sections which have constituted the original document are registered as the respective particular new documents).

The above-mentioned operations of creating/deleting links are performed in the memory 115 as a result of a program of a predetermined executable file being executed by the control part 116.

First, as a presupposition, it is assumed that, an operator (user) selects (through a mouse click or the like) a plurality of documents each consisting of a single section stored in a folder in the page shown in FIG. 27, operates the menu region (through a mouse click or the like) of the page shown in FIG. 27 so as to instruct the system to perform the document coupling process, the respective documents having document names given thereto, for example, 'A', 'B', 'C', . . . , and the section names thereof being 'a', 'b', 'c'. As a result of those operations being performed by the operator on the system, the control part 116 executes a program of a predetermined executable file, and, thereby, creates links between the sections of the selected documents in the memory 115, and thus couples these documents to each other.

At this time, control part 116 determines a document name of the document obtained from the coupling, as 'A' in accordance with the document name 'A' of the first selected document, and section names constituting the document as 'a', 'b', 'c', . . . in accordance with the original section names thereof.

It is assumed that the thus-obtained document constituting the plurality of sections is displayed in the page shown in FIG. 27. In this case, it is assumed that all the information of the displayed documents is loaded in the memory 115.

Figure 29:
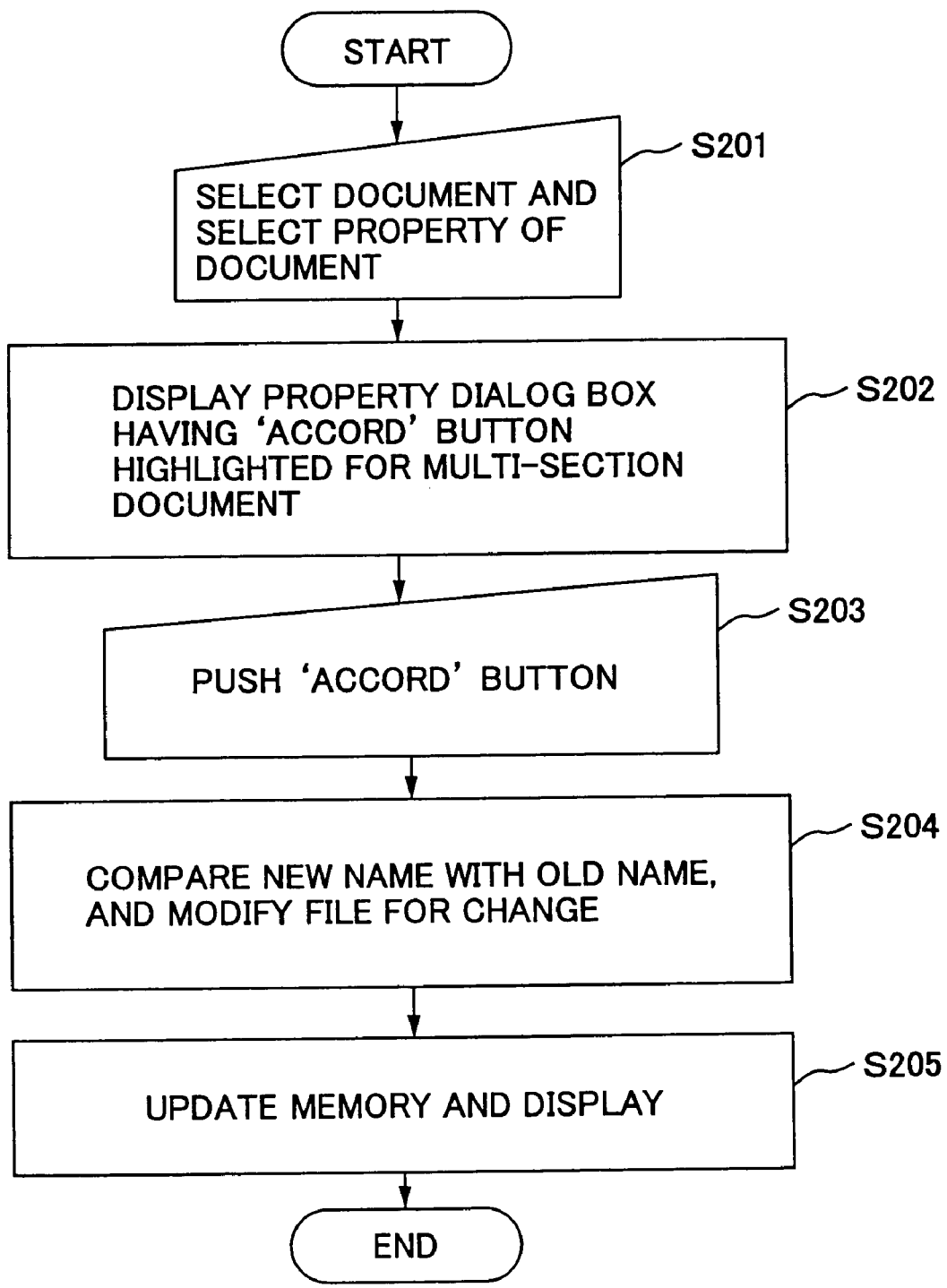
FIG. 29 shows a flow chart of operations of a second embodiment of the present invention.

FIG. 29 shows a flow chart of operations of a second embodiment of the present invention.

First, in S201, an operator selects the above-mentioned document 'A' consisting of the plurality of sections from the page shown in FIG. 27, and operates the menu region so as to instruct the system to display a 'property of document'.

Figure 30:
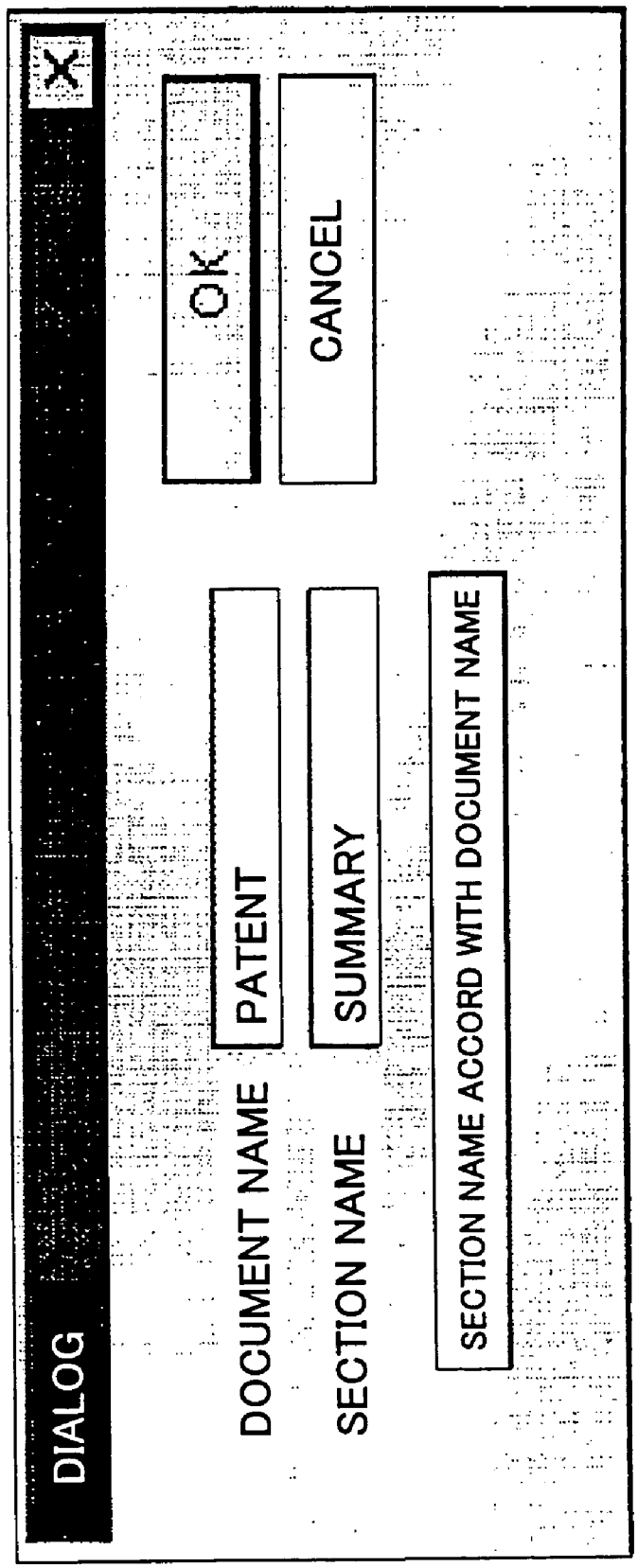
FIGS. 30 and 31 show a dialog box displayed on the display monitor in the operations shown in FIG. 29.

As a result, the control part 116 determines from the information loaded in the memory 115 in S202 whether or not the thus-selected document is a document consisting of a plurality of sections. In this case, the document selected in S201 is the document consisting of the popularity of section as mentioned above. In the case, the control part 116 displays on the display monitor 102 a property dialog box in which a button 'SECTION NAME ACCORD WITH DOCUMENT NAME' is highlighted as shown in FIG. 30.

Then, the operator pushes the highlighted button 'SECTION NAME ACCORD WITH DOCUMENT NAME' (through a mouse click), in S203.

As a result, the control part 116 creates, for the sections constituting the document, section names each consisting of the document name 'A' and an index, in accordance with the document name 'A' of this document, in S204. Specifically, for the section names 'a', 'b', 'c', . . . , 'A-1', 'A-2', 'A-3', . . . are created, respectively. Then, the control part 116 compares the thus created section names with the existing section names in the memory 115. In this case, the created section names are different from the existing section names. When the change is thus found, the control part 116 changes the relevant section-information management file stored in the main storage medium 111 in accordance with the change.

Then, in S205, the control part 116 obtains information from the section-information management file changed in S204 stored in the main storage medium 111, and, in accordance with the thus-obtained information, updates the information in the memory and the display on the display monitor 102.

Figure 31:
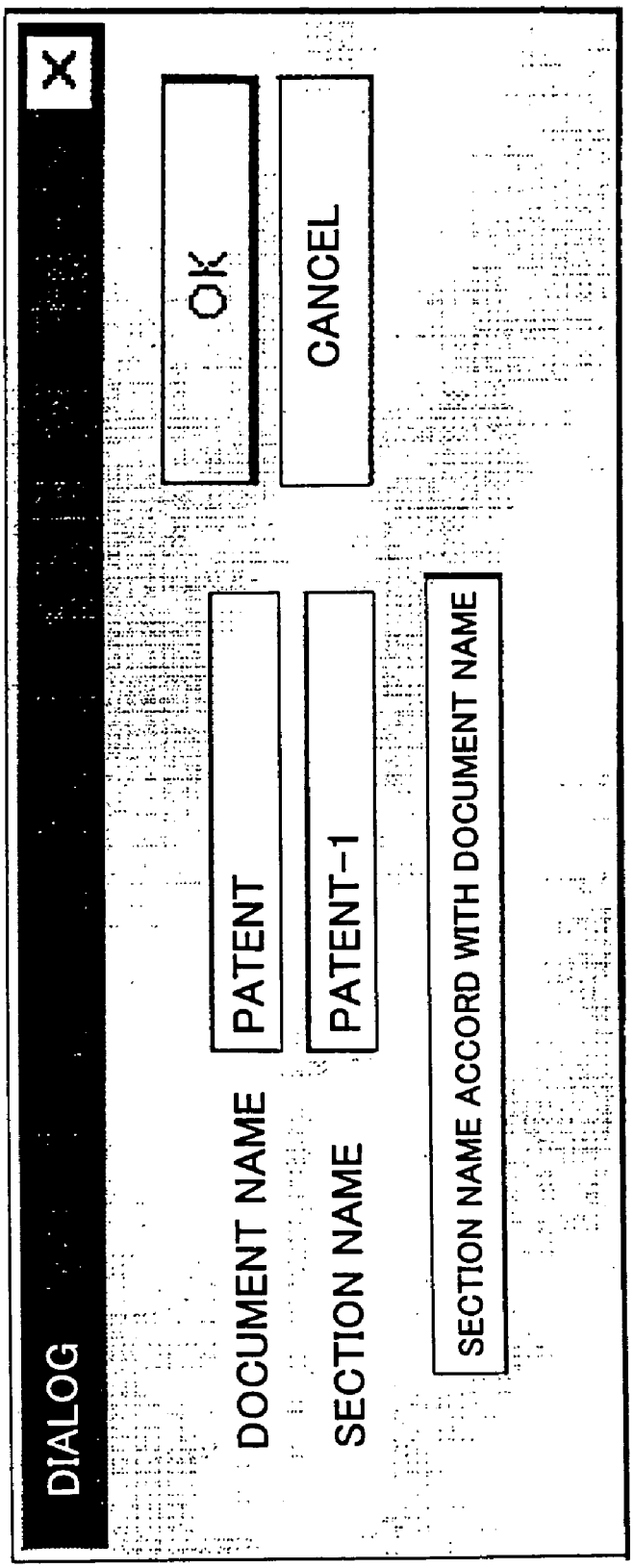

FIGS. 30 and 31 show examples of the above-mentioned property dialog box displayed on the display monitor 102.

However, this example is different from the above-mentioned example. In this example, the document name consisting of a plurality of sections is 'PATENT', and the section names of the sections constituting this document are 'SUMMARY', 'MEETING MINUTES', 'SPECIFICATION', 'DRAWINGS', . . . , respectively.

FIG. 30 shows the property dialog box shown in the display monitor 102 in S202 mentioned above in this example.

When the operator pushes the button 'SECTION NAME ACCORD WITH DOCUMENT NAME' in this state, the original section name 'SUMMARY' is changed into 'PATENT-1' in accordance with the document name 'PATENT' as a result of the index '-1' being added thereto. Accordingly, the display is updated into the state shown in FIG. 31 in S205.

The control part 116 repeats the above-mentioned operations, and, thereby, changes the section names of the respective sections constituting the above-mentioned document 'PATENT' into 'PATENT-1', 'PATENT-2', 'PATENT-3', . . . , in sequence, and, then, when completing changing the section names of all the sections constituting the document 'PATENT', the control part 116 finishes this process.

The operator should perform the operation of pushing the button 'SECTION NAME ACCORD WITH DOCUMENT NAME' only once when the first section name 'SUMMARY' is displayed, and, thereby, the section names subsequent thereto are automatically changed as described above in accordance with the document name.

Thus, the operation performed by the operator triggers creation of each section name by a method of adding an index to a document name, and, thereby, each section is named with a name related to the document name. As a result, it is easy for the operator to understand relationship between sections in the document, and understand that each section relates the document.

Figure 32:
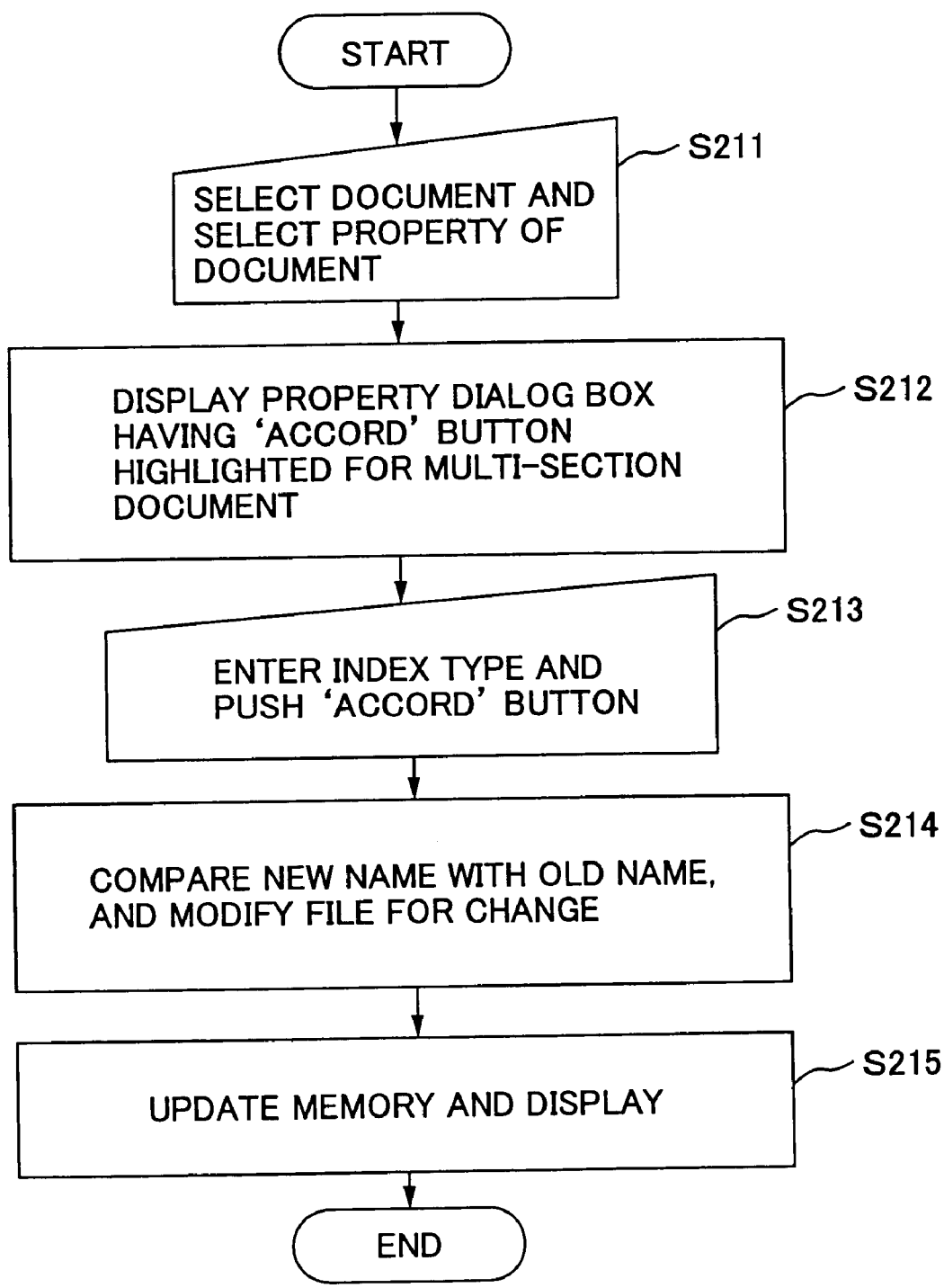
FIG. 32 shows a flow chart of operations of a third embodiment of the present invention.

FIG. 32 shows a flow chart of operations of a third embodiment of the present invention.

First, in S211, an operator selects the above-mentioned document 'A' consisting of the plurality of sections from the page shown in FIG. 27, and operates the menu region so as to instruct the system to display a 'property of document'.

As a result, the control part 116 determines from the information loaded in the memory 115 in S212 whether or not the thus-selected document is a document consisting of a plurality of sections. In this case, the document selected in S211 is the document consisting of the popularity of section as mentioned above. In the case, the control part 116 displays on the display monitor 102 a property dialog box in which a button 'SECTION NAME ACCORD WITH DOCUMENT NAME' is highlighted.

Then, in S213, the operator enters a desired type of index in a box of 'SPECIFY INDEX' in the property dialog box displayed in S212 by working the keyboard, and pushes the highlighted button 'SECTION NAME ACCORD WITH DOCUMENT NAME', in S213. It is assumed that the type of index entered by the operator is '(n)'.

As a result, the control part 116 creates, for the sections constituting the document, section names each consisting of the document name 'A' and an index, in accordance with the document name 'A' of this document in S214. At this time, each section name created has an index in the type specified in S213 added. Specifically, for the section names 'a', 'b', 'c', . . . , 'A(1)', 'A(2)', 'A(3)', . . . are created as the new section names, respectively. Then, the control part 116 compares the thus created section names with the existing section names in the memory 115. In this case, the created section names are different from the existing section names. When the change is thus found, the control part 116 changes the section-information management file stored in the main storage medium 111 in accordance with the change.

Then, in S215, the control part 116 obtains information from the section-information management file changed in S214 stored in the main storage medium 111, and, in accordance with the thus-obtained information, updates the information in the memory and the display on the display monitor 102.

Figure 33:
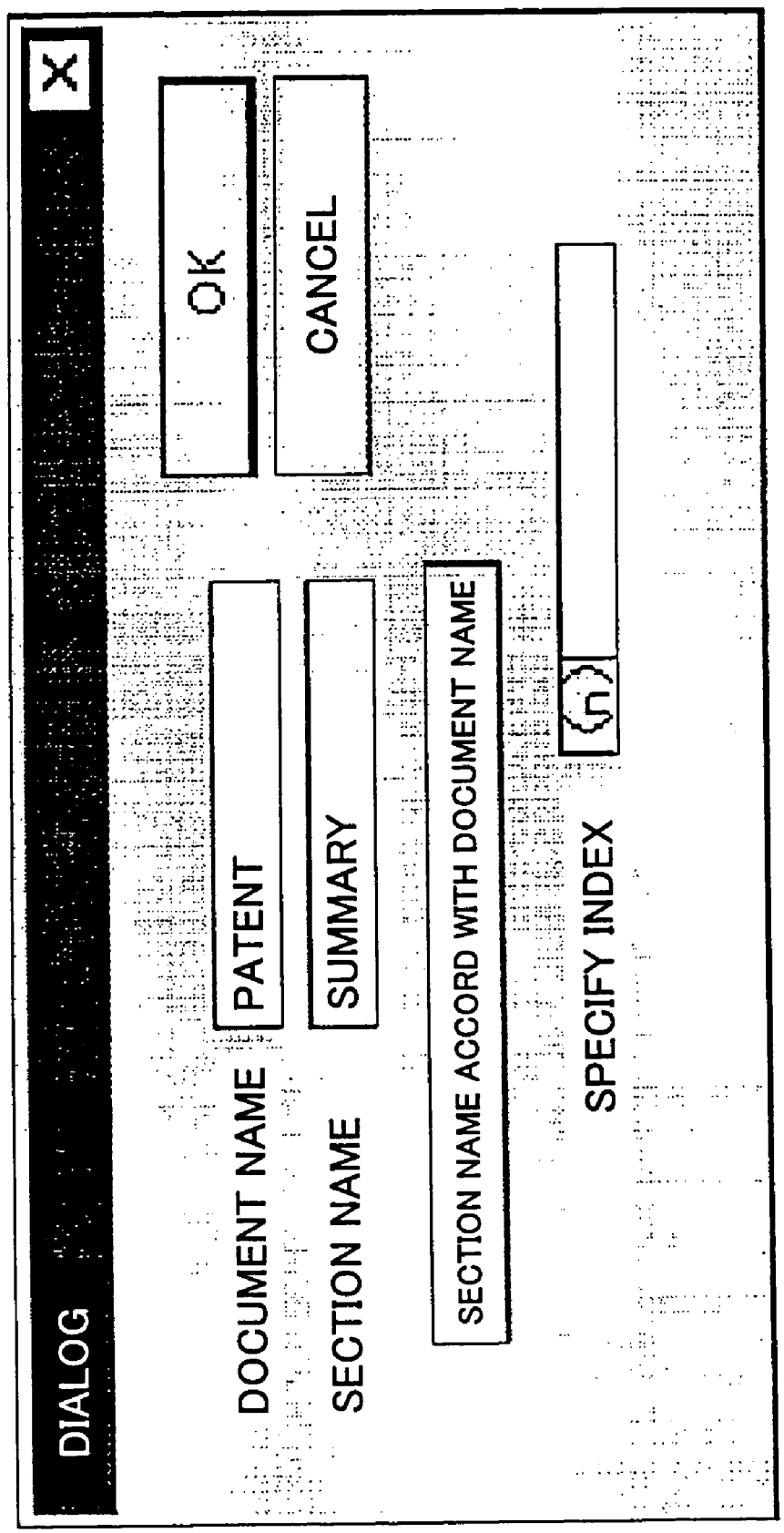
FIGS. 33 and 34 show a dialog box displayed on the display monitor in the operations shown in FIG. 32.
Figure 34:
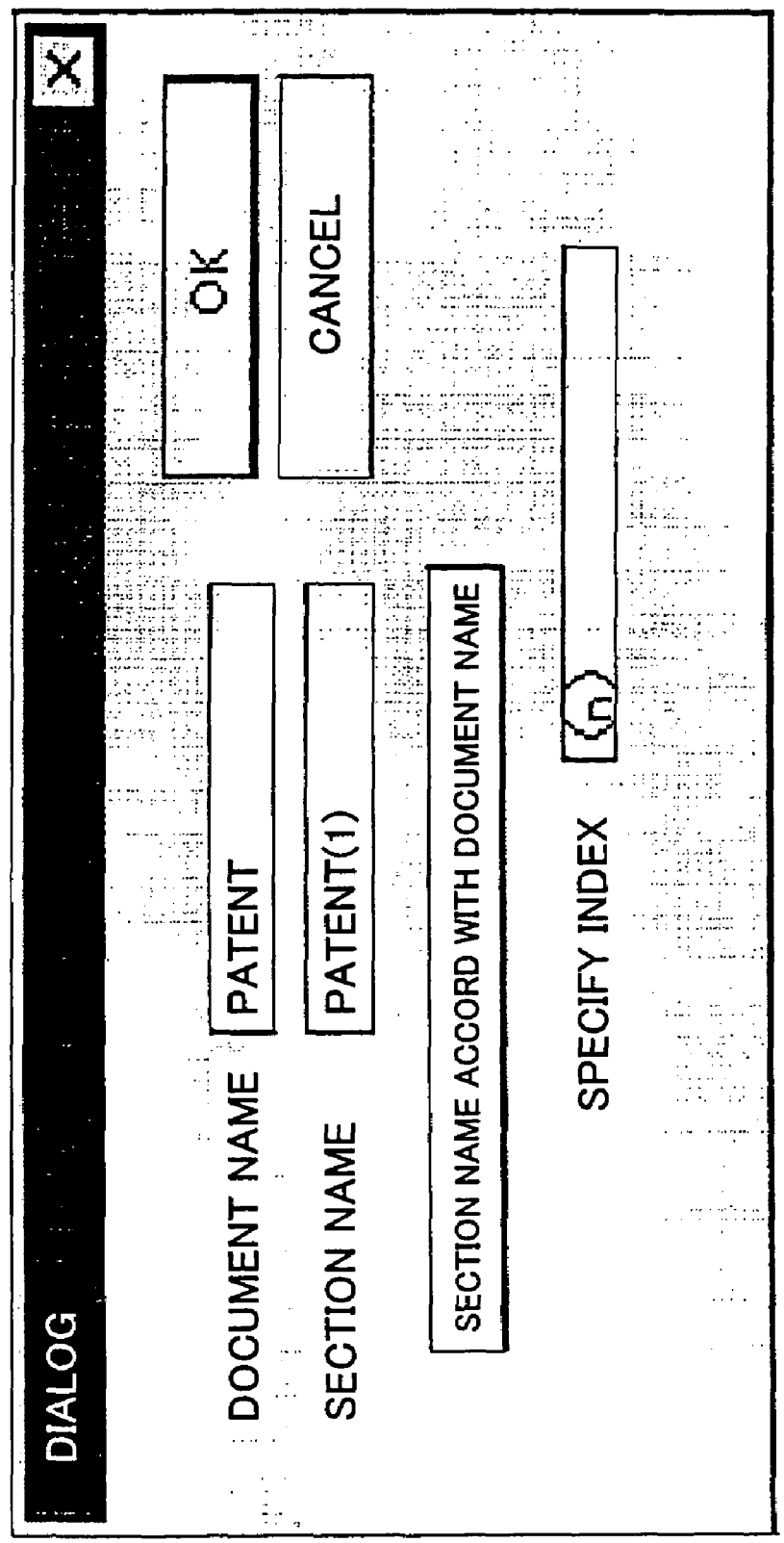

FIGS. 33 and 34 show examples of the above-mentioned property dialog box displayed on the display monitor 102.

However, this example is different from the above-mentioned example. In this example, the document name consisting of a plurality of sections is 'PATENT', and the section names of the sections constituting this document are 'SUMMARY', 'MEETING MINUTES', 'SPECIFICATION', 'DRAWINGS', . . . , respectively.

FIG. 33 shows the property dialog box shown in the display monitor 102 in S212 mentioned above in this example.

When the operator enters '(n)' in the box of 'SPECIFY INDEX' and pushes the button 'SECTION NAME ACCORD WITH DOCUMENT NAME' in this state, the original section name 'SUMMARY' is changed into 'PATENT(1)' in accordance with the document name 'PATENT' as a result of the index '(1)' in the specified type being added thereto. Accordingly, the display is updated into the state shown in FIG. 34 in S215.

The control part 116 repeats the above-mentioned operations, and, thereby, changes the section names of the respective sections constituting the above-mentioned document 'PATENT' into 'PATENT(1)', 'PATENT(2)', 'PATENT(3)', . . . , in sequence, and, then, when completing changing the section names of all the sections constituting the document 'PATENT', the control part 116 finishes this process.

The operator should perform the operations of entering the desire type of index in the box of 'SPECIFY INDEX' and pushing the button 'SECTION NAME ACCORD WITH DOCUMENT NAME' only once when the first section name 'SUMMARY' is displayed, and, thereby, the section names subsequent thereto are automatically changed as described above in accordance with the document name.

Thus, it is possible for an operator to specify the type of index added as a part of each section name to a desired one, and, thereby, in comparison to the case of the above-described second embodiment where an index is added in a type which is of system default, it is possible to improve work efficiency because each section name is created in accordance with the operator's intention.

Figure 35:
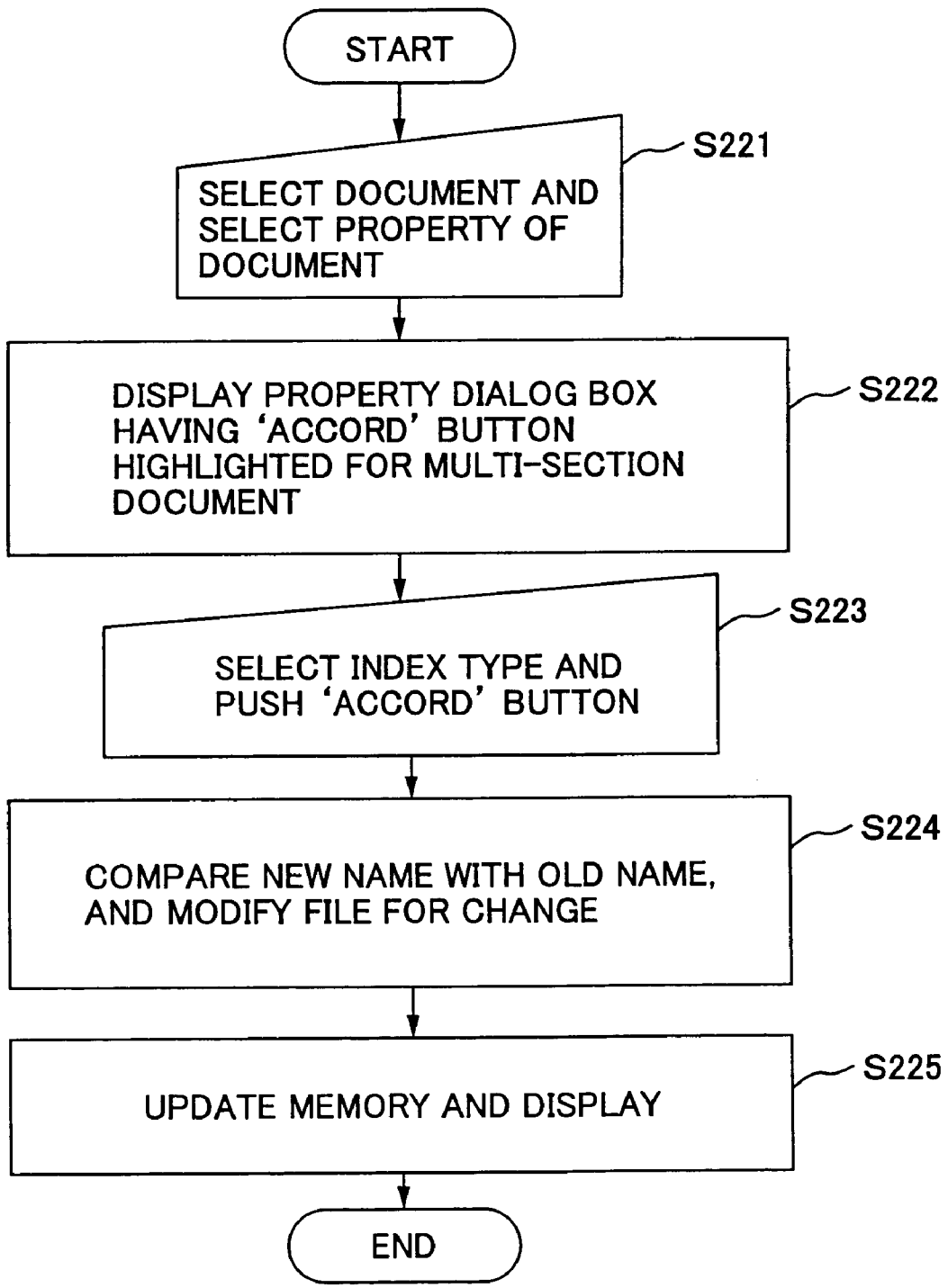
FIG. 35 shows a flow chart of operations of a fourth embodiment of the present invention.

FIG. 35 shows a flow chart of operations of a fourth embodiment of the present invention.

First, in S221, an operator selects the above-mentioned document 'A' consisting of the plurality of sections from the page shown in FIG. 27, and operates the menu region so as to instruct the system to display a 'property of document'.

As a result, the control part 116 determines from the information loaded in the memory 115 in S222 whether or not the thus-selected document is a document consisting of a plurality of sections. In this case, the document selected in S221 is the document consisting of the popularity of section as mentioned above. In the case, the control part 116 displays on the display monitor 102 a property dialog box in which a button 'SECTION NAME ACCORD WITH DOCUMENT NAME' is highlighted, and a list of types of index stored in the main storage medium is loaded in the memory 115 and can be referred to (in a manner of a well-known pull-down menu, in the example of FIG. 36). It is assumed that the above-mentioned list of types of index is previously registered by the operator, and, for example, includes 'n-th', '-n', 'OF ITEM n', 'of the month of n', and so forth.

Then, in S223, the operator selects a desired type of index from the list of types of index appearing from a box of 'SPECIFY INDEX' in the property dialog box displayed in S222 by working the keyboard, and pushes the highlighted button 'SECTION NAME ACCORD WITH DOCUMENT NAME', in S223. It is assumed that the type of index entered by the operator is 'OF ITEM n'.

As a result, the control part 116 creates, for the sections constituting the document, section names each consisting of the document name 'A' and an index, in accordance with the document name 'A' of this document in S224. At this time, each section name created has an index in the type selected in S223 added. Specifically, for the section names 'a', 'b', 'c', . . . , 'A OF ITEM 1', 'A OF ITEM 2', 'A OF ITEM 3', . . . are created as the new section names, respectively. Then, the control part 116 compares the thus created section names with the existing section names in the memory 115. In this case, the created section names are different from the existing section names. When the change is thus found, the control part 116 changes the section-information management file stored in the main storage medium 111 in accordance with the change.

Then, in S225, the control part 116 obtains information from the section-information management file changed in S224 stored in the main storage medium 111, and, in accordance with the thus-obtained information, updates the information in the memory and the display on the display monitor 102.

Figure 36:
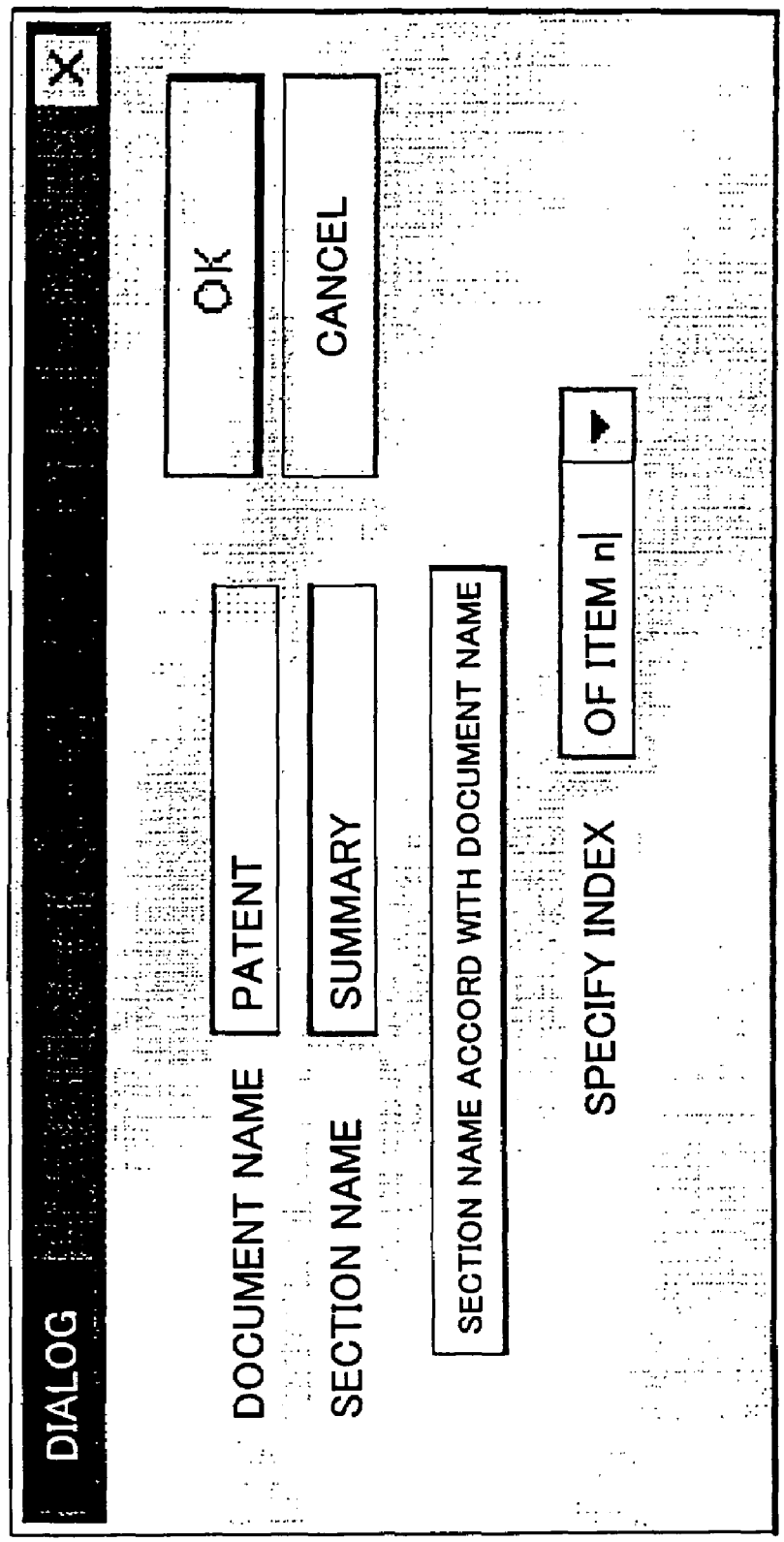
FIGS. 36 and 37 show a dialog box displayed on the display monitor in the operations shown in FIG. 35.
Figure 37:
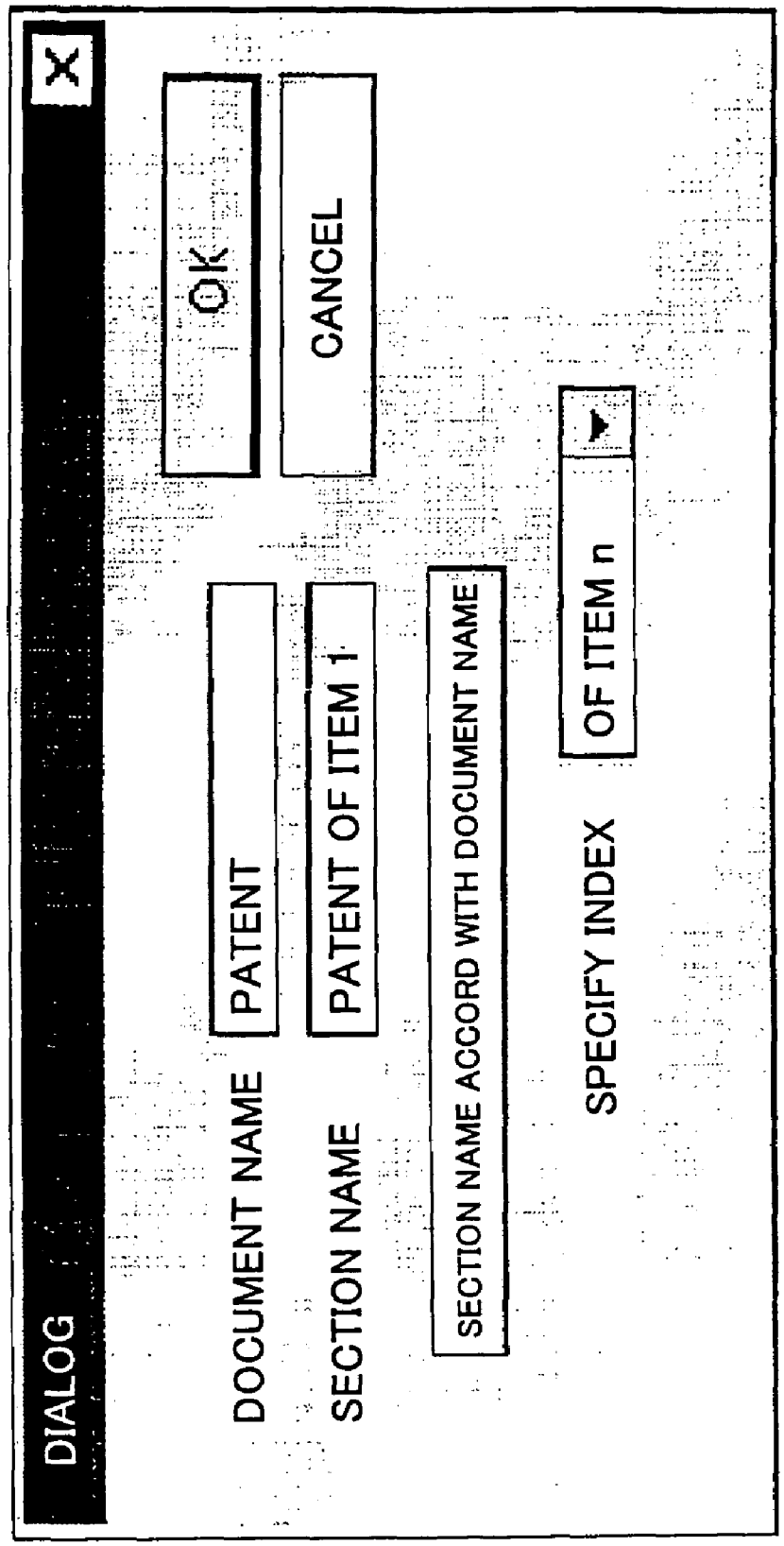

FIGS. 36 and 37 show examples of the above-mentioned property dialog box displayed on the display monitor 102.

However, this example is different from the above-mentioned example. In this example, the document name consisting of a plurality of sections is 'PATENT', and the section names of the sections constituting this document are 'SUMMARY', 'MEETING MINUTES', 'SPECIFICATION', 'DRAWINGS', . . . , respectively.

FIG. 36 shows the property dialog box shown in the display monitor 102 in S222 mentioned above in this example.

When the operator selects 'OF ITEM n' from the list appearing from the box of 'SPECIFY INDEX' and pushes the button 'SECTION NAME ACCORD WITH DOCUMENT NAME' in this state, the original section name 'SUMMARY' is changed into 'PATENT OF ITEM 1' in accordance with the document name 'PATENT' as a result of the index 'OF ITEM 1' in the selected type being added thereto. Accordingly, the display is updated into the state shown in FIG. 37 in S225.

The control part 116 repeats the above-mentioned operations, and, thereby, changes the section names of the respective sections constituting the above-mentioned document 'PATENT' into 'PATENT OF ITEM 1', 'PATENT OF ITEM 2', 'PATENT OF ITEM 3', . . . , in sequence, and, then, when completing changing the section names of all the sections constituting the document 'PATENT', the control part 116 finishes this process.

The operator should perform the operations of selecting the desire type of index from the box of 'SPECIFY INDEX' and pushing the button 'SECTION NAME ACCORD WITH DOCUMENT NAME' only once when the first section name 'SUMMARY' is displayed, and, thereby, the section names subsequent thereto are automatically changed as described above in accordance with the document name.

Thus, the operator previously registers desired types of index, and selects one thereof so that each section name is produced using the selected type of index. Thereby, in comparison to the case in the above-descried third embodiment where the operator inputs a type of index each time the function is executed, it is possible to improve work efficiency.

Figure 38:
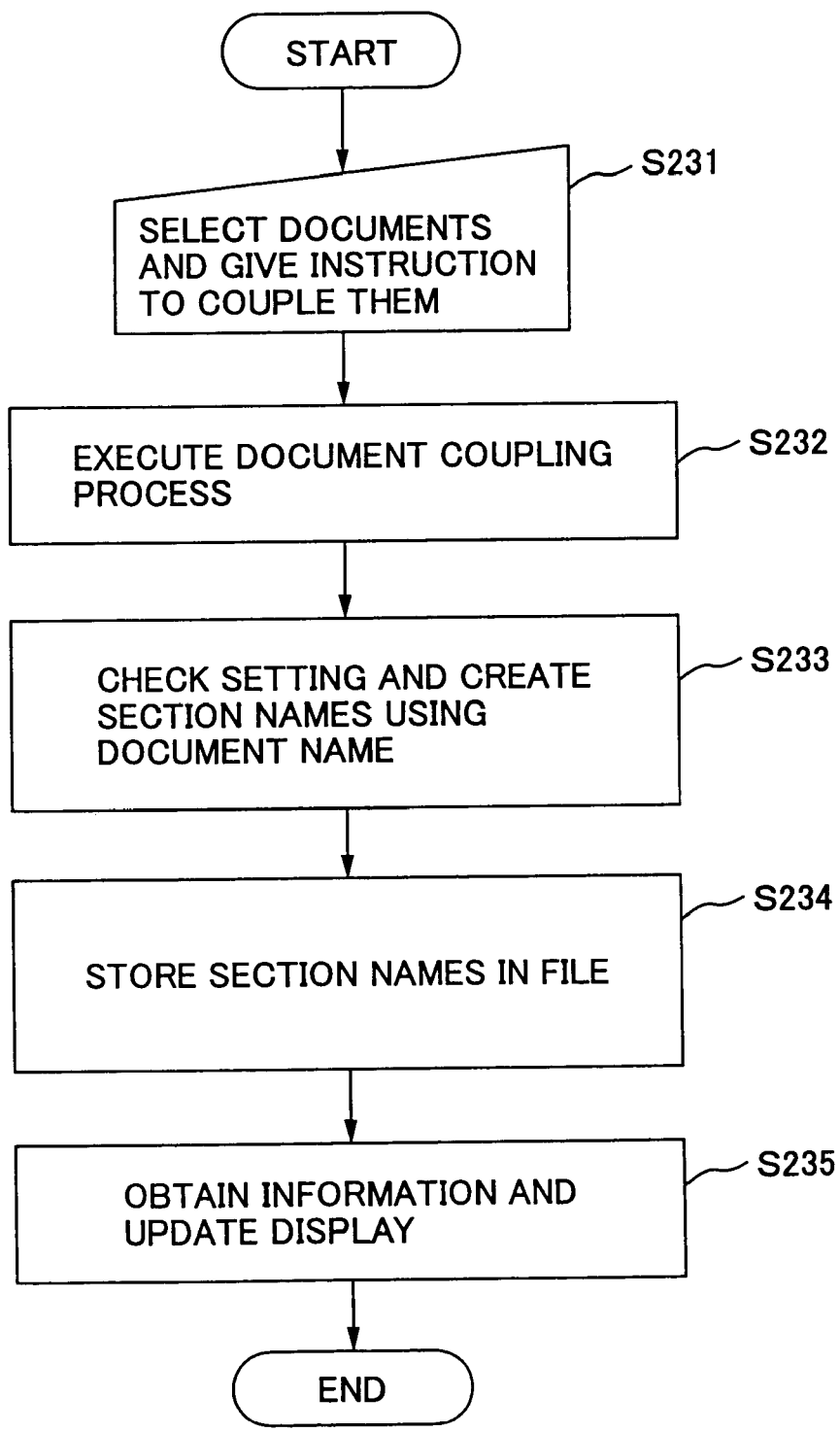
FIG. 38 shows a flow chart of operations of a fifth embodiment of the present invention.

FIG. 38 shows a flow chart of operations of a fifth embodiment of the present invention.

As a presupposition, it is assumed that a plurality of documents are already registered in the main storage memory 111, and are displayed in the page shown in FIG. 27. In this state, all the information of the documents displayed is loaded in the memory 115. Further, setting of 'to change section names at a time of document coupling' is written in a system setting information file stored in the main storage medium 111, and the information of this setting is loaded in the memory 115 at a time of starting up of the document management system.

In S231, an operator selects a plurality of documents from the page of FIG. 27, and instructs the system to perform 'document coupling' by operating the menu region of the page.

As a result, the control part 116 executes a document coupling process as described above the in S232. As a result, the plurality of documents selected in S231 are coupled to each other, and become a single document. Above, the document coupling process has been described as a process of coupling a coupling-source document to a coupling-target document. However, when more than two documents are coupled to each other, two of them are coupled to one another as described above and become a coupling-source document, the third one becomes a coupling-target document, and the same process is executed for these documents. Coupling of subsequent documents will be performed in the same manner.

Then, in S233, the control part 116 refers to the information concerning the setting of 'to change section names at a time of document coupling', and, thereby, recognizes that this setting is made. As a result, the control part 116 creates section names of the respective sections constituting the document (for example, it is assumed that this document has a document name 'PATENT') obtained from the plurality of document through the document coupling process in S232 as a result of adding indexes to the document name, respectively. (In this example, the thus-created respective section names are 'PATENT-1', 'PATENT-2', 'PATENT-3'.)

Then, in S234, the control part 116 relates the thus-created section names of the respective sections to the corresponding sections, respectively, and stores them in the section-information management file stored in the main storage medium 111.

Then, in S235, the control part 116 obtains from the main storage medium 111 the document information which is changed through the document coupling process in S232, updates the display of the page on the display monitor 102 using this new document information, and finishes the process.

In each of the above-described second, third and fourth embodiments, section names in accordance with a document name are created as a result of an operator performing the special operation on the system after performing a document coupling process. That is, the operator's special operation triggers the execution of the function of each embodiment. Therefore, the operator should perform the special operation each time. In contrast to this, in the fifth embodiment, as a result of the operator previously performing the setting of 'to change section names at a time of document coupling', the section names are automatically changed into ones consisting of the document name and indexes added thereto, respectively, when a document coupling process is performed. Accordingly, work efficiency can be improved.

Figure 39:
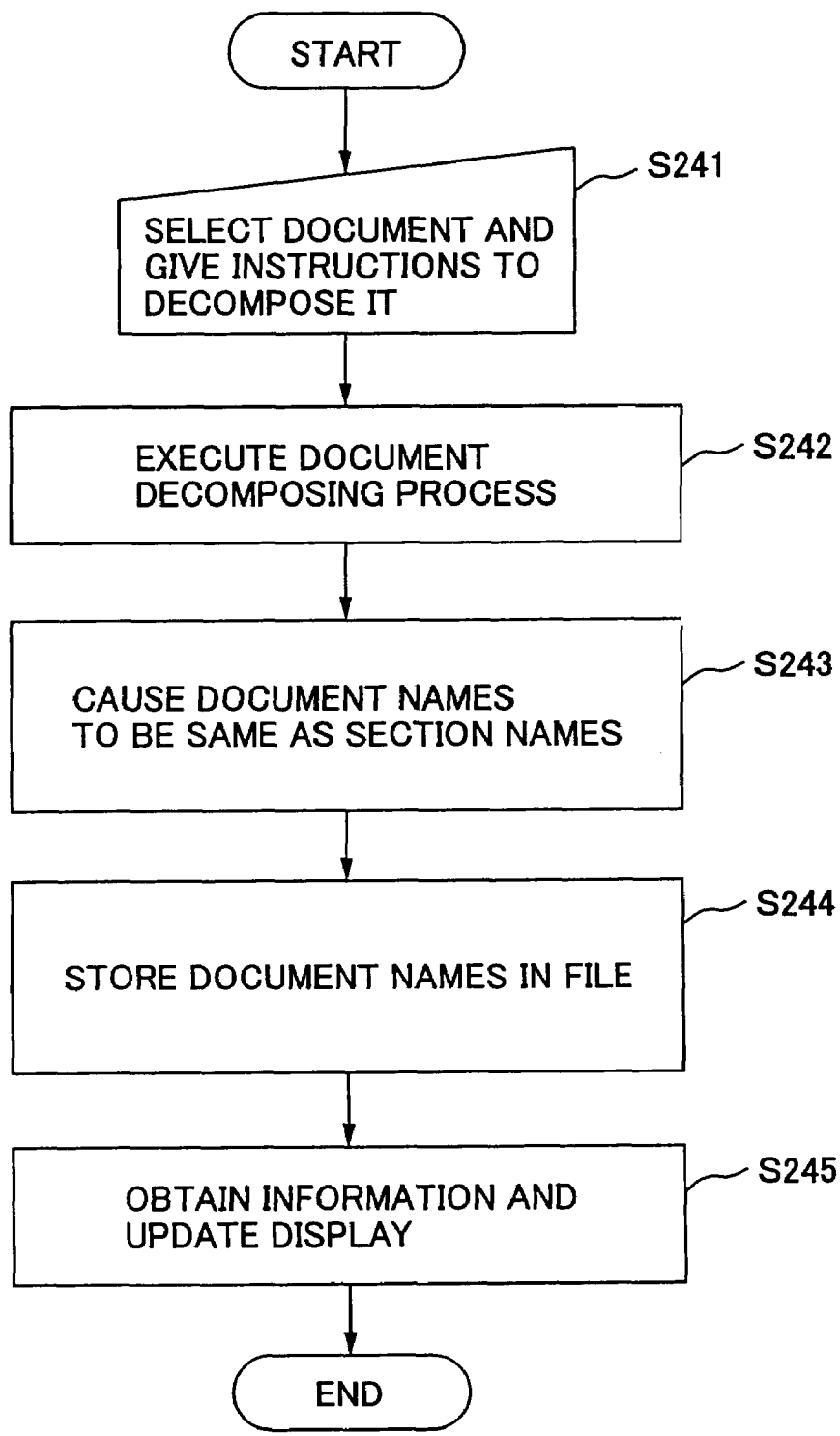
FIG. 39 shows a flow chart of operations of a sixth embodiment of the present invention.

FIG. 39 shows a flow chart of operations of a sixth embodiment of the present invention.

As a presupposition, it is assumed that, for example, already the operations same as those of one of the above-described second, third, fourth and fifth embodiments are performed, a document consisting of a plurality of sections each having a section name (in this example, 'PATENT-1', 'PATENT-2', 'PATENT-3', for example) consisting of a document name (for example, 'PATENT') of the document and an index are registered in the main storage medium 111, and are displayed in the page of FIG. 27 on the display monitor 102. In this state, the information of the displayed documents is loaded in the memory 115.

That is, an embodiment can be created from a combination of the sixth embodiment and any of the second, third, fourth and fifth embodiments. In this case, the control part 116 executes a program of a predetermined executable file, and, thereby, can perform the operations of any of the second, third, fourth and fifth embodiments, and, also, can perform the operations of the sixth embodiment which will now be described.

First, in S241, an operator selects the above-mentioned document consisting of the plurality of sections from the page of FIG. 27, and instructs the system to perform a 'document decomposing process' by operating the menu region of the page.

As a result, the control part 116 executes the above-described document decomposing process for the document selected in S241, in S242.

Then, in S243, the control part 116 causes the document names of the documents obtained from the document decomposing process to be the same as those of the section names of the sections constituting the respective documents. (In the above-mentioned example, the document names of the respective documents become 'PATENT-1', 'PATENT-2', 'PATENT-3'.

Then, in S244, the control part 116 relates the document names of the respective documents obtained in S243 to the corresponding documents, respectively, and stores them in the document-information management file stored in the main storage medium 111.

Then, in S245, the control part 116 obtains the document information thus changed in S244 from the main storage medium 111, uses this information and thereby updates the display in the page, and finishes the process.

Thus, when a document having section names of the sections constituting the documents changed through the operations same as those of any of the above-described second, third, fourth and fifth embodiments is decomposed to documents each constituting a respective one of those sections, the documents thus obtained through the decomposition are named with the section names of the respective sections. Thereby, when a document is decomposed into a plurality of documents, it is possible to determine which document was a source of each of the documents obtained through the decomposition. As a result, work efficiency can be improved.

Figure 40:
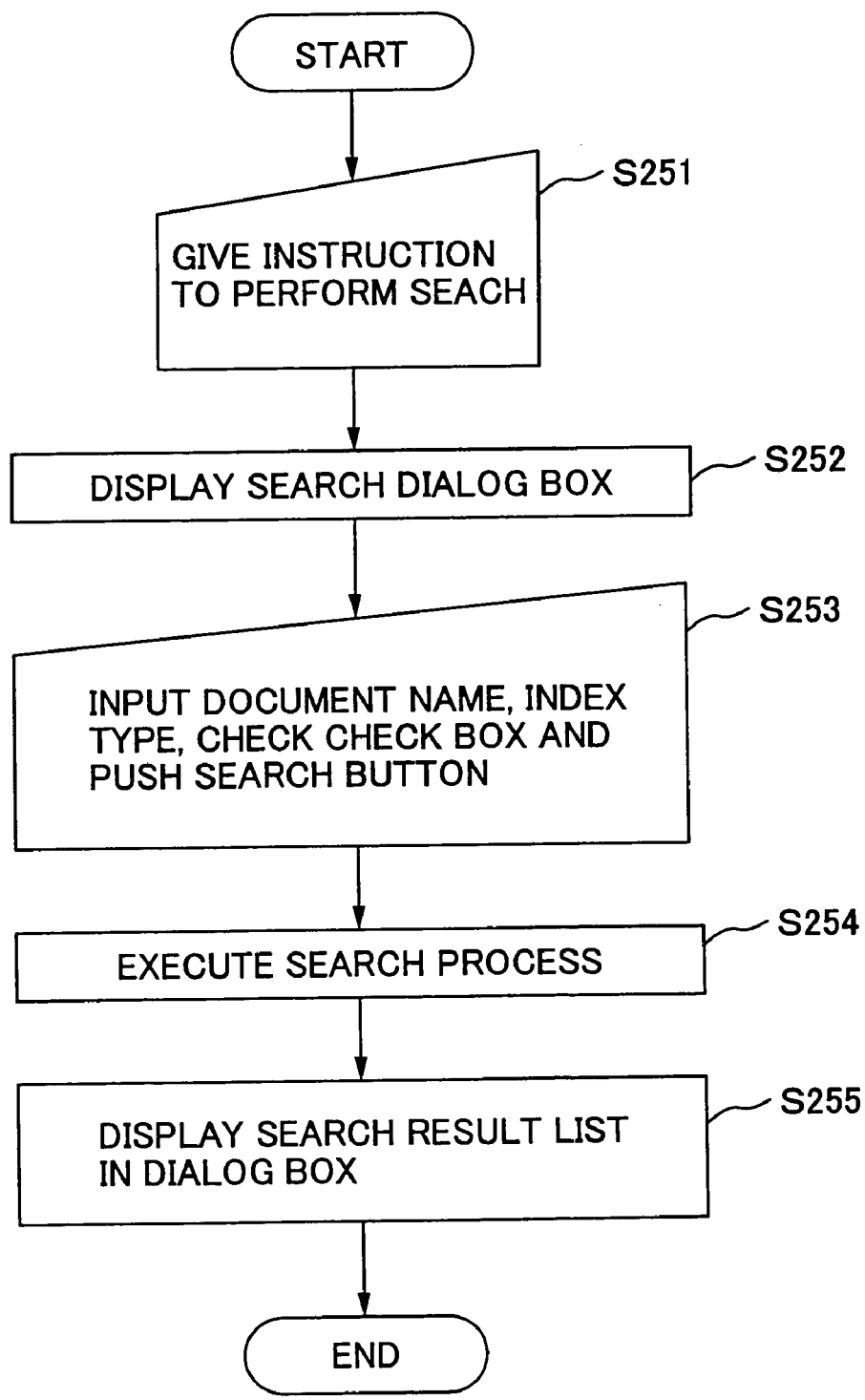
FIG. 40 shows a flow chart of operations of a seventh embodiment of the present invention.

FIG. 40 shows a flow chart of operations of a seventh embodiment of the present invention.

First, as a presupposition, it is assumed that, as a result of the operations same as those of the above-described sixth embodiment being performed, a document consisting of a plurality of sections each having a section name created using the document name of the document and an index is decomposed into documents each consisting of a respective one of those sections, the document names of these documents (in the above-mentioned example, 'PATENT-1', 'PATENT-2' and 'PATENT-3', for example) obtained through the decomposition are caused to be the same as those of the section names of the respective sections, and those documents are registered in the main storage medium 111.

That is, an embodiment can be created from a combination of the seventh embodiment and sixth embodiment. In this case, the control part 116 executes a program of a predetermined executable file, and, thereby, can perform the operations of the sixth embodiment, and, also, can perform the operations of the seventh embodiment which will now be described. Further, similarly, an embodiment can be created from a combination of an embodiment created from a combination of the sixth embodiment and any of the second, third, fourth and fifth embodiments, and the seventh embodiment. That is, an embodiment can be created having the function of any of the second, third, fourth and fifth embodiment, the function of the sixth embodiment and the function of the seventh embodiment together.

First, in S251, an operator instructs the system to perform 'search' by operating the menu region of the page shown in FIG. 27.

Figure 41:
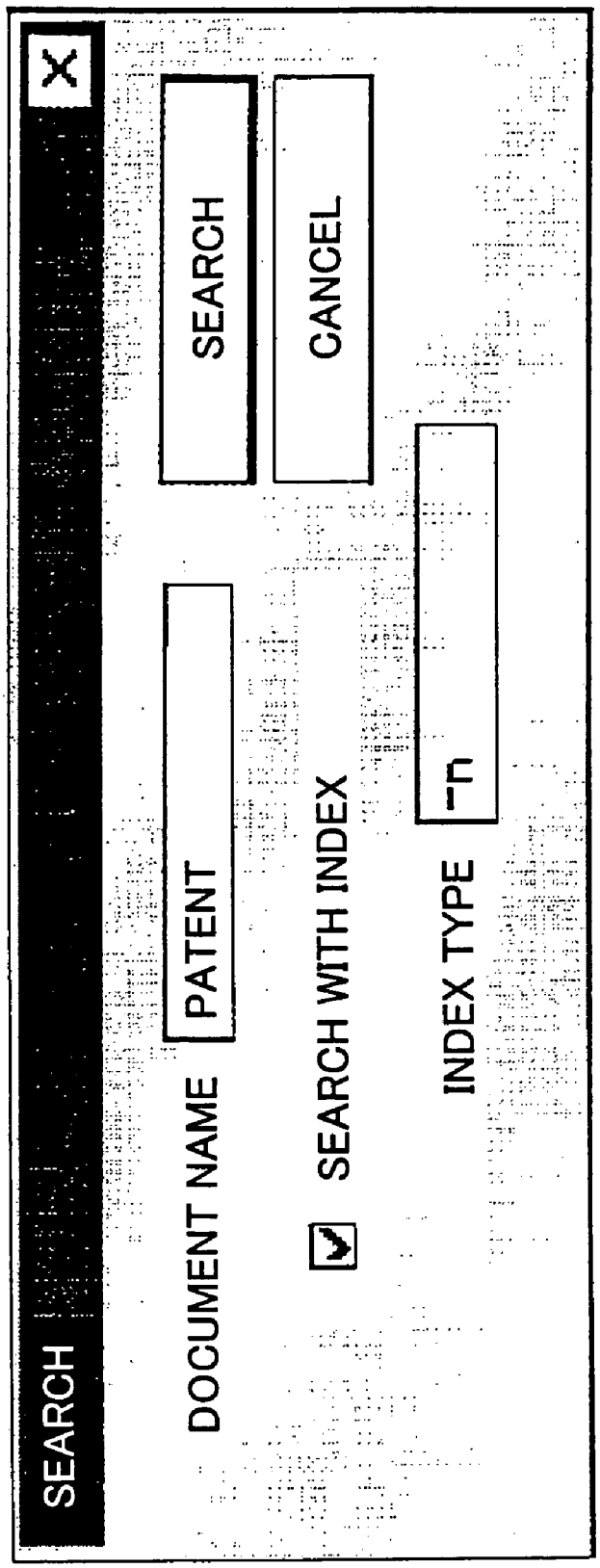
FIGS. 41 and 42 show a dialog box displayed on the display monitor in the operations shown in FIG. 40.

As a result, in S252, the control part 116 displays a search dialog box such as that shown in FIG. 41 (however, each of the space of 'DOCUMENT NAME', the space of 'INDEX TYPE' and the space (check box) of 'SEARCH WITH INDEX' being blank) on the display monitor 102.

The operator enters (inputting by working the keyboard 103) a part (in the above-mentioned example, 'PATENT') of a document name of a document to be searched for, resulting from removing the index, in the space of 'DOCUMENT NAME' of the search dialog box displayed in S252, enters the type of the index of the document name of the document to be searched for, in the space of 'INDEX TYPE' of the search dialog box and enters (through a mouse 104 click) a check mark (✓) in the space of 'SEARCH WITH INDEX' of the search dialog box, in S253. FIG. 41 shows the result thereof. Then, the operator pushes (performs a mouse 104 click) the button 'SEARCH' of the search dialog box.

As a result, the control part 116 executes a search process which will be described later, in S254.

Figure 42:
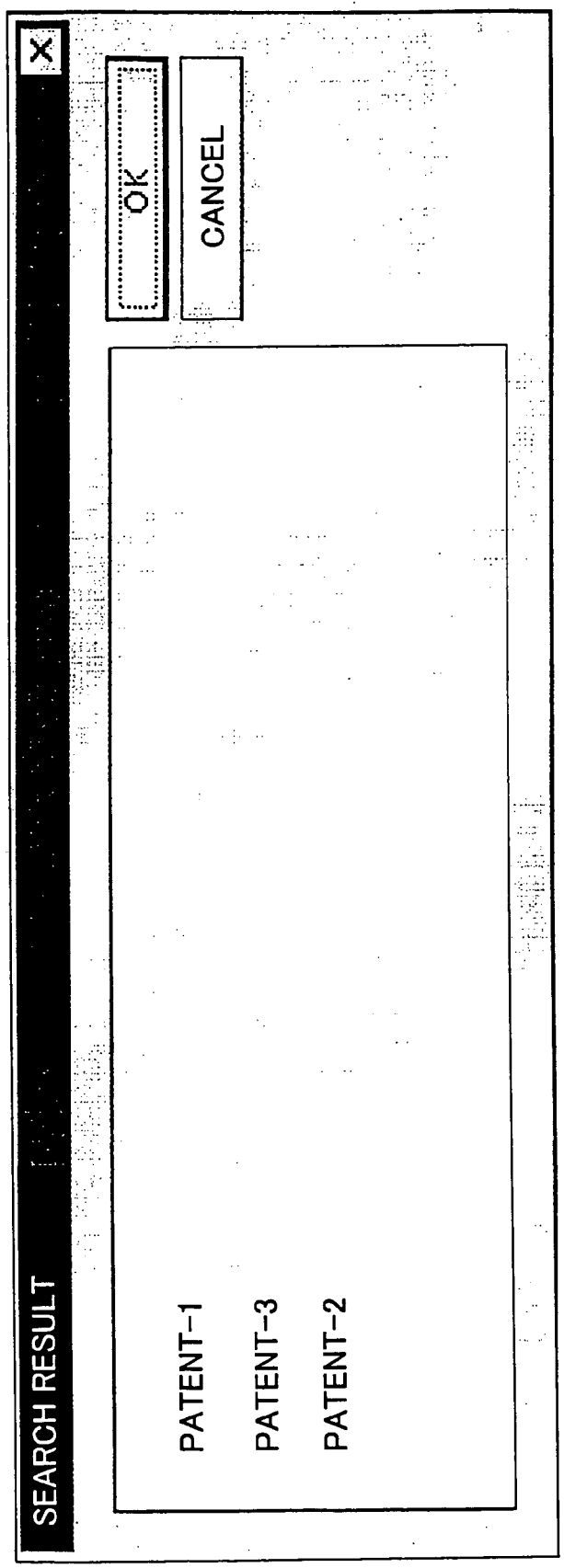

Then, when finishing the search process, the control part 116 displays on the display monitor 102 a list of search results in a search result dialog box, in S255. FIG. 42 shows an example of the search result dialog box displayed then.

The search process executed in S254 by the control part 116 will now be described making reference to FIG. 43.

First, in S261, the control part 116 loads the relevant document-information management file stored in the main storage medium 111 into the memory 115, and sets a pointer at the first document name in the file.

Then, in S262, the control part 116 determines whether or not that document name (at which the pointer is currently set) is the last document name in the file. When determining in S262 that the document name is the last document name in the file, the control part 116 finishes the search process.

When determining in S262 that the document name is not the last document name in the file, the control part 116 determines in S263 whether or not the character string (in the above-mentioned example, 'PATENT') entered in the space of 'DOCUMENT NAME' of the search dialog box in S253 of FIG. 40 coincides with the top character string of the document name at which the pointer is currently set.

When no coincidence results from S263, the operation flow moves to S266, and the pointer is moved to the subsequent document name.

When the coincidence results from S263, it is determined in S264 whether or not the latter character string obtained from removing the part (in the above-mentioned example, 'PATENT') of the coincidence in S263 from the document name at which the pointer is currently set coincides with an index in the type entered in the space of 'INDEX TYPE' of the search dialog box in S253 of FIG. 40.

When no coincidence results from S264, the operation flow moves to S266, and the pointer is moved to the subsequent document name.

When the coincidence results from S264, the operation flow moves to S265, and that document name (at which the pointer is currently set) is stored in the memory 115 as an element of the list of search results.

As a result of the loop of S262, S263, S264, S265 and S266 being repeated, all the document names in the document-information management file are checked, document names each consisting of a combination of the character string of the space of 'DOCUMENT NAME' of the search dialog box and an index in the type of the space of 'INDEX TYPE' of the search dialog box are stored in the memory 115 as elements of the list of search results, and, thus, the list of search results is produced.

In the example of FIG. 41, when the document names each having the character string 'PATENT' at the top thereof and an index of the type of '-n' in the remainder are those 'PATENT-1', 'PATENT-3' and 'PATENT-2', the list of search results shown in FIG. 42 is produced and displayed.

Thus, as a result of searching the document-information management file for documents each having a document name consisting of a common document name and an index in a common type, and obtaining a list thereof, it is possible to obtain the list of documents which were originally coupled to each other, easily, when the documents obtained as a result of a document decomposing process being performed are dispersed in the document-information management file. As a result, work efficiency can be improved.

Figure 44:
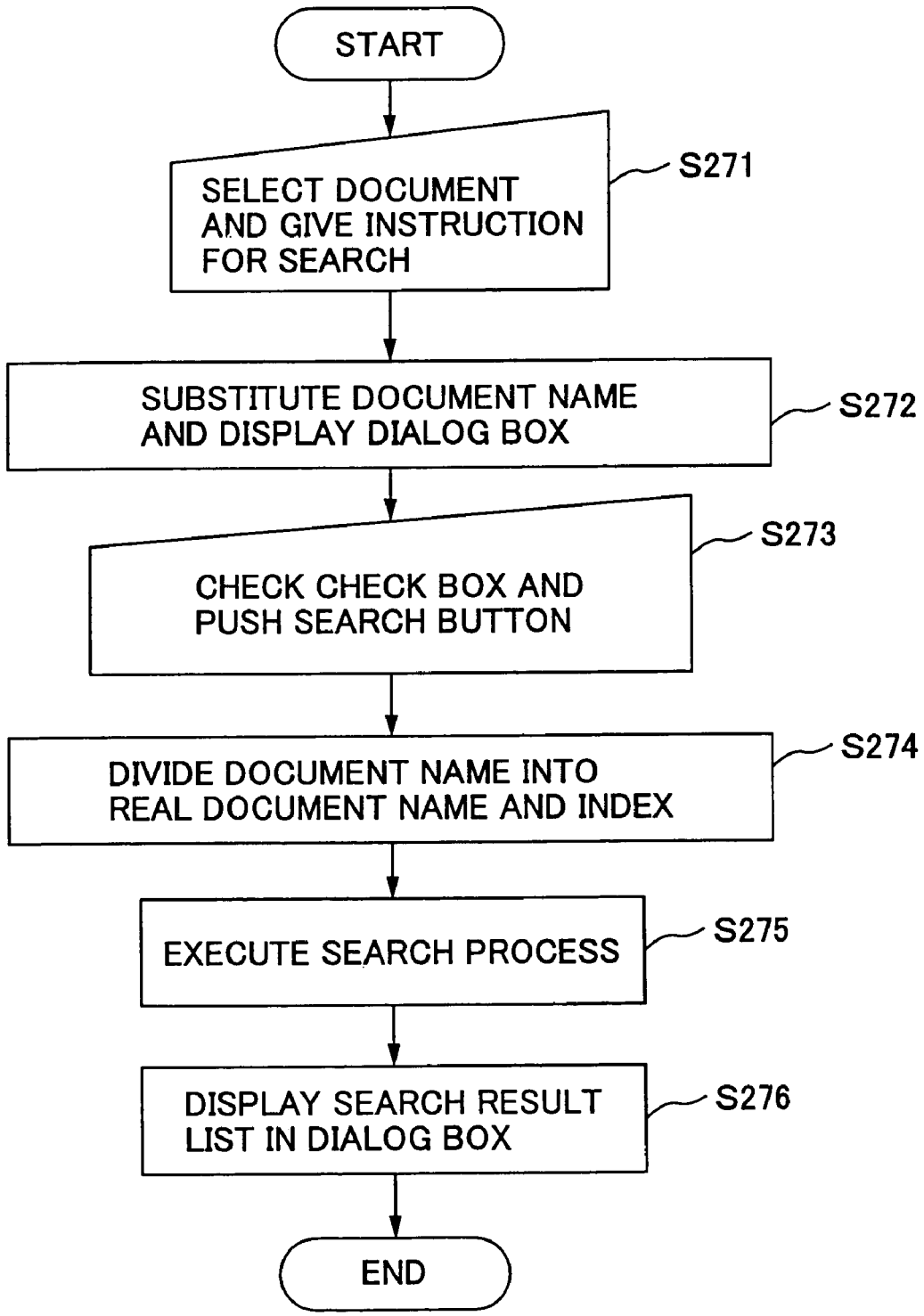
FIG. 44 shows a flow chart of operations of an eighth embodiment of the present invention.

FIG. 44 shows a flow chart of operations of an eighth embodiment of the present invention.

First, same as in the case of the above-described seventh embodiment, as a presupposition, it is assumed that, as a result of the operations same as those of the above-described sixth embodiment being performed, a document consisting of a plurality of sections each having a section name created using the document name of the document and an index is decomposed into documents each consisting of a respective one of those sections, the document names of these documents (in the above-mentioned example, 'PATENT-1', 'PATENT-3' and 'PATENT-2', for example) obtained through the decomposition are caused to be the same as those of the section names of the respective sections, and those documents are registered in the main storage medium 111. In this case, it is also assumed that those document names are displayed in the page of FIG. 27 on the display monitor 102, and all the information of the displayed documents is loaded in the memory 115.

That is, an embodiment can be created from a combination of the eighth embodiment and sixth embodiment. In this case, the control part 116 executes a program of a predetermined executable file, and, thereby, can perform the operations of the sixth embodiment, and, also, can perform the operations of the eighth embodiment which will now be described. Further, similarly, an embodiment can be created from a combination of an embodiment created from a combination of the sixth embodiment and any of the second, third, fourth and fifth embodiments, and the eighth embodiment. That is, an embodiment can be created having the function of any of the second, third, fourth and fifth embodiment, the function of the sixth embodiment and the function of the eighth embodiment together.

First, in S271, an operator selects (through a mouse click) a document (for example, 'PATENT-1') from the page shown in FIG. 27, and instructs the system to perform 'search' by operating the menu region.

Figure 45:
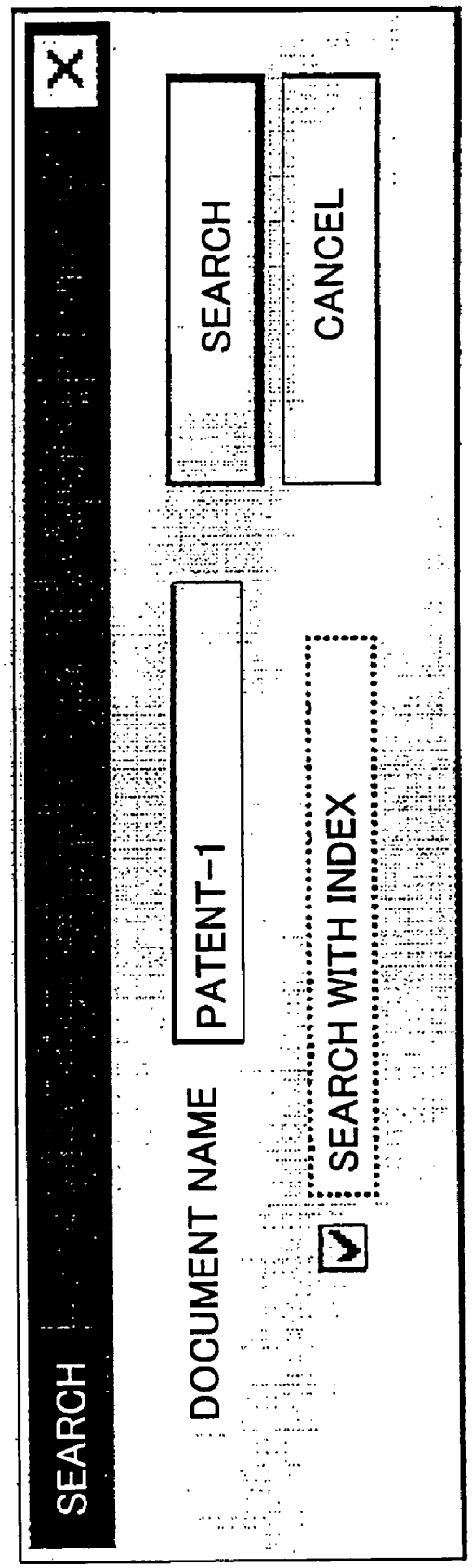
FIGS. 45 and 46 show a dialog box displayed on the display monitor in the operations shown in FIG. 44.

As a result, in S272, the control part 116 displays a search dialog box such as that shown in FIG. 45 in which the document name of the document selected in S271 is substituted for the space of 'DOCUMENT NAME' (however, the space (check box) of 'SEARCH WITH INDEX' is blank) on the display monitor 102.

The operator enters (through a mouse 104 click) a check mark (✓) in the space of 'SEARCH WITH INDEX' of the search dialog box, in S273. FIG. 45 shows the result thereof. Then, the operator pushes (performs a mouse 104 click) the button 'SEARCH' of the search dialog box.

As a result, the control part 116 extracts the index from the character string substituted for the space of 'DOCUMENT NAME' of the search dialog box in S272, and, thus, divides that character string into the 'part having the index removed therefrom' and the 'index', in S274.

Figure 43:
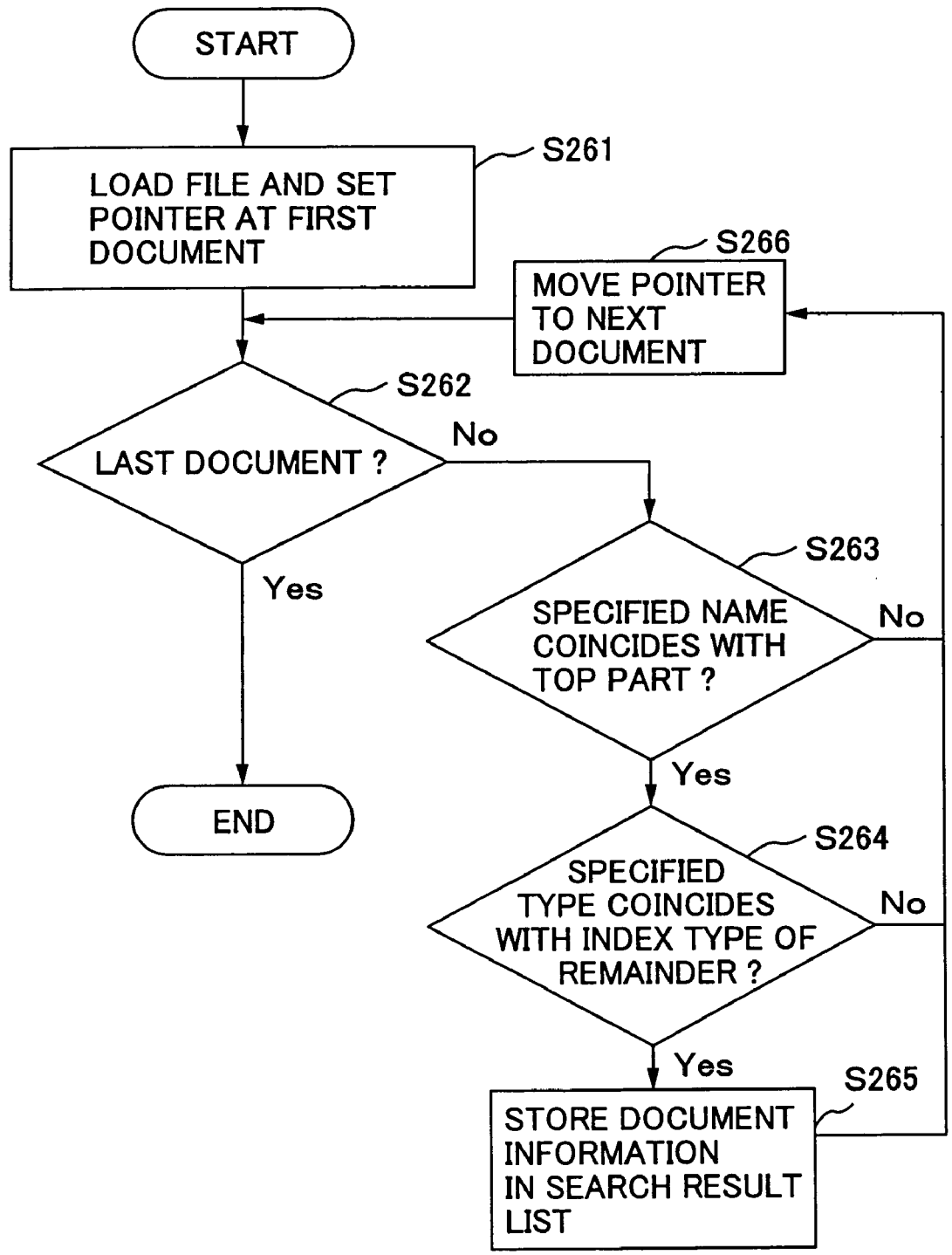
FIG. 43 shows a flow chart of operations of a search process shown in FIG. 40.

Then, the control part 116 executes the above-described search process shown in FIG. 43, in S275. However, in this case, the control part 116 searches for documents each having a document name having the 'part having the index removed therefrom' obtained from dividing the document name in S274 at the top thereof and an index in the type same as the type of the 'index' obtained from dividing the document name in S274 in the remainder. For example, the 'part having the index removed therefrom' is 'PATENT' and the 'index' is '-1', in the above-mentioned example. Therefore, documents each having a document name having 'PATENT' at the top and an index in the index type '-n' in the remainder are searched for.

Figure 46:
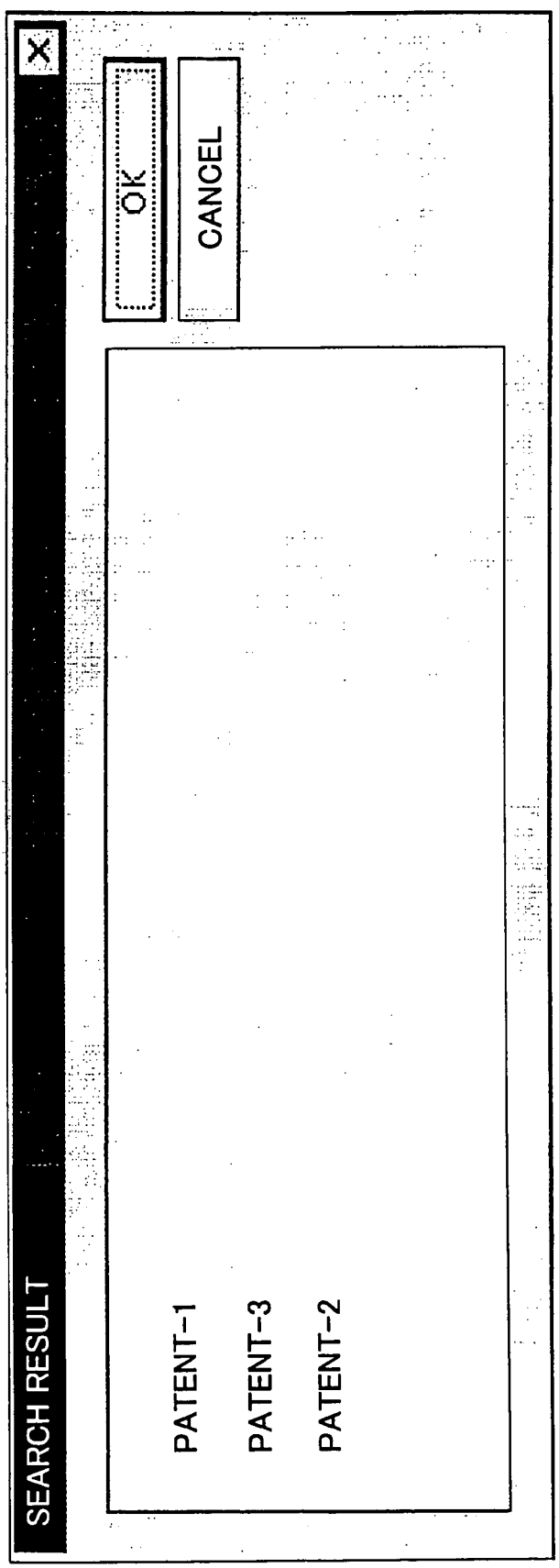

Then, when finishing the search process, the control part 116 displays on the display monitor 102 a list of search results in a search result dialog box, in S276. FIG. 46 shows an example of the search result dialog box displayed then.

A method of extracting the index from a document name in S274 will now be described. For example, types of index of system default and specified and/or registered by an operator in the past are stored as a list of types of index. Then, the types of index included in the list of types of index are compared with a character string in a latter part of a document name, and, when the type of index corresponding to the character string in the latter part of the document name is found out from the list of types of index, the corresponding character string is extracted as an index.

Thus, as a result of searching the document-information management file for documents each having a document name consisting of a common document name and an index in a common type, and obtaining a list thereof, it is possible to obtain the list of documents which were originally coupled to each other, easily, when the documents obtained as a result of a document decomposing process being performed are dispersed in the document-information management file. As a result, work efficiency can be improved.

Further, in contrast to the case of the seventh embodiment, it is possible to further improve the work efficiency because it is not necessary for an operator to input a document name and a type of index by working the keyboard 103.

Figure 47:
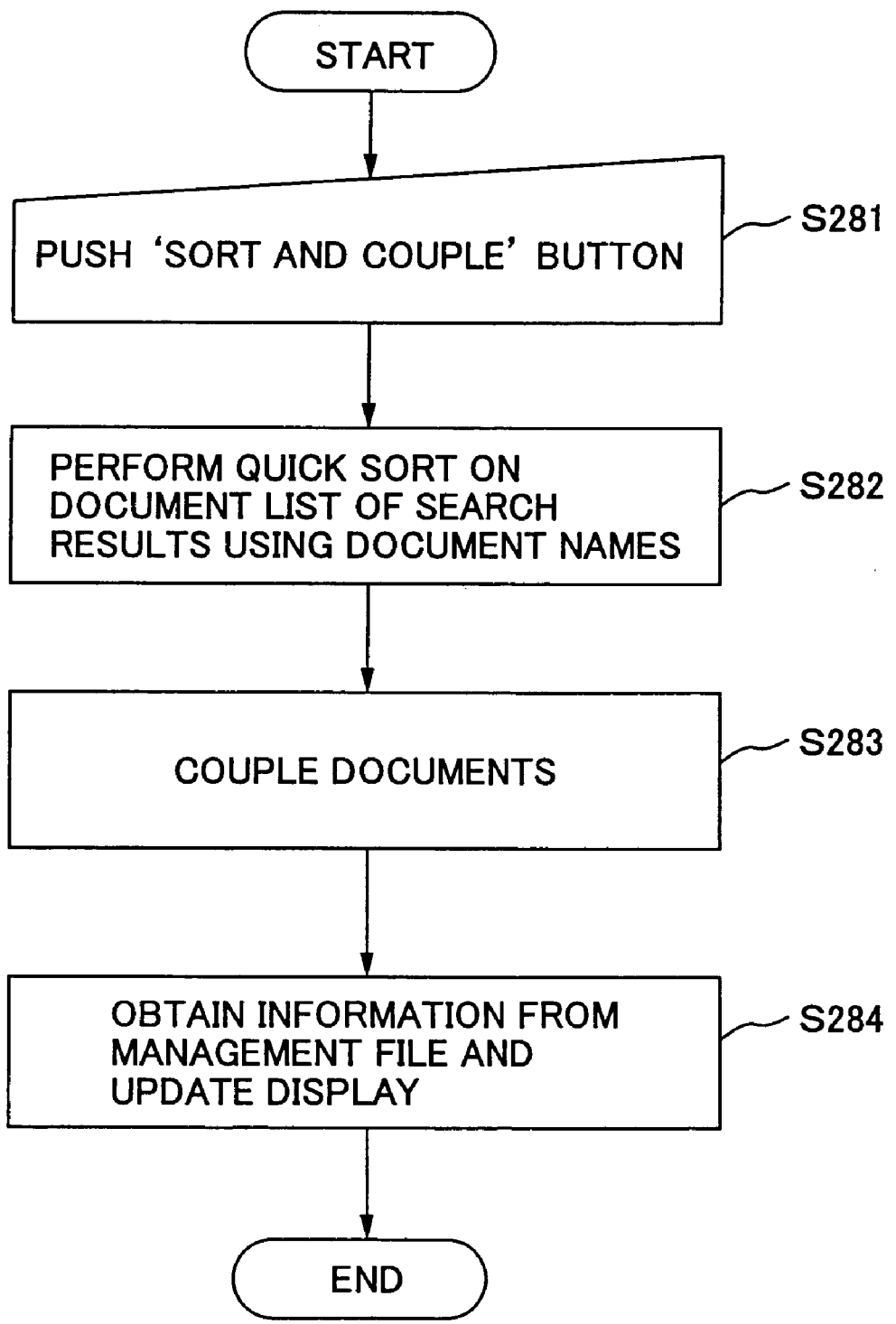
FIG. 47 shows a flow chart of operations of a ninth embodiment of the present invention.

FIG. 47 shows a flow chart of operations of a ninth embodiment of the present invention.

This embodiment is an embodiment having the following function in addition to the function of the above-described seventh or eighth embodiment.

Figure 48:
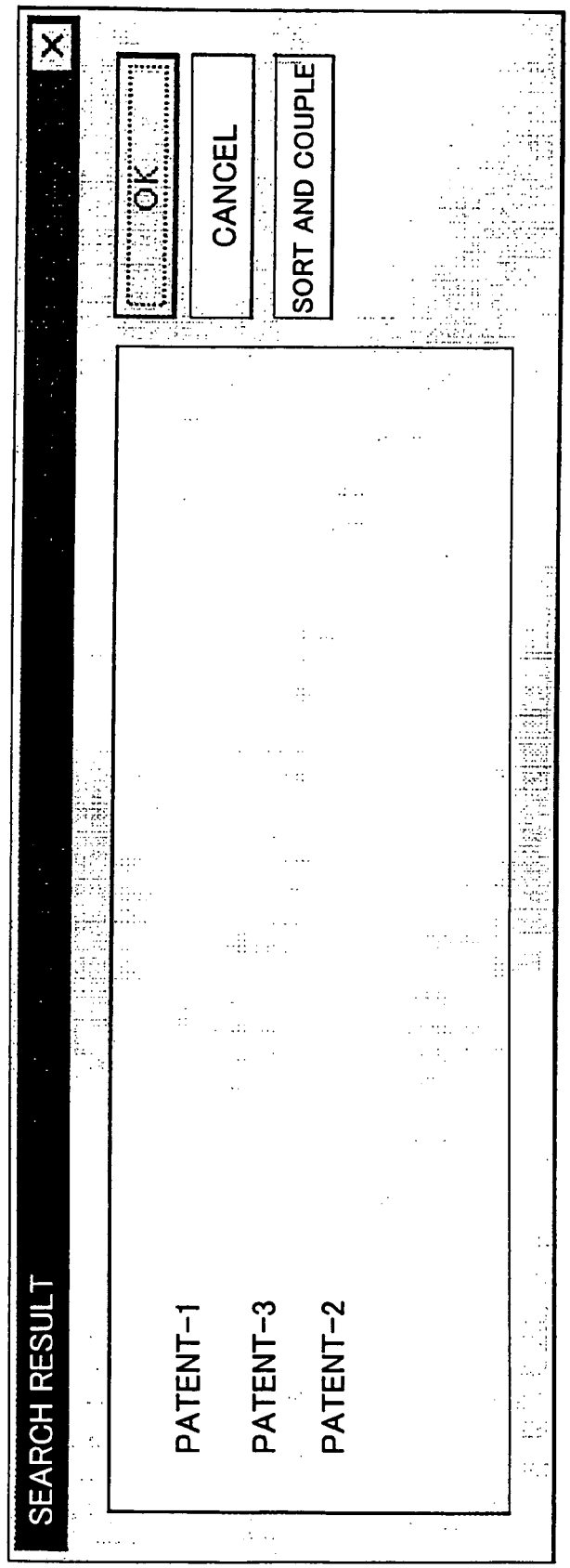
FIG. 48 show a dialog box displayed on the display monitor in the operations shown in FIG. 47.

As a presupposition, it is assumed that the dialog box of a list of document search results is displayed on the display monitor 102 as a result of the function of the seventh or eighth embodiment being executed. However, in this embodiment, as shown in FIG. 48, a button 'SORT AND COUPLE' is added to the dialog box. Further, it is assumed that the document information displayed there is loaded in the memory 115.

First, in S281, an operator pushes (through a mouse 104 click) the button 'SORT AND COUPLE' of the dialog box of the list of document search results displayed on the display monitor 102.

As a result, in S282, the control part 116 executes a sort process for the documents listed in the document list displayed in the dialog box of the list of document search results, in order of index. For example, in the example of FIG. 48, sort is performed in order of index of the indexes '-1', '-3' and '-2' of the document names 'PATENT-1', 'PATENT-3' and 'PATENT-2' so that those documents names are sorted into those in the order of 'PATENT-1', 'PATENT-2' and 'PATENT-3'.

Then, the control part 116 couples together the documents listed in the document list displayed in the dialog box of document search results, in the order obtained in S282, in S283. That is, the document 'PATENT-2' (coupling source) is coupled to the document 'PATENT-1' (coupling target), and, then, to the document (coupling target) resulting from this coupling, the document 'PATENT-3' (coupling source) is coupled (see the above description of the document coupling process).

Then, the control part 116 obtains the document information from the document-information management file changed as a result of S283, and updates the display on the display monitor 102 in accordance with the thus-obtained document information, in S284, and finishes this process.

Although the ninth embodiment has the function of the seventh or eighth embodiment and the function shown in FIG.

47 added thereto as described above, it is not necessary to be limited thereto, and another embodiment may be created as a result of the function of the sixth embodiment being further added, and another embodiment may be created as a result of the function of any of the second, third, fourth and fifth embodiments being further added.

Thus, based on search results obtained from execution of the function of seventh or eighth embodiment, sort is performed in order of index of the indexes included in the document names of the respective documents, and the documents are coupled to each other in order of the sort result. Thereby, when the information of documents obtained from document decomposition is dispersed in the document-information management file as a result of execution of the document decomposing process, it is easy to couple these documents again. As a result, it is possible to improve work efficiency.

Figure 49:
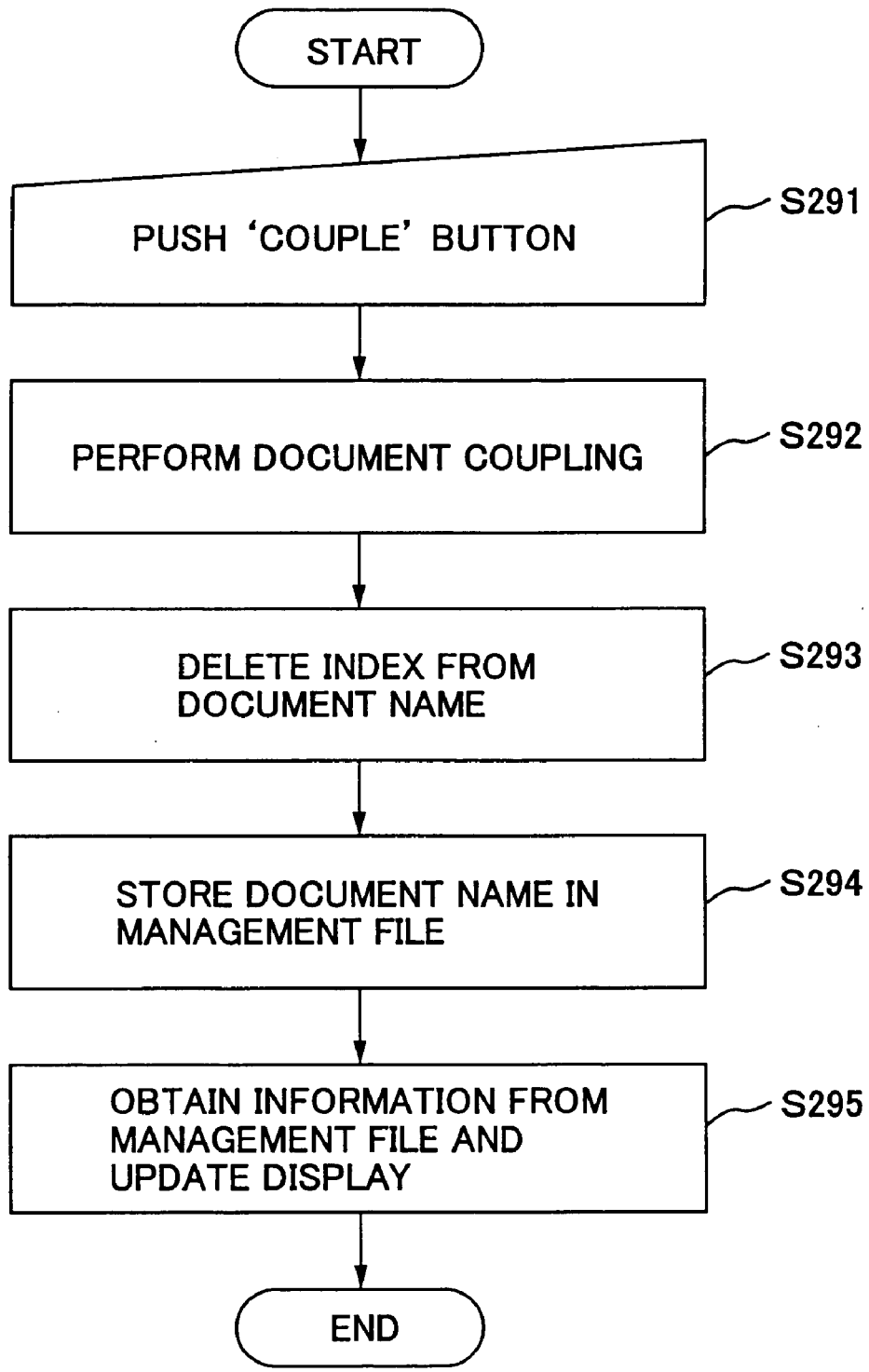
FIG. 49 shows a flow chart of operations of a tenth embodiment of the present invention.

FIG. 49 shows a flow chart of operations of a tenth embodiment of the present invention.

Same as the case of the above-described ninth embodiment, the tenth embodiment has the function of the seventh or eighth embodiment and the following function added thereto.

Figure 50:
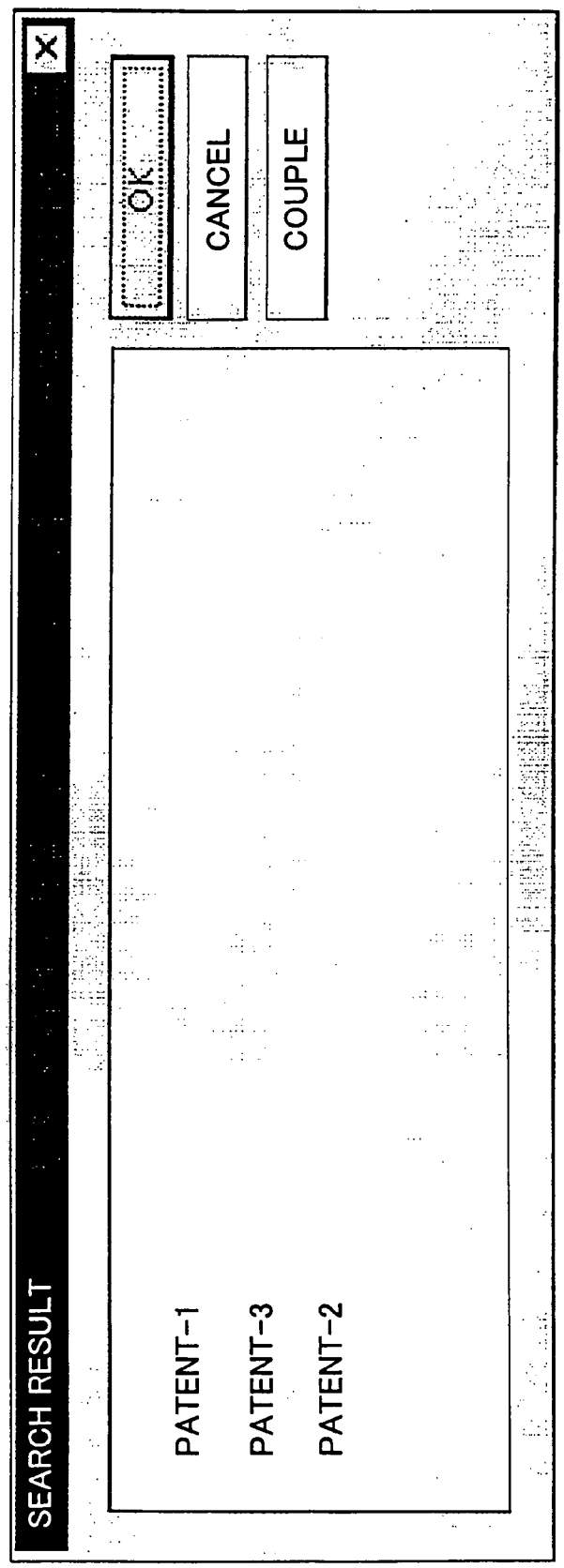
FIG. 50 show a dialog box displayed on the display monitor in the operations shown in FIG. 49.

As a presupposition, it is assumed that the dialog box of a list of document search results is displayed on the display monitor 102 as a result of the function of the seventh or eighth embodiment being executed. However, in this embodiment, as shown in FIG. 50, a button 'COUPLE' is added to the dialog box. Further, it is assumed that the document information displayed there is loaded in the memory 115.

First, in S291, an operator pushes (through a mouse 104 click) the button 'COUPLE' of the dialog box of the list of document search results displayed on the display monitor 102.

As a result, the control part 116 couples together the documents listed in the document list displayed in the dialog box of the list of document search results in S292 (see the above description of the document coupling process).

As mentioned above, generally, the document name of a document is created from the section name of the first section of the sections constituting the document. Therefore, if so, a document name of the document obtained from the document coupling process is the section name of the first section of the sections constituting the document, that is, in the above-mentioned example, the section name 'PATENT-1' of the first section of the sections constituting the document resulting from the document coupling process becomes the document name of the document as it is.

Then, in S293, the control part 116 deletes the index from the thus-obtained document name, and uses the remainder as a new document name. That is, the document name of the document is determined to be the remainder of deletion of the index from the section name of the first section of the sections constituting that document. In the above-mentioned example, the index '-1' is deleted from 'PATENT-1', and the remainder 'PATENT' is determined as the new document name.

Then, the control part 116 relates the document name obtained in S293 to the corresponding document and stores it in the document-information management file stored in the main storage medium 111 in S294.

Then, in S295, the control part 116 obtains the document information from the document-information management file changed as a result of S294, and updates the display on the display monitor 102 in accordance with the thus-obtained document information, and finishes this process.

In the tenth embodiment, operations as in the ninth embodiment in that a sort process is performed before a document coupling process, and the document coupling is performed in the order obtained from the sort process are not performed. However, it is also possible to add the function of the ninth embodiment to the tenth embodiment so that a sort process is performed before a document coupling process, the document coupling is performed in the order obtained from the sort process, the index is deleted from the document name of the resulting document and the remainder is used as a new document name of that document.

Although the tenth embodiment has the function of the seventh or eighth embodiment and the function shown in FIG. 49 added thereto as described above, it is not necessary to be limited thereto, and another embodiment may be created as a result of the function of the sixth embodiment being further added, and another embodiment may be created as a result of the function of any of the second, third, fourth and fifth embodiments being further added.

Thus, after a document coupling process is executed based on search results obtained from execution of the function of seventh or eighth embodiment, the remainder of deletion of the index from the section name of the first section of the sections constituting the resulting document is determined as the document name of that document. As a result, an appropriate document name is created automatically. Thereby, it is not necessary for an operator to change the document name manually, and thus, work efficiency can be improved.

An embodiment of the present invention having all or any combination of the functions of the above-described second through tenth embodiments may be created, and, an operator can use these functions compositely, and select functions to be used therefrom appropriately. Thereby, it is possible to further improve the work efficiency with regard to document coupling/decomposing.

The present invention in an aspect corresponding to any of the above-described second through tenth embodiments may be applied to an integrating document management system such as that described above in the first embodiment of the present invention shown in FIG. 3.

It is necessary to be limited to the above-mentioned example of configuration. The present invention in an aspect corresponding to any of the above-described second through tenth embodiments may also be applied to another example of system configuration in which further many client computers, server computers are connected to the network, the document management database, integrating document management software, document management connecting programs exist in each client computer, and the document management database exists in each server computer, another example of system configuration in which only the integrating document management software and document management connecting programs exist but no document management databases exist in each client computer, and so forth.

First, a case where the present invention in an aspect corresponding to any of the above-described second through tenth embodiments is applied to any of the computers C1, C2 and C3 shown in FIG. 3 will now be described.

In such a case, it is assumed that, in each of the computers C1, C2 and C3 having a configuration such as that shown in FIG. 24, executable files for performing the functions of the above-described second through tenth embodiments are previously recorded in a CD-ROM shown in the figure, the document management database (including substantial-data files, document-information management files and section-information management files) and corresponding database software are stored in hard disks of the hard disk drive shown in the figure, and the integrating document management software T1, and respective document management connecting programs P1, P2 and P3 are stored in the above-mentioned hard disks.

In the client computer C3 shown in FIG. 3, the integrating document management software T1, and respective document management connecting programs P1, P2 and P3 are appropriately read out from the hard disks, are loaded in the memory shown in FIG. 24, and are executed by the CPU shown in the figure. In each computer of the computers C1, C2 and C3, the database software is appropriately read out from the hard disks, loaded in the memory shown in the figure, and executed by the CPU shown in the figure. Further, in each or any of the computers C1, C2 and C3, the above-mentioned executable files for executing the functions of any of the second through tenth embodiments are appropriately read out from the CD-ROM, loaded in the memory, and, the programs of the files are appropriately executed by the CPU. Thereby, the above-described various operations of any of the second through tenth embodiments are performed on the document management database stored in the hard disks. The memory is appropriately used for executing the particular processes.

In this case, as long as the particular computers C1, C2 and C3 perform the operations of any of the second through tenth embodiments on the respective document management databases, the operations substantially the same as those of each of the second through tenth embodiments described above are performed. Accordingly, description thereof will be omitted.

A case where the operations of each of the second through tenth embodiments are performed on the plurality of databases (respective databases of the computers C1, C2 and C3) through operations performed using the integrating document management software T1 of the client computer C3 will now be described.

Also in this case, it is assumed that, each of the computers C1, C2 and C3 has a configuration such as that shown in FIG. 24. Executable files for performing the functions of the above-described second through tenth embodiments are previously recorded in a CD-ROM shown in the figure (only in the computer C3), the document management database (including substantial-data files, document-information management files and section-information management files) and corresponding database software are stored in hard disks of the hard disk drive shown in the figure, and the integrating document management software T1, and respective document management connecting programs P1, P2 and P3 are stored in the above-mentioned hard disks.

In the client computer C3 shown in FIG. 3, the integrating document management software T1, and respective document management connecting programs P1, P2 and P3 are appropriately read out from the hard disks, are loaded in the memory shown in FIG. 24, and are executed by the CPU shown in the figure. In each computer, the database software is appropriately read out from the hard disks, loaded in the memory shown in the figure, and executed by the CPU shown in the figure. Further, in the client computer C3, the above-mentioned executable files for executing the functions of any of the second through tenth embodiments are appropriately read out from the CD-ROM, loaded in the memory, and, the programs of the files are appropriately executed by the CPU. Thereby, the above-described various operations of any of the second through tenth embodiments are performed on the document management databases stored the hard disks of the computers C1, C2 and C3. The memories of the respective computers C1, C2 and C3 are appropriately used for executing the particular processes.

In order that the operations of each of the second through tenth embodiments are performed on the plurality of databases (respective databases of the computers C1, C2 and C3) through operations performed using the integrating document management software T1 of the client computer C3, similar to the case of the first embodiment, the respective document management databases are accessed through the document management connecting programs P1, P2 and P3 using the integrating document management software T1 of the client computer C3. In this case, the operations of any of the second through tenth embodiments are performed basically using the functions of the first embodiment as they are. Details thereof will now be described.

A case where the operation of the second embodiment shown in FIG. 29 are performed will now be described.

First, in S201, in the page shown in FIG. 4 (where documents stored in the database ('DOCUMENT MANAGEMENT 1') of the server computer C1 are displayed) instead of the page shown in FIG. 27, an operator selects a document consisting of the plurality of sections, and operates the menu region of this page so as to instruct the system to display a 'property of document'. It is also possible to select a desired folder of another database (for example, the database ('DOCUMENT MANAGEMENT 2' of the server computer C2) and select a desired document therefrom.

The result thereof is the same as that in the case of the second embodiment. However, in this case, it is assumed that at least the information of the document list and section list shown in FIG. 28 of the database (in the case of FIG. 4, the database of DOCUMENT MANAGEMENT 1, that is, the database of the serer computer C1) including the documents displayed in the page of FIG. 4 is previously obtained from the document-information management file and section-information management file of the corresponding database (or the document-information management file and section-information management file themselves are obtained) after undergoing data transformation appropriately through the relevant document management connecting program (in this case, P1), loaded in the memory of the client computer C3 and held there.

Then, when a change in section names is found out in S204, the CPU of the client computer C3 changes the relevant section-information management file of the server computer C1 (or the section-information management file having the contents thereof changed is returned to the server computer C1, and, thereby the section-information management file is updated) accordingly. Also in this case, the operations are performed as a result of set of instructions/data being appropriately transformed/translated through the document management connecting program P1 of the client computer C3.

Then, in S205, the CPU of the client computer C3 obtains information from the section-information management file of the database of the server computer C1 through the document management connecting program P1, and, in accordance with the thus-obtained information, updates the information in the memory and the display on the display monitor of the client computer C3.

When the operations of the flow chart of the third embodiment shown in FIG. 32 are performed, same as the above case, first, in S211, in the page shown in FIG. 4 (where documents stored in the database ('DOCUMENT MANAGEMENT 1') of the server computer C1 are displayed) instead of the page shown in FIG. 27, an operator selects a document consisting of the plurality of sections, and operates the menu region of this page so as to instruct the system to display a 'property of document'. It is also possible to select a desired folder of another database (for example, the database ('DOCUMENT MANAGEMENT 2' of the server computer C2) and select a desired document therefrom.

The result thereof is the same as that in the case of the third embodiment. However, in this case, it is assumed that at least the information of the document list and section list shown in FIG. 28 of the database (in the case of FIG. 4, the database of DOCUMENT MANAGEMENT 1, that is, the database of the serer computer C1) including the documents displayed in the page of FIG. 4 is previously obtained from the document-information management file and section-information management file of the corresponding database (or the document-information management file and section-information management file themselves are obtained) after undergoing data transformation appropriately through the relevant document management connecting program (in this case, P1), loaded in the memory of the client computer C3 and held there.

Then, when a change in section names is found out in S214, the CPU of the client computer C3 changes the relevant section-information management file of the server computer C1 (or the section-information management file having the contents thereof changed is returned to the server computer C1, and, thereby the section-information management file is updated) accordingly. Also in this case, the operations are performed as a result of set of instructions/data being appropriately transformed through the document management connecting program P1 of the client computer C3.

Then, in S215, the CPU of the client computer C3 obtains information from the section-information management file of the database of the server computer C1 through the document management connecting program P1, and, in accordance with the thus-obtained information, updates the information in the memory and the display on the display monitor of the client computer C3.

When the operations of the fourth embodiment shown in FIG. 35 are performed, first, in S221, in the page shown in FIG. 4 (where documents stored in the database ('DOCUMENT MANAGEMENT 1') of the server computer C1 are displayed) instead of the page shown in FIG. 27, an operator selects a document consisting of the plurality of sections, and operates the menu region of this page so as to instruct the system to display a 'property of document'. It is also possible to select a desired folder of another database (for example, the database ('DOCUMENT MANAGEMENT 2' of the server computer C2) and select a desired document therefrom.

The result thereof is the same as that in the case of the fourth embodiment. However, in this case, it is assumed that at least the information of the document list and section list shown in FIG. 28 of the database (in the case of FIG. 4, the database of DOCUMENT MANAGEMENT 1, that is, the database of the serer computer C1) including the documents displayed in the page of FIG. 4 is previously obtained from the document-information management file and section-information management file of the corresponding database (or the document-information management file and section-information management file themselves are obtained) after undergoing data transformation appropriately through the relevant document management connecting program in this case, P1), loaded in the memory of the client computer C3 and held there.

The list of types of index displayed on the display monitor of the client computer C3 in S222 is loaded in the memory of the client computer C3 from the relevant document-information management file stored in the database of the server computer C1, and is previously registered by an operator there.

Then, when a change in section names is found out in S224, the CPU of the client computer C3 changes the relevant section-information management file of the server computer C1 (or the section-information management file having the contents thereof changed is returned to the server computer C1, and, thereby the section-information management file is updated) accordingly. Also in this case, the operations are performed as a result of set of instruction/data being appropriately transformed through the document management connecting program P1 of the client computer C3.

Then, in S225, the CPU of the client computer C3 obtains information from the section-information management file of the database of the server computer C1 through the document management connecting program P1, and, in accordance with the thus-obtained information, updates the information in the memory and the display on the display monitor of the client computer C3.

When the operations of the fifth embodiment shown in FIG. 38 are performed, as a presupposition, it is assumed that a plurality of documents are already registered in the database of the server computer C1, and are displayed in the page shown in FIG. 4 after undergoing data translation through the document management connecting program P1 on the client computer C3. In this state, all the information of the documents displayed is loaded in the memory of the client computer C3. Further, setting of 'to change section names at a time of document coupling' is written in a system setting information file stored in the database of the server computer C1, and the information of this setting is loaded in the memory of the client computer C3 at a time of starting up of the document management system shown in FIG. 3 (after undergoing data translation through the document management connecting program P1).

In S231, an operator selects a plurality of documents from the page of FIG. 4, and instructs the system to perform 'document coupling' by operating the menu region of the page.

As a result, the instructions of 'document coupling' are given to the document management connecting program P1 through the integrating document management software T1, are transformed into a set of instructions so as to be adapted for the software of the database of the server computer C1 by the document management connecting program P1, the thus-obtained set of instructions is given to the server computer C1, and the CPU of the server computer C1 executes a document coupling process as described above, in S232. In accordance with this set of instructions, the CPU of the server computer C1 thus executes the document coupling process for the documents in the database thereof.

Then, in S233, the CPU of the client computer C3 refers to the information concerning the setting of 'to change section names at a time of document coupling', and, thereby, recognizes that this setting is made. As a result, same as the case of the fifth embodiment, the CPU of the client computer C3 creates section names of the respective sections constituting a document obtained from the plurality of document through the document coupling process in S232 as a result of adding indexes to the document name, respectively.

Then, in S234, the CPU of the client computer C3 transmits the thus-created section names of the respective sections to the server computer C1 after performing data transformation thereon through the document management connecting program P1. The CPU of the server computer C1 receiving them relates the thus-created section names of the respective sections to the corresponding sections, respectively, and stores them in the section-information management file stored in the database thereof.

Then, in S235, the CPU of the client computer C3 obtains from the database of the server computer C1 the document information which is changed through the document coupling process in S232 through the document management connecting program P1, updates the display of the page on the display monitor of the client computer C3 using this new document information.

When the operations of the sixth embodiment shown in FIG. 39 are performed, as a presupposition, it is assumed that, for example, already the operations same as those corresponding to one of the above-described second, third, fourth and fifth embodiments are performed, a document consisting of a plurality of sections each having a section name consisting of a document name of the document and an index are registered in the database of the server computer C1, and are displayed in the page of FIG. 4 on the display monitor of the client computer C3. In this state, the information of the displayed documents is loaded in the memory of the client computer C3.

First, in S241, an operator selects the above-mentioned document consisting of the plurality of sections from the page of FIG. 4, and instructs the system to perform a 'document decomposing process' by operating the menu region of the page.

As a result, the instructions of 'document decomposing' are given to the document management connecting program P1 through the integrating document management software T1, are transformed into a set of instructions so as to be adapted for the software of the database of the server computer C1 by the document management connecting program P1, the thus-obtained set of instructions is given to the server computer C1, and the CPU of the server computer C1 executes a document decomposing process as described above, in S242. In accordance with this set of instructions, the CPU of the server computer C1 thus executes the document decomposing process for the document in the database thereof.

In S243, the process the same as that of the sixth embodiment is executed by the client computer C3.

Then, in S244, the CPU of the client computer C3 transmits the thus-created document names of the respective documents to the server computer C1 after performing data transformation thereon through the document management connecting program P1. The CPU of the server computer C1 receiving them relates the thus-created document names of the respective documents to the corresponding sections, respectively, and stores them in the section-information management file stored in the database thereof.

Then, in S245, the CPU of the client computer C3 obtains from the database of the server computer C1 the document information which is changed through the document coupling process in S244 through the document management connecting program P1, updates the display of the page on the display monitor of the client computer C3 using this new document information.

When the operations of the sixth embodiment shown in FIG. 40 are performed, as a presupposition, it is assumed that, first, as a presupposition, it is assumed that, as a result of the operations same as those corresponding to the above-described sixth embodiment being performed, a document consisting of a plurality of sections each having a section name created using the document name of the document and an index is decomposed into documents each consisting of a respective one of those sections, the document names of these documents obtained through the decomposition are caused to be the same as those of the section names of the respective sections, and those documents are registered in the database of the server computer C1.

First, in S251, an operator instructs the system to perform 'search' by operating the menu region of the page shown in FIG. 4.

The operations in S252, S253 and S255 are performed same as those in the case of the seventh embodiment.

The search process executed in S254 by the CPU of the client computer C3 will now be described making reference to FIG. 43.

First, in S261, the CPU of the client computer C3 loads the relevant document-information management file stored in the database of the server computer C1 into the memory of the client computer C3 after performing data transformation thereon through the document management connecting program P1 appropriately, and sets a pointer at the first document name in the file.

The operations of S262, S263, S264, S265 and S266 are the same as those in the case of the seventh embodiment.

As a result of the loop of S262, S263, S264, S265 and S266 being repeated, all the document names in the document-information management file are checked, document names each consisting of a combination of the character string of the space of 'DOCUMENT NAME' of the search dialog box and an index in the type of the space of 'INDEX TYPE' of the search dialog box are stored in the memory of the client computer C3 as elements of the list of search results, and, thus, the list of search results is produced.

When the operations of the eighth embodiment shown in FIG. 44 are performed, first, same as in the case corresponding to the above-described seventh embodiment, as a presupposition, it is assumed that, as a result of the operations same as those corresponding to the above-described sixth embodiment being performed, a document consisting of a plurality of sections each having a section name created using the document name of the document and an index is decomposed into documents each consisting of a respective one of those sections, the document names of these documents obtained through the decomposition are caused to be the same as those of the section names of the respective sections, and those documents are registered in the database of the server computer C1. In this case, it is also assumed that those document names are displayed in the page of FIG. 4 on the display monitor of the client computer C3, and all the information of the displayed documents is loaded in the memory of the client computer C3.

First, in S271, an operator selects (through a mouse click) a document (for example, 'PATENT-1') from the page shown in FIG. 4, and instructs the system to perform 'search' by operating the menu region.

The operations of S272, S273, S274, S275 and S275 are performed same as those in the case of the eight embodiment by the client computer C3.

When the operations of the ninth embodiment shown in FIG. 47 are performed, first, as a presupposition, it is assumed that the dialog box of a list of document search results shown in FIG. 48 is displayed on the display monitor of the client computer C3 as a result of the function corresponding to the seventh or eighth embodiment being executed. Further, it is assumed that the document information displayed there is loaded in the memory of the client computer C3.

The operations of S281 and S282 are performed same as those in the case of the ninth embodiment by the client computer C3.

The document coupling process performed in S83 is the same as that described above.

Then, the CPU of the client computer C3 obtains the document information from the document-information management file changed as a result of S283 from the database of the server computer C1 through the document management connecting program P1, and updates the display on the display monitor of the client computer C3 in accordance with the thus-obtained document information.

When the operations of the tenth embodiment shown in FIG. 49 are performed, as a presupposition, it is assumed that the dialog box of a list of document search results shown in FIG. 50 is displayed on the display monitor of the client computer C3 as a result of the function corresponding to the seventh or eighth embodiment being executed.

First, in S291, an operator pushes (through a mouse 104 click) the button 'COUPLE' of the dialog box of the list of document search results displayed on the display monitor 102.

As a result, the CPU of the client computer C3 couples together the documents listed in the document list displayed in the dialog box of the list of document search results in S292 (see the above description of the document coupling process).

The operations in S293 are the same as those of the tenth embodiment.

In S294, the CPU of the client computer C3 transmits the thus-created document names obtained in S293 to the server computer C1 after performing data transformation thereon through the document management connecting program P1. The CPU of the server computer C1 receiving them relates the thus-created document names to the corresponding sections, respectively, and stores them in the document-information management file stored in the database thereof.

In S295, the client computer C3 obtains the document information from the document-information management file changed as a result of S294 through the document management connecting program P1, and updates the display on the display monitor of the client computer C3 in accordance with the thus-obtained document information, and finishes this process.

The cases (embodiments) where the second through tenth embodiments are applied to the system environment shown in FIG. 3 have been described. However, also in such a case, it is possible to appropriately combine the functions of the second through tenth embodiments.

Thus, as a result of applying the present invention in an aspect corresponding to any of the second through tenth embodiments to a distributed database environment such as that shown in FIG. 3, it is possible to improve convenientity in various sorts of document management in such an environment.

In a system such as that shown in FIG. 3, the present invention in an aspect corresponding to any of the second through tenth embodiments may be applied to a case where documents are coupled together or a document is decomposed through a plurality of databases.

In this case, a document coupling process is executed as a result of, through the functions of the document management connecting programs of the first embodiment of the present invention, documents being moved from a first database to a second database, and being coupled to other documents in the second database. Further, a document decomposing process is executed as a result of a document being decomposed in a first database, and any of the documents obtained from the decomposition being moved to a second database through the functions of the document management connecting programs of the first embodiment of the present invention.

Further, in such a case, document information and section information of each database needed for producing/changing document names/section names may be obtained as a result of document-information management files and section-information management files of each database being obtained through the functions of the document management connecting programs of the first embodiment of the present invention, and loaded in the memory of a client computer.

Further, for document search such as that described using FIG. 43, the document-information management files of each database thus loaded in the memory of the client computer may be used.

The present invention in an aspect corresponding to any of the second through tenth embodiments may be applied not only to a case where document-information management files, section-information management files and system setting information files are stored in each database, but also to a case where they are stored in a storage device (such as hard disks of a hard disk drive) of a client computer collectively.

In such a case, each time document names/section names registered in document-information management files/section-information management files are changed, communication may be made with the respective databases throuhg the above-mentioned functions of the document management connecting programs, and the document information/section information of the respective databases may be updated appropriately.

Further, the present invention in an aspect corresponding to any of the second through tenth embodiments may be applied not only to the example of system configuration shown in FIG. 3, but also to a system in which documents stored in respective ones of a plurality of databases connected through other various networks, or connected through other methods are managed collectively, a system in which documents stored in a single database connected through a network are managed, and so forth.

The present invention is not limited to the above-described embodiments, and variations and modifications may be made without departing from the scope of the present invention.

The present application is based on Japanese priority application Nos. 11-224015 and 11-353718, filed on Aug. 6, 1999 and Dec. 13, 1999, the entire contents of which are hereby incorporated by reference.

What is claimed is:

1. A document data handling apparatus for coupling a plurality of document data having unique file names, wherein each of the plurality of document data includes a plurality of types of files, said apparatus comprising:
   a memory;
   a document data coupling control part including computer executing programs loaded in the memory configured to control a document data coupling process in which the plurality of document data managed by a document managing part are coupled together to form first document data; and
   a document name generating part configured to determine a name of one of the plurality of document data used to create the first document data, to assign the determined name of one of the plurality of document data used to create the first document data to the first document data, and to rename each of the unique file names of the plurality of document data used to create the first document data so as to include the name assigned to the first document data and an index indicating an order of arrangement for the plurality of document data in the first document data.

2. The apparatus of claim 1, further comprising:
   the document managing part configured to manage the plurality of document data and to manage correspondence between the document name of the first document data and the names of the plurality of document data from which the first document data is thus obtained.

3. The apparatus of claim 1, wherein the document coupling control part is further configured to control, upon coupling document data together, the order of arrangement of the plurality of document data in the first document data.

4. The apparatus of claim 1, further comprising:
a display control part configured to display a page through which an instruction by a user for coupling document data together is received.

5. The apparatus of claim 1, further comprising:
a document data decomposing control part configured to control a document decomposing process in which the first document data is decomposed into separate documents corresponding to the plurality of document data used to create the first document data,
wherein the names assigned to the separate documents are identical to the names given to the plurality of document data by the document name generating part.

6. A computer document data handling method for coupling a plurality of document data having unique file names, wherein each of the plurality of document data includes a plurality of types of files, the method comprising:
controlling a document data coupling process in which the plurality of document data are coupled together to form first document data;
determining a name of one of the plurality of document data used to create the first document data;
assigning a name to the first document data that is the name of one of the plurality of document data used to create the first document data determined in the determining step; and
renaming each of the unique file names of the plurality of document data used to create the first document data so as to include the name assigned to the first document data and an index indicating an order of arrangement for the plurality of document data in the first document data.

7. The method of claim 6, further comprising managing a correspondence between the document name of the first document data and the names of the plurality of document data from which the first document data is thus obtained.

8. The method of claim 6, wherein the step of controlling comprises controlling, upon coupling document data together, the order of arrangement of the plurality of document data in the first document data.

9. The method of claim 6, further comprising:
displaying a page through which an instruction by a user for coupling document data together is received.

10. The method of claim 6, further comprising:
controlling a document decomposing process in which the first document data is decomposed into separate documents corresponding to the plurality of document data used to create the first document data; and
assigning names to the separate documents that are identical to the names given to the plurality of document data in the renaming step.

11. A computer readable recording medium storing instructions for execution on a computer system, when executed by the computer system, causes the computer system to perform a method for coupling a plurality of document data having unique file names, wherein each of the plurality of document data includes a plurality of types of files, the steps comprising:
controlling a document data coupling process in which the plurality of document data are coupled together to form first document data;
determining a name of one of the plurality of document data used to create the first document data; and
assigning a name to the first document data that is the name of one of the plurality of document data used to create the first document data determined in the determining step; and
renaming each of the unique file names of the plurality of document data used to create the first document data so as to include the name assigned to the first document data and an index indicating an order of arrangement for the plurality of document data in the first document data.

12. The computer readable recording medium of claim 11, further comprising: managing a correspondence between the document name of the first document data and the names of the plurality of document data from which the first document data is thus obtained.

13. The computer readable recording medium of claim 11, wherein the step of controlling comprises controlling, upon coupling document data together, the order of arrangement of the plurality of document data in the first document data.

14. The computer readable recording medium of claim 11, further comprising:
displaying a page through which an instruction by a user for coupling document data together is received.

15. The computer readable recording medium of claim 11, further comprising:
controlling a document decomposing process in which the first document data is decomposed into separate documents corresponding to the plurality of document data used to create the first document data; and
assigning names to the separate documents that are identical to the names given to the plurality of document data in the renaming step.

* * * * *